(12) United States Patent
Hakuta et al.

(10) Patent No.: US 6,864,315 B1
(45) Date of Patent: Mar. 8, 2005

(54) CROSSLINKABLE RUBBER COMPOSITIONS AND USE THEREOF

(75) Inventors: Takashi Hakuta, Ichihara (JP); Masaaki Kawasaki, Ichihara (JP); Yoshiharu Kikuchi, Ichihara (JP); Hidenari Nakahama, Ichihara (JP); Taku Koda, Ichihara (JP); Hiroshi Kameda, Ichihara (JP); Shuichi Nonaka, Ichihara (JP); Mikio Hosoya, Ichihara (JP); Yuji Ishii, Ichihara (JP); Mitsunao Arino, Ichihara (JP); Tsutomu Nakamura, Matsuida-machi (JP); Satao Hirabayashi, Matsuida-machi (JP); Takeo Yoshida, Matsuida-machi (JP)

(73) Assignees: Mitsui Chemicals, Inc., Tokyo (JP); Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/673,608
(22) PCT Filed: Mar. 14, 2000
(86) PCT No.: PCT/JP00/01547
§ 371 (c)(1), (2), (4) Date: Oct. 19, 2000
(87) PCT Pub. No.: WO00/55251
PCT Pub. Date: Sep. 21, 2000

(30) Foreign Application Priority Data

| Mar. 16, 1999 | (JP) | 11-070982 |
| May 28, 1999 | (JP) | 11-149948 |
| Jul. 23, 1999 | (JP) | 11-208943 |
| Jul. 23, 1999 | (JP) | 11-208944 |
| Jul. 23, 1999 | (JP) | 11-209070 |
| Jul. 23, 1999 | (JP) | 11-209071 |
| Jul. 23, 1999 | (JP) | 11-209072 |
| Jul. 23, 1999 | (JP) | 11-209073 |
| Jul. 23, 1999 | (JP) | 11-209074 |
| Jul. 23, 1999 | (JP) | 11-209075 |
| Jul. 23, 1999 | (JP) | 11-209076 |
| Jul. 23, 1999 | (JP) | 11-209077 |
| Jul. 23, 1999 | (JP) | 11-209078 |
| Jul. 23, 1999 | (JP) | 11-209079 |

(51) Int. Cl.$^7$ ............................................. C08L 47/00
(52) U.S. Cl. ..................................................... 525/105
(58) Field of Search ........................................ 525/105

(56) References Cited

U.S. PATENT DOCUMENTS

| 2,823,218 A | 2/1958 | Speier et al. |
| 2,970,150 A | 1/1961 | Bailey |
| 3,159,601 A | 12/1964 | Ashby |
| 3,159,662 A | 12/1964 | Ashby |
| 3,516,946 A | 6/1970 | Modic |
| 3,775,452 A | 11/1973 | Karstedt |
| 3,814,780 A | 6/1974 | Woodhall |
| 5,405,908 A | 4/1995 | Takahashi et al. |
| 5,807,946 A | 9/1998 | Jourdain et al. |
| 6,013,729 A * | 1/2000 | Tsujimoto et al. .......... 525/105 |
| 6,111,021 A | 8/2000 | Nakahama et al. |

FOREIGN PATENT DOCUMENTS

| EP | 0 776 937 A2 | 6/1997 |
| EP | 0 837 098 A1 | 4/1998 |
| EP | 0 892 013 A1 | 1/1999 |
| EP | 0 896 982 A1 | 2/1999 |
| GB | 1118327 | 7/1968 |
| JP | 08-283492 A | 10/1996 |
| JP | 09-137002 A | 5/1997 |
| JP | 10-182879 A | 7/1998 |
| JP | 10-212389 A | 8/1998 |
| JP | 11-130914 A | 5/1999 |

OTHER PUBLICATIONS

Japanese Abstract, Japanese Patent No. JP4154855, Publication Date May 27, 1992.
Japanese Abstract, Japanese Patent No. JP7033924, Publication Date Feb. 3, 1995.
Japanese Abstract, Japanese Patent No. JP9040586, Publication Date Feb. 10, 1997.
Japanese Abstract, Japanese Patent No. JP11116811, Publication Date Apr. 27, 1999.
European Abstract, European Patent No. EP0837098, Publication Date Apr. 22, 1998.

* cited by examiner

Primary Examiner—Bernard Lipman
(74) Attorney, Agent, or Firm—Burns, Doane, Swecker & Mathis, LLP

(57) ABSTRACT

The crosslinkable rubber composition of the invention is crosslinkable by hot air, and a hot-air crosslinked rubber sheet thereof has no scratch on the surface in a hardness test using a pencil of HB and has a compression set of not more than 70% after a heat treatment at 150° C. for 22 hours. The rubber composition comprises an ethylene/α-olefin/non-conjugated polyene random copolymer rubber comprising a specific vinyl end group-containing norbornene compound, a SiH group-containing compound having at least two SiH groups in one molecule, and if necessary, an addition reaction catalyst comprising a platinum group element and a reaction inhibitor. The automobile weatherstrip, hose, rubber vibration insulator, belt, sealing material, expanded product, covered electric wire, electric wire joint, electric insulating part and household rubber product according to the invention comprise the above-mentioned rubber composition. The rubber composition has a high crosslinking rate and excellent productivity to produce crosslinked rubber molded products, is capable of undergoing hot-air crosslinking such as HAV or UHF and is capable of providing crosslinked rubber molded products having excellent compression set resistance, strength properties, heat resistance, weathering resistance and abrasion resistance.

88 Claims, 1 Drawing Sheet

CROSSLINKABLE RUBBER COMPOSITIONS AND USE THEREOF

TECHNICAL FIELD

The present invention relates to crosslinkable (vulcanizable) rubber compositions and uses thereof. More particularly, the invention relates to crosslinkable rubber compositions which have a high vulcanizing rate and excellent productivity, are capable of undergoing hot-air crosslinking such as HAV (hot air vulcanization vessel) or UHF (ultra high frequency electromagnetic wave) and are excellent in various properties such as compression set resistance, strength properties, heat resistance, weathering resistance and abrasion resistance, and also relates to uses thereof.

BACKGROUND ART

Ethylene/α-olefin/non-conjugated polyene random copolymer rubbers such as EPDM generally have excellent weathering resistance, heat resistance and ozone resistance, so that they are used for automobile industrial parts, industrial rubber products, electric insulating materials, building and civil engineering materials, rubberized fabrics and the like.

The conventional ethylene/α-olefin/non-conjugated polyene random copolymer rubbers are, however, inferior to silicone rubbers in the compression set resistance.

In order to remove this defect, utilization of peroxide crosslinking instead of sulfur vulcanization is effective. In this method, however, there is a problem that when hot-air crosslinking such as HAV (hot air vulcanization vessel) or UHF (ultra high frequency electromagnetic wave) is carried out, the rubber surface is not crosslinked or undergoes degradation, and as a result, the scratch resistance is markedly lowered. This is caused by that the peroxide does not participate in crosslinking and the rubber surface is brought into contact with oxygen to accelerate degradation. Therefore, if a crosslinking method wherein oxygen is blocked, such as steam crosslinking or lead covering crosslinking, is carried out, the scratch resistance of the rubber surface can be improved, but this method is disadvantageous in the production cost.

In Japanese Patent Laid-Open Publication No. 154855/1992, an olefin rubber composition comprising an EPDM/SiH/Pt compound, which is crosslinkable by hot air in HAV, is disclosed, but this rubber composition is not satisfactory in the scratch resistance and the compression set resistance.

In Japanese Patent Laid-Open Publication No. 33924/1995, it is described that a rubber capable of undergoing hot-air crosslinking and having excellent scratch resistance can be obtained by subjecting a rubber composition comprising an ethylene/propylene/diene copolymer rubber and a polysiloxane having at least one reactive group to peroxide crosslinking.

The present inventors have examined the invention described in this publication, and as a result, they have confirmed that though the crosslinking efficiency is increased by adding peroxide to the rubber composition, the peroxide radical causes addition reaction of siloxane and simultaneously produces polymer radical, so that the scratch resistance of the surface of the rubber product after crosslinking is not bearable in the practical use.

Depending upon uses of the rubber compositions comprising ethylene/α-olefin/non-conjugated polyene random copolymer rubbers, the rubber compositions are required to have excellent adhesion to rubbers or metals and to be free from softening deterioration after heat aging, namely, excellent in oil resistance after aging (after environmental deterioration).

In the uses of the rubber compositions comprising ethylene/α-olefin/non-conjugated polyene random copolymers rubbers, there are many parts manufactured by adhesion bonding of molded products of the rubber compositions to crosslinked rubbers or metals, and therefore adhesion properties are very important. For example, automobile weatherstrip materials are generally manufactured by vulcanizing extrusion-molded unvulcanized rubber in a continuous vulcanization vessel such as HAV or UHF, cutting the vulcanized rubber and bonding the in rubber. Therefore, a rubber of low adhesion strength may have a problem of break when fitted to automobile. Some constructional gaskets and automobile weatherstrip materials are manufactured by coextruding different rubber compositions to bond them utilizing crosslinking reaction.

On the other hand, rubbers of softening deterioration type whose degree of crosslinking is decreased after environmental deterioration become worse in the oil resistance with decrease of the degree of crosslinking.

By the way, a rubber product is generally designed in its compounding according to the hardness of the product. Therefore, in order to obtain a certain hardness, carbon black, silica, talc, clay, calcium carbonate or the like is used in consideration of a balance between cost and product properties. The reinforcements and fillers enumerated above contribute to increasing the product hardness in greater or lesser degree, but they increase a viscosity of a compounded rubber to thereby impair processability thereof. Further, these reinforcing agents and fillers also have a property of lowering extensibility that is important for rubber products.

On this account, techniques to increase the hardness of a rubber product and to decrease the viscosity of a compounded rubber are desired to be established.

By the way, the rubber products are desired to have excellent abrasion resistance in addition to the properties described above. The reason why the abrasion resistance is required is that, for example, automobile glass run channel or wiper blade is abraded on the portion which is slidably contacted with glass and as a result the product life is shortened.

In press molding or injection molding, the rubber composition is required to have excellent non-staining properties to mold.

As one cause of stain on the mold, accumulation of deteriorated rubber or compounding ingredients on the mold surface is known. With increase of the accumulated substances, the surface of the crosslinked rubber product is scratched, and the appearance thereof becomes bad. On this account, the mold must be frequently cleaned, and this cleaning time leads to increase of the production cost.

As a means to cope with stain on the mold, it is described in Japanese Patent Laid-Open Publication No. 116811/1999 that a silicone rubber is blended with an ethylene/α-olefin/non-conjugated polyene random copolymer rubber to provide a rubber composition hardly causing stain on the mold.

This rubber composition hardly stains the mold undoubtedly but has a defect of somewhat poor strength properties. As a reason of decrease of the strength properties, it is considered that, in the use of an organic peroxide crosslinking agent, the crosslinking rate of the ethylene/α-olefin/non-conjugated polyene random copolymer rubber is lower than that of the silicone rubber and has poor co-crosslinkability.

Accordingly, there is desired development of:

an ethylene/α-olefin/non-conjugated polyene random copolymer rubber composition which is capable of undergoing hot-air crosslinking (e.g., HAV or UHF) that is advantageous in the production cost and which has excellent scratch resistance and compression set resistance;

an ethylene/α-olefin/non-conjugated polyene random copolymer rubber composition which is capable of undergoing hot-air crosslinking (e.g., HAV or UHF) that is advantageous in the production cost and which is excellent in scratch resistance, compression set resistance, adhesion properties and oil resistance after environmental deterioration;

an ethylene/α-olefin/non-conjugated polyene random copolymer rubber composition which is capable of undergoing hot-air crosslinking (e.g., HAV or UHF) that is advantageous in the production cost and which is excellent in scratch resistance, compression set resistance, abrasion resistance and flowability; and an ethylene/α-olefin/non-conjugated polyene random copolymer rubber composition which is capable of undergoing hot-air crosslinking (e.g., HAV or UHF) that is advantageous in the production cost, which is excellent in scratch resistance, compression set resistance and abrasion resistance and which exhibits excellent non-staining properties to mold and strength properties when subjected to press crosslinking molding or injection crosslinking molding.

Moreover, there is also desired development of the following rubber compositions and uses thereof:

(1) a crosslinkable rubber composition for rubber vibration insulator, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having hitherto unknown excellent compression set resistance at low cost; and vibration insulating rubber products formed from the composition;

(2) a crosslinkable rubber composition for glass run, which has a high crosslinking rate and excellent productivity, is capable of undergoing hot-air crosslinking such as HAV (hot air vulcanization vessel) or UHF (ultra high frequency electromagnetic wave), and is capable of producing glass run products having good appearance free from stain by bleeding of a crosslinking agent or a vulcanizing agent and being mild to environment because of no release of a nitrosoamine compound suspected to be so-called carcinogenic material; and glass run products formed from the composition;

(3) a zinc oxide-free crosslinkable rubber composition for hose, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent compression set, strength properties and heat aging resistance; and various hoses made from the rubber composition, such as automobile water hose, automobile brake hose, industrial air hose, water hose and steam hose;

(4) a crosslinkable rubber composition for weatherstrip sponge, which has a high crosslinking rate and excellent productivity, is capable of undergoing continuous crosslinking such as HAV (hot air vulcanization vessel) or UHF (ultra high frequency electromagnetic wave), and is capable of producing weatherstrip sponges having excellent compression set resistance and scratch resistance; and weatherstrip sponges which are crosslinked and expanded products of the rubber composition;

(5) a crosslinkable rubber composition for highly expanded sponge, which has a high crosslinking rate and excellent productivity, is capable of undergoing hot-air crosslinking such as HAV (hot air vulcanization vessel) or UHF (ultra high frequency electromagnetic wave), and is capable of producing highly expanded sponges of crosslinked rubber expanded products having excellent compression set resistance, expandability, non-staining properties (e.g., non-staining properties to metals) and strength properties; and highly expanded sponges of the composition (crosslinked rubber expanded products);

(6) a crosslinkable rubber composition for electric or electronic part, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products for electric or electronic parts having excellent compression set resistance, electrical properties and strength properties; and electric or electronic parts comprising the composition, e.g., insulating electric or electronic parts such as electric wire covering materials and electric insulating rubber parts, and semi-conducting electric or electronic parts;

(7) a crosslinkable rubber composition for hydraulic cylinder seal, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent heat aging resistance, compression set resistance, liquid resistance ($\Delta V$) and strength properties; and hydraulic cylinder parts formed from the composition;

(8) a crosslinkable rubber composition for seal packing, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent strength properties, scratch resistance, heat aging resistance, compression set resistance, chemical resistance and non-staining properties to mold; and seal packing parts formed from the composition;

(9) a rubber composition for constructional gasket, which has high glass holding power, is excellent in weathering resistance, creep resistance and colorability, and is stable to temperature change through the whole year; and construction gaskets produced from the rubber composition; and

(10) a rubber composition which is capable of producing polyolefin rolls having excellent heat resistance and elasticity; and rubber rolls produced from rubber composition.

The present invention is intended to solve such problems associated with the prior art as mentioned above, and it is an object of the invention to provide a crosslinkable rubber composition, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent compression set resistance, strength properties, heat resistance, weathering resistance and abrasion resistance. It is another object of the invention to provide automobile weatherstrip, hose, rubber vibration insulator, belt, sealing material, expanded product, covered electric wire, electric wire joint, electric insulating part and household rubber product each of which is formed from the rubber composition.

Further objects of the invention are as follows:

(1) To provide a crosslinkable rubber composition, which has a high crosslinking rate and excellent productivity, is capable of undergoing hot-air crosslinking (e.g., HAV or UHF), and is capable of producing crosslinked rubber molded products having excellent scratch resistance, compression set resistance, adhesion properties and oil resistance after deterioration; and to provide uses thereof (molded products thereof).

(2) To provide a crosslinkable rubber composition excellent in flowability, which has a high crosslinking rate and excellent productivity to produce crosslinked rubber molded products, is capable of undergoing hot-air crosslinking such as HAV or UHF, and is capable of producing crosslinked rubber molded products (including expanded products) having excellent compression set resistance, strength properties, heat resistance and weathering resistance; and to provide uses thereof.

(3) To provide a crosslinkable rubber composition excellent in non-staining properties to mold, which has a high crosslinking rate and excellent productivity to produce crosslinked rubber molded product, is capable of undergoing hot-air crosslinking (e.g., HAV or UHF), and is capable of producing crosslinked rubber molded products having excellent compression set resistance, strength properties, heat resistance, weathering resistance and abrasion resistance; and to provide uses thereof.

(4) To provide a crosslinkable rubber composition for vibration insulating rubber, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having hitherto unknown excellent compression set resistance at low cost; and to provide vibration insulating rubber products thereof.

(5) To provide a crosslinkable rubber composition for glass run, which has a high crosslinking rate and excellent productivity, is capable of undergoing hot-air crosslinking such as HAV or UHF, and is capable of producing glass run products having good appearance free from stain by bleeding of a crosslinking agent or a vulcanizing agent and being mild to environment because of no release of a nitrosoamine compound suspected to be so-called carcinogenic material; and to provide glass run products thereof.

(6) To provide a zinc oxide-free crosslinkable rubber composition for hose, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent compression set, strength properties and heat aging resistance; and to provide various hoses formed from the composition, such as automobile water hose, automobile brake hose, industrial air hose, water hose and steam hose.

(7) To provide a crosslinkable rubber composition for weatherstrip sponge, which has a high crosslinking rate and excellent productivity, is capable of undergoing continuous crosslinking such as HAV (hot air vulcanization vessel) or UHF (ultra high frequency electromagnetic wave), and is capable of producing weatherstrip sponges having excellent compression set resistance and scratch resistance; and to provide weatherstrip sponges which are crosslinked and expanded products thereof.

(8) To provide a crosslinkable rubber composition for highly expanded sponge, which has a high crosslinking rate and excellent productivity, is capable of undergoing hot-air crosslinking such as HAV (hot air vulcanization vessel) or UHF (ultra high frequency electromagnetic wave), and is capable of producing highly expanded molded sponges of crosslinked rubber expanded products having excellent compression set resistance, expandability, non-staining properties (e.g., non-staining properties to metals) and strength properties; and to provide highly expanded sponges thereof (crosslinked rubber expanded products).

(9) To provide a crosslinkable rubber composition for electric or electronic part, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products for electric or electronic parts having excellent compression set resistance, electrical properties and strength properties; and to provide electric or electronic parts formed from the composition, e.g., insulating electric or electronic parts such as electric wire covering materials and electric insulating rubber parts, and semi-conducting electric or electronic parts.

(10) To provide a crosslinkable rubber composition for hydraulic cylinder seal, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent heat aging resistance, compression set resistance, liquid resistance ($\Delta V$) and strength properties; and to provide hydraulic cylinder parts formed from the composition.

(11) To provide a crosslinkable rubber composition for seal packing having excellent non-staining properties to mold, which has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products having excellent strength properties, scratch resistance, heat aging resistance, compression set resistance and chemical resistance; and to provide seal packing parts thereof.

(12) To provide a rubber composition for constructional gasket, which has high glass holding power, is excellent in weathering resistance, creep resistance and colorability, and is stable to temperature change through the whole year; and to provide construction gaskets produced from the rubber composition.

(13) To provide a rubber composition which is capable of producing polyolefin rolls having excellent heat resistance and elasticity; and to provide rubber rolls produced from rubber composition.

DISCLOSURE OF THE INVENTION

The first crosslinkable rubber composition according to the invention is crosslinkable by hot air and has the following properties:

a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70% after a heat treatment at 150° C. for 22 hours. In the first vulcanizable rubber composition according to the invention, it is preferred that a residual liquid after a washing step of immersing vulcanized sheet in 10 g of xylene for 48 hours have a turbidity of not more than 2 ppm. It is especially preferred that the turbidity and the CS satisfy the relationship of the following inequality:

Turbidity (ppm) ≦ 10−0.125×CS(%)

The CS is preferably not more than 50%, more preferably not more than 40%, still preferably not more than 30%, especially not more than 20%.

The second crosslinkable rubber composition of the invention comprises:

an ethylene/α-olefin/non-conjugated polyene random copolymer rubber (A) having constituent units derived from at least one kind of a vinyl end group-containing norbornene compound represented by the following formula (I) or (II), said norbornene compound being the non-conjugated polyene, and a SiH group-containing compound (B) having at least two SiH groups in one molecule;

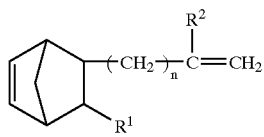

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms;

(II)

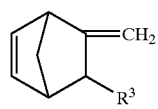

wherein $R^3$ is a hydrogen atom or an alkyl group of 1 to 10 carbon atoms.

The second crosslinkable rubber composition of the invention may further comprise a catalyst (E) and a reaction inhibitor (F).

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 40/60 to 95/5, (ii) the iodine value is in the range of 0.5 to 50, and (iii) the intrinsic viscosity (η) as measured in decalin at 135° C. is in the range of 0.3 to 10 dl/g.

The ethylene/α-olefin/non-conjugated polyene random copolymer rubber (A) preferably has, in addition to the properties (i), (ii) and (iii), the following properties:

(iv) the molecular weight distribution (Mw/Mn) as measured by GPC is in the range of 3 to 50, and (v) the effective network chain density (v) as measured after the copolymer rubber (A) is press crosslinked at 170° C. for 10 minutes using 0.01 mol of dicumyl peroxide based on 100 g of the copolymer rubber (A) is not less than $1.5×10^{20}$ chains/cm$^3$.

The ethylene/α-olefin/non-conjugated polyene random copolymer rubber (A) more preferably has, in addition to the properties (i), (ii), (iii), (iv) and (v), the following properties:

(vi) the ratio between a ratio (γ2/γ1) of a shear rate γ2 at a shear stress of $2.4×10^6$ dyn/cm$^2$ to a shear rate γ2 at a shear stress of $0.4×10^6$ dyn/cm$^2$, said shear rates being obtained from the melt flow curve at 100° C., and the effective network chain density (v) satisfies the following inequality (III):

$$0.04×10^{-19} ≦ \text{Log}(γ2/γ1)/v ≦ 0.20×10^{-19} \quad \text{(III)}.$$

The ethylene/α-olefin/non-conjugated polyene random copolymer rubber (A) having the above properties (i) to (vi) is obtained by copolymerizing ethylene, an α-olefin and the norbornene compound represented by the above formula (I) or (II) using a catalyst containing the following compounds (J) and (K) as main components under the conditions of a polymerization temperature of 30 to 60° C., a polymerization pressure of 4 to 12 kgf/cm$^2$ and a feed rate molar ratio (non-conjugated polyene/ethylene) of the non-conjugated polyene to ethylene ranging from 0.01 to 0.2;

(J) a soluble vanadium compound represented by VO(OR)$_n$X$_{3-n}$ (R is a hydrocarbon group, X is a halogen atom, and n is 0 or an integer of 1 to 3), or a vanadium compound represented by VX$_4$ (X is a halogen atom);

(K) an organoaluminum compound represented by R'$_m$AlX'$_{3-m}$ (R' is a hydrocarbon group, X' is a halogen atom, and m is an integer of 1 to 3).

The ethylene/α-olefin/non-conjugated polyene random copolymer rubber (A) preferably has an insoluble content of not more than 1% after Soxhlet extraction (solvent: boiling xylene, extraction time: 3 hours, mesh: 325).

As the catalyst (E), a platinum catalyst is preferably employed.

The second crosslinkable rubber composition of the invention desirably has properties that a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably 40%, still preferably 30%, especially not more than 20%, after a heat treatment at 150° C. for 22 hours. This rubber composition preferably has a crosslinking rate ($t_c$(90)) at 160° C. of not more than 15 minutes.

The first and second crosslinkable rubber compositions of the invention are favorably used for producing automobile weatherstrip, automobile hose, water supply hose, gas hose, automobile rubber vibration insulator, railway rubber vibration insulator, industrial equipment rubber vibration insulator, earthquake proof rubber for construction, transmission belt, conveyor belt, automobile cup/sealing material, industrial equipment sealing material, automobile weatherstrip sponge, constructional sealing sponge or another expanded product, covered electric wire, electric wire joint, electric insulating part, semi-conducting rubber part, OA machine roll, industrial roll, household rubber product and the like.

The second crosslinkable rubber composition of the invention comprising the ethylene/α-olefin/non-conjugated polyene random copolymer rubber (A) can be crosslinked at ordinary temperature and is favorably used for reaction injection molding (RIM). Further, the rubber composition can be used for producing thermoplastic elastomers or modifying engineering plastics.

The automobile weatherstrip, hose (automobile hose, water supply hose, gas hose), rubber vibration insulator (automobile rubber vibration insulator, railway rubber vibration insulator, industrial equipment rubber vibration insulator, earthquake proof rubber for construction), belt (transmission belt, conveyor belt), sealing material (automobile cup/sealing material, industrial equipment sealing material), expanded product (automobile weatherstrip sponge, constructional sealing sponge, another expanded product), covered electric wire, electric wire joint, electric insulating part, semi-conducting rubber part, OA machine roll, industrial roll and household rubber product according to the invention comprise the first crosslinkable rubber composition of the invention.

The second crosslinkable rubber composition of the invention has a high crosslinking rate and excellent productivity to produce crosslinked rubber molded products, is capable of undergoing hot-air crosslinking such as HAV or UHF, and is capable of producing crosslinked rubber molded products having excellent compression set resistance, strength properties, heat resistance, weathering resistance and abrasion resistance.

Since the second crosslinkable rubber composition and the crosslinked rubber molded products formed therefrom of the invention exhibit the above effects, they can be widely used for automobile weatherstrip, hose (e.g., automobile hose, water supply hose, gas hose), rubber vibration insulator (e.g., automobile rubber vibration insulator, railway rubber vibration insulator, industrial equipment rubber vibration insulator, earthquake proof rubber for construction), belt (e.g., transmission belt, conveyor belt), sealing material (e.g., automobile cup/sealing material, industrial equipment sealing material), expanded product (e.g., automobile weatherstrip sponge, constructional sealing sponge, hose-protecting sponge, cushioning sponge, heat insulating sponge, insulation sponge), covered electric wire, electric wire joint, electric insulating part, semi-conducting rubber part, OA machine roll, industrial roll, household rubber product (e.g., rainwear, rubber band, shoe, rubber glove, latex, golf ball), plastic modified product, thermoplastic elastomer product, and engineering plastic modified product.

The third crosslinkable rubber composition according to the invention comprises:

an ethylene/α-olefin/non-conjugated polyene random copolymer rubber (A1) having constituent units derived from at least one kind of a vinyl end group-containing norbornene compound (1) represented by the aforementioned formula (I) or (II), said norbornene compound being the non-conjugated polyene, and constituent units derived from a non-conjugated polyene compound (2) containing a group represented by the following formula (III), and the SiH group-containing compound (B);

(III)

wherein $R^4$ is an alkyl group of 1 to 10 carbon atoms, and $R^5$ and $R^6$ are each independently a hydrogen atom or an alkyl group of 1 to 10 carbon atoms.

The third crosslinkable rubber composition of the invention may further comprise a catalyst (E), or the catalyst (E) and a reaction inhibitor (F), if necessary, in addition to the ethylene/α-olefin/non-conjugated polyene random copolymer rubber (A1) and the SiH group-containing compound (B).

The ethylene/α-olefin/non-conjugated polyene random copolymer rubber (A1) has the following properties:

(i) the molar ratio (ethylene/α-olefin) of ethylene to an α-olefin of 3 to 20 carbon atoms is in the range of 40/60 to 95/5, (ii) the iodine value is in the range of 0.5 to 50, (iii) the intrinsic viscosity (η) as measured in decalin at 135° C. is in the range of 0.3 to 10 dl/g, and (iv) the branch index as measured by a kinematic viscoelasticity measuring machine is not less than 5.

The ethylene/α-olefin/non-conjugated polyene random copolymer rubber (A1) preferably has, in addition to the properties (i), (ii), (iii) and (iv), the following properties:

(v) the molecular weight distribution (Mw/Mn) as measured by GPC is in the range of 3 to 100, and (vi) the effective network chain density (ν) as measured after the copolymer rubber (A1) is press crosslinked at 170° C. for 10 minutes using 0.01 mol of dicumyl peroxide based on 100 g of the copolymer rubber (A1) is not less than $1.5 \times 10^{20}$ chains/cm³.

The ethylene/α-olefin/non-conjugated polyene random copolymer rubber (A1) more preferably has, in addition to the properties (i), (ii), (iii), (iv), (v) and (vi), the following properties:

(vii) the ratio between a ratio (γ2/γ1) of a shear rate γ2 at a shear stress of $2.4 \times 10^6$ dyn/cm² obtained from the melt flow curve at 100° C. to a shear rate γ1 at a shear stress of $0.4 \times 10^6$ dyn/cm² obtained from the melt flow curve at 100° C. and the effective network chain density (ν) satisfies the following formula (IV):

$$0.04 \times 10^{-19} \leq \text{Log}(\gamma 2/\gamma 1)/\nu \leq 0.20 \times 10^{-19} \qquad \text{(IV)}.$$

The ethylene/α-olefin/non-conjugated polyene random copolymer rubber (A1) having the above properties (i) to (vii) is obtained by copolymerizing ethylene, an α-olefin, the norbornene compound represented by the formula (I) or (II) and a non-conjugated polyene containing a group represented by the formula (III) using a catalyst containing the compounds (J) and (K) as main components under the conditions of a polymerization temperature of 30 to 60° C., a polymerization pressure of 4 to 12 kgf/cm² and a feed rate molar ratio (non-conjugated polyene/ethylene) of the non-conjugated polyene to ethylene ranging from 0.01 to 0.2.

The ethylene/α-olefin/non-conjugated polyene random copolymer rubber (A1) preferably has an insoluble content of not more than 1% after Soxhlet extraction (solvent: boiling xylene, extraction time: 3 hours, mesh: 325).

As the catalyst (E), a platinum catalyst is preferably employed.

The third crosslinkable rubber composition of the invention desirably has properties that a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours and a tensile strength retention of 50 to 300% after heat aging at 150° C. for 72 hours.

The third crosslinkable rubber composition of the invention is favorably used for producing automobile weatherstrip, automobile hose, water supply hose, gas hose, automobile rubber vibration insulator, railway rubber vibration insulator, industrial equipment rubber vibration insulator, earthquake proof rubber for construction, transmission belt, conveyor belt, automobile cup/sealing material, industrial equipment sealing material, automobile weatherstrip sponge, constructional sealing sponge or another expanded product, covered electric wire, electric wire joint, electric insulating part, semi-conducting rubber part, OA machine roll, industrial roll, household rubber product, building and civil engineering cut-off sheet, building material sealant and the like.

The third crosslinkable rubber composition of the invention comprising the ethylene/α-olefin/non-conjugated polyene random copolymer rubber (A1) can be crosslinked at ordinary temperature and is favorably used for room temperature crosslinked rubber (RTV) and reaction injection molding (RIM). Further, the rubber composition can be used as a material of water crosslinked rubber. Moreover, the rubber composition can be used for producing thermoplastic elastomers or modifying thermoplastic resins or engineering plastics.

The automobile weatherstrip, hose (automobile hose, water supply hose, gas hose), rubber vibration insulator (automobile rubber vibration insulator, railway rubber vibration insulator, industrial equipment rubber vibration insulator, earthquake proof rubber for construction), belt (transmission belt, conveyor belt), sealing material (automobile cup/sealing material, industrial equipment sealing material), expanded product (automobile weatherstrip sponge, constructional sealing sponge, another expanded product), covered electric wire, electric wire joint, electric insulating part, semi-conducting rubber part, OA machine roll, industrial roll, building and civil engineering cut-off sheet and household rubber product according to the invention may comprise the third crosslinkable rubber composition of the invention.

The third crosslinkable rubber composition of the invention has a high crosslinking rate and excellent productivity to produce crosslinked rubber molded products, is capable of undergoing hot-air crosslinking such as HAV or UHF, and is capable of producing crosslinked rubber molded products (including expanded products) having excellent compression set resistance, strength properties, heat resistance, weathering resistance, adhesion properties, oil resistance after deterioration and abrasion resistance.

Since the third crosslinkable rubber composition and the crosslinked rubber molded products formed therefrom of the invention exhibit the above effects, they can be widely used for automobile weatherstrip, hose (e.g., automobile hose, water supply hose, gas hose), rubber vibration insulator (e.g., automobile rubber vibration insulator, railway rubber vibration insulator, industrial equipment rubber vibration insulator, earthquake proof rubber for construction), belt (e.g., transmission belt, conveyor belt), sealing material (e.g., automobile cup/sealing material, industrial equipment sealing material), expanded product (e.g., automobile weatherstrip sponge, constructional sealing sponge, hose-protecting sponge, cushioning sponge, heat insulating sponge, insulation sponge), covered electric wire, electric wire joint, electric insulating part, semi-conducting rubber part, OA machine roll, industrial roll, household rubber product (e.g., rainwear, rubber band, shoe, rubber glove, latex, golf ball), plastic modified product, thermoplastic elastomer product, water crosslinked rubber product, thermoplastic resin modified product, and engineering plastic modified product.

The fourth crosslinkable rubber composition according to the invention is a blend comprising the ethylene/α-olefin/non-conjugated polyene random copolymer rubber (A), a polyolefin resin (D1) and the SiH group-containing compound (B), is obtained by microdispersing the polyolefin resin (D1) in the ethylene/α-olefin/non-conjugated polyene random copolymer rubber (A) in a molten state, and has the following properties:

the average dispersed particle diameter of the polyolefin resin (D1) is not more than 2 μm, and the blending weight ratio ((D1)/(A)) of the polyolefin resin (D1) to the ethylene/α-olefin/non-conjugated polyene random copolymer rubber (A) is in the range of 5/95 to 50/50.

The fourth crosslinkable rubber composition according to the invention preferably is a rubber composition wherein the polyolefin resin (D1) is an ethylene homopolymer or a crystalline ethylene/α-olefin copolymer.

Also preferable is a crosslinkable rubber composition, which comprises the ethylene/α-olefin/non-conjugated polyene random copolymer rubber (A) and a polyolefin resin (D1) that is a crystalline α-olefin homopolymer of an α-olefin of 3 to 8 carbon atoms or a crystalline α-olefin copolymer of the same α-olefins, which is a blend obtained by microdispersing the polyolefin resin (D1) in the ethylene/α-olefin/non-conjugated polyene random copolymer rubber (A) in a molten state, and which has the following properties:

the average dispersed particle diameter of the polyolefin resin (D1) is not more than 2 μm, the blending weight ratio ((D1)/(A)) of the polyolefin resin (D1) to the ethylene/α-olefin/non-conjugated polyene random copolymer rubber (A) is in the range of 5/95 to 50/50, and the hardness (Y) (A hardness defined by JIS K 6301) of said rubber composition and the amount (X) of the polyolefin resin (D1) satisfy the following relation $$Y=(0.5\pm0.2)X+a$$

wherein X is an amount (part(s) by weight, the total of the components (A) and (D) is 100 parts by weight) of the polyolefin resin (D1), and a is a hardness obtained by subtracting an increase of hardness attributed to the addition of the polyolefin resin (D1) from the hardness of the rubber composition). The dispersed particles of the polyolefin resin (D1) particularly preferably have an aspect ratio of not more than 5.

The fourth crosslinkable rubber composition of the invention may further comprise a catalyst (E), or the catalyst (E) and a reaction inhibitor (F), if necessary, in addition to the ethylene/α-olefin/non-conjugated polyene random copolymer rubber (A), the polyolefin resin (D1) and the SiH group-containing compound (B).

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 40/60 to 95/5, preferably 50/50 to 90/10, more preferably 55/45 to 85/15, particularly preferably 60/40 to 82/20, (ii) the iodine value (g/100 g) is in the range of 0.5 to 50, preferably 0.8 to 40, more preferably 1 to 30, particularly preferably 1.5 to 25, (iii) the intrinsic viscosity (η) as measured in decalin at 135° C. is in the range of 0.3 to 10 dl/g, preferably 0.5 to 8 dl/g, more preferably 0.7 to 6 dl/g, particularly preferably 0.8 to 5 dl/g, and (iv) the branch index as measured by a kinematic viscoelasticity measuring machine is not less than 5, preferably not less than 7, more preferably not less than 9, particularly preferably not less than 10.

The ethylene/α-olefin/non-conjugated polyene random copolymer rubber (A) preferably has, in addition to the properties (i), (ii), (iii) and (iv), the following properties:

(v) the molecular weight distribution (Mw/Mn) as measured by GPC is in the range of 2 to 200, preferably 2.5 to 150, more preferably 3 to 120, particularly preferably 5 to 100, and (vi) the effective network chain density (v) as measured after the copolymer rubber (A) is press crosslinked at 170° C. for 10 minutes using 0.01 mol of dicumyl peroxide based on 100 g of the copolymer rubber (A) is not less than $1.5 \times 10^{20}$ chains/cm$^3$.

The ethylene/α-olefin/non-conjugated polyene random copolymer rubber (A) more preferably has, in addition to the properties (i), (ii), (iii), (iv), (v) and (vi), the following properties:

(vii) the ratio between a ratio (γ2/γ1) of a shear rate γ2 at a shear stress of $2.4 \times 10^6$ dyn/cm$^2$ obtained from the melt flow curve at 100° C. to a shear rate γ1 at a shear stress of $0.4 \times 10^6$ dyn/cm$^2$ obtained from the melt flow curve at 100° C. and the effective network chain density (v) satisfies the following formula (III):

$$0.04 \times 10^{-19} \leq \mathrm{Log}(\gamma 2/\gamma 1)/v \leq 0.20 \times 10^{-19} \qquad (\mathrm{III}).$$

The ethylene/α-olefin/non-conjugated polyene random copolymer rubber (A) having the above properties (i) to (vii) is obtained by the aforesaid copolymerization.

The ethylene/α-olefin/non-conjugated polyene random copolymer rubber (A) preferably has an insoluble content of not more than 1% after Soxhlet extraction (solvent: boiling xylene, extraction time: 3 hours, mesh: 325).

As the catalyst (E), a platinum catalyst is preferably employed.

The fourth crosslinkable rubber composition of the invention desirably has properties that a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours.

The fourth crosslinkable rubber composition of the invention is favorably used for producing automobile weatherstrip, automobile hose, water supply hose, gas hose, automobile rubber vibration insulator, railway rubber vibration insulator, industrial equipment rubber vibration insulator, earthquake proof rubber for construction, transmission belt, conveyor belt, automobile cup/sealing material, industrial equipment sealing material, automobile weatherstrip sponge, constructional sealing sponge or another expanded product, covered electric wire, electric wire joint, electric insulating part, semi-conducting rubber part, OA machine roll, industrial roll, household rubber product, building and civil engineering cut-off sheet, building material sealant and the like.

The fourth rubber composition of the invention comprising the ethylene/α-olefin/non-conjugated polyene random copolymer rubber (A) can be crosslinked at ordinary temperature and is favorably used for room temperature crosslinked rubber (RTV) and reaction injection molding (RIM). Further, the rubber composition can be used as a material of water crosslinked rubber. Moreover, the rubber composition can be used for producing thermoplastic elastomers or modifying thermoplastic resins or engineering plastics.

The automobile weatherstrip, hose (automobile hose, water supply hose, gas hose), rubber vibration insulator (automobile rubber vibration insulator, railway rubber vibration insulator, industrial equipment rubber vibration insulator, earthquake proof rubber for construction), belt (transmission belt, conveyor belt), sealing material (automobile cup/sealing material, industrial equipment sealing material), expanded product (automobile weatherstrip sponge, constructional sealing sponge, another expanded product), covered electric wire, electric wire joint, electric insulating part, semi-conducting rubber part, OA machine roll, industrial roll, building and civil engineering cut-off sheet and household rubber product according to the invention may comprise the fourth crosslinkable rubber composition of the invention.

The fourth crosslinkable rubber composition of the invention has excellent flowability, a high crosslinking rate and excellent productivity to produce crosslinked rubber molded products, is capable of undergoing hot-air crosslinking such as HAV or UHF, and is capable of producing crosslinked rubber molded products (including expanded products) having excellent compression set resistance, strength properties, heat resistance and weathering resistance.

Since the fourth crosslinkable rubber composition and the crosslinked rubber molded products formed therefrom of the invention exhibit the above effects, they can be widely used for automobile weatherstrip, hose (e.g., automobile hose, water supply hose, gas hose), rubber vibration insulator (e.g., automobile rubber vibration insulator, railway rubber vibration insulator, industrial equipment rubber vibration insulator, earthquake proof rubber for construction), belt (e.g., transmission belt, conveyor belt), sealing material (e.g., automobile cup/sealing material, industrial equipment sealing material), expanded product (e.g., automobile weatherstrip sponge, constructional sealing sponge, hose-protecting sponge, cushioning sponge, heat insulating sponge, insulation sponge), covered electric wire, electric wire joint, electric insulating part, semi-conducting rubber part, OA machine roll, industrial roll, building and civil engineering cut-off sheet, household rubber product (e.g., rainwear, rubber band, shoe, rubber glove, latex, golf ball), plastic modified product, thermoplastic elastomer product, water crosslinked rubber product, thermoplastic resin modified product, and engineering plastic modified product.

The fifth crosslinkable rubber composition of the invention comprises, in addition to the ethylene/α-olefin/non-conjugated polyene random copolymer rubber (A) and the SiH group-containing compound (B), an alkenyl group-containing polysiloxane (C).

The fifth crosslinkable rubber composition of the invention may further comprise a catalyst (E), or the catalyst (E) and a reaction inhibitor (F), if necessary, in addition to the ethylene/α-olefin/non-conjugated polyene random copolymer rubber (A), the SiH group-containing compound (B) and the alkenyl group-containing polysiloxane (C).

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 40/60 to 95/5, preferably 50/50 to 90/10, more preferably 55/45 to 85/15, particularly preferably 60/40 to 82/20, (ii) the iodine value (g/100 g) is in the range of 0.5 to 50, preferably 0.8 to 40, more preferably 1 to 30, particularly preferably 1.5 to 25, (iii) the intrinsic viscosity ($\eta$) as measured in decalin at 135° C. is in the range of 0.3 to 10 dl/g, preferably 0.5 to 8 dl/g, more preferably 0.7 to 6 dl/g, particularly preferably 0.8 to 5 dl/g, and (iv) the branch index as measured by a kinematic viscoelasticity measuring machine is not less than 5.

The ethylene/$\alpha$-olefin/non-conjugated polyene random copolymer rubber (A) preferably has, in addition to the properties (i), (ii), (iii) and (iv), the following properties:

(v) the molecular weight distribution (Mw/Mn) as measured by GPC is in the range of 2 to 200, preferably 2.5 to 150, more preferably 3 to 120, still more preferably 3 to 100, particularly preferably 5 to 100, and (vi) the effective network chain density ($\nu$) as measured after the copolymer rubber (A) is press crosslinked at 170° C. for 10 minutes using 0.01 mol of dicumyl peroxide based on 100 g of the copolymer rubber (A) is not less than $1.5 \times 10^{20}$ chains/cm$^3$.

The ethylene/$\alpha$-olefin/non-conjugated polyene random copolymer rubber (A) more preferably has, in addition to the properties (i), (ii), (iii), (iv), (v) and (vi), the following properties:

(vii) the ratio between a ratio ($\gamma 2/\gamma 1$) of a shear rate $\gamma 2$ at a shear stress of $2.4 \times 10^6$ dyn/cm$^2$ obtained from the melt flow curve at 100° C. to a shear rate $\gamma 1$ at a shear stress of $0.4 \times 10^6$ dyn/cm$^2$ obtained from the melt flow curve at 100° C. and the effective network chain density ($\nu$) satisfies the following formula (III):

$$0.04 \times 10^{-19} \leq \mathrm{Log}(\gamma 2/\gamma 1)/\nu \leq 0.20 \times 10^{-19} \qquad \text{(III)}.$$

The ethylene/$\alpha$-olefin/non-conjugated polyene random copolymer rubber (A) having the above properties (i) to (vii) is obtained by the aforesaid copolymerization.

The ethylene/$\alpha$-olefin/non-conjugated polyene random copolymer rubber (A) preferably has an insoluble content of not more than 1% after Soxhlet extraction (solvent: boiling xylene, extraction time: 3 hours, mesh: 325).

As the catalyst (E), a platinum catalyst is preferably employed.

The fifth crosslinkable rubber composition of the invention desirably has properties that a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours and a tensile strength retention of 50 to 300% after heat aging at 150° C. for 72 hours.

The fifth crosslinkable rubber composition of the invention is favorably used for producing automobile weatherstrip, automobile hose, water supply hose, gas hose, automobile rubber vibration insulator, railway rubber vibration insulator, industrial equipment rubber vibration insulator, earthquake proof rubber for construction, transmission belt, conveyor belt, automobile cup/sealing material, industrial equipment sealing material, automobile weatherstrip sponge, constructional sealing sponge or another expanded product, covered electric wire, electric wire joint, electric insulating part, semi-conducting rubber part, OA machine roll, industrial roll, household rubber product, building and civil engineering cut-off sheet, building material sealant and the like.

The fifth crosslinkable rubber composition of the invention comprising the ethylene/$\alpha$-olefin/non-conjugated polyene random copolymer rubber (A) can be crosslinked at ordinary temperature and is favorably used for room temperature crosslinked rubber (RTV) and reaction injection molding (RIM). Further, the rubber composition can be used as a material of water crosslinked rubber. Moreover, the rubber composition can be used for producing thermoplastic elastomers or modifying thermoplastic resins or engineering plastics.

The automobile weatherstrip, hose (automobile hose, water supply hose, gas hose), rubber vibration insulator (automobile rubber vibration insulator, railway rubber vibration insulator, industrial equipment rubber vibration insulator, earthquake proof rubber for construction), belt (transmission belt, conveyor belt), sealing material (automobile cup/sealing material, industrial equipment sealing material), expanded product (automobile weatherstrip sponge, constructional sealing sponge, another expanded product), covered electric wire, electric wire joint, electric insulating part, semi-conducting rubber part, OA machine roll, industrial roll, building and civil engineering cut-off sheet and household rubber product according to the invention may comprise the fifth crosslinkable rubber composition of the invention.

The fifth crosslinkable rubber composition of the invention has a high crosslinking rate, excellent productivity to produce crosslinked rubber molded products, and excellent non-staining properties to mold, is capable of undergoing hot-air crosslinking such as HAV or UHF, and is capable of producing crosslinked rubber molded products having excellent compression set resistance, strength properties, heat resistance, weathering resistance and abrasion resistance.

Since the fifth crosslinkable rubber composition and the crosslikable rubber molded products of the invention exhibit the above effects, they can be widely used for automobile weatherstrip, hose (e.g., automobile hose, water supply hose, gas hose), rubber vibration insulator (e.g., automobile rubber vibration insulator, railway rubber vibration insulator, industrial equipment rubber vibration insulator, earthquake proof rubber for construction), belt (e.g., transmission belt, conveyor belt), sealing material (e.g., automobile cup/sealing material, industrial equipment sealing material), expanded product (e.g., automobile weatherstrip sponge, constructional sealing sponge, hose-protecting sponge, cushioning sponge, heat insulating sponge, insulation sponge), covered electric wire, electric wire joint, electric insulating part, semi-conducting rubber part, OA machine roll, industrial roll, household rubber product (e.g., rainwear, rubber band, shoe, rubber glove, latex, golf ball), plastic modified product, thermoplastic elastomer product, water crosslinked rubber product, thermoplastic resin modified product, and engineering plastic modified product.

The crosslinkable rubber composition for rubber vibration insulator or glass run according to the invention is crosslinkable by hot air and a hot press and has the following properties:

a hot-air crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than the 30%, especially not more than 20%, after a heat treatment at 150° C. for 22 hours, and a hot-press crosslinked rubber sheet obtained by molding said rubber composition into a sheet and then subjecting the sheet to hot-press crosslinking has a tensile strength of 5 to 16 MPa and a compression set (CS) of not more than 70%, preferably not more than 50%, more preferably not more than 40%, preferably not more than 30%, especially not more than 20%, after a heat treatment at 150° C. for 22 hours.

The crosslinkable rubber composition for rubber vibration insulator or glass run of the invention having the above properties comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 80/20, preferably 65/35 to 80/20, more preferably 65/35 to 75/25, (ii) the iodine value (g/100 g) is in the range of 1 to 30, preferably 1 to 25, more preferably 2 to 20, particularly preferably 3 to 18, most preferably 4 to 15, (iii) the intrinsic viscosity (η) as measured in decalin at 135° C. is in the range of 1.5 to 3.5 dl/g, preferably 1.5 to 3.0 dl/g, and (iv) the branch index as measured by a kinematic viscoelasticity measuring machine is not less than 5, preferably not less than 7, more preferably not less than 9, particularly preferably not less than 10.

The crosslinkable rubber composition may further comprise a catalyst (E), or the catalyst (E) and a reaction inhibitor (F), if necessary, in addition to the ethylene/α-olefin/non-conjugated polyene random copolymer rubber (A) and the SiH group-containing compound (B).

As the catalyst (E), a platinum catalyst is preferably employed.

The vibration insulating rubber product according to the invention is formed from the above-described crosslinkable rubber composition for rubber vibration insulator.

The glass run product according to the invention comprises the above-described crosslinkable rubber composition for glass run.

The crosslinkable rubber composition for rubber vibration insulator according to the invention is favorably used for producing vibration insulating rubber products, which are widely used for machines, electric appliances, building and civil engineering materials, automobiles and vehicles to insulate or reduce vibration.

The crosslinkable rubber composition for glass run according to the invention is favorably used for producing glass run products such as weatherstrips.

The crosslinkable rubber composition for rubber vibration insulator according to the invention has a high crosslinking rate and excellent productivity, is capable of undergoing hot-air crosslinking such as HAV (hot air vulcanization vessel) or UHF (ultra high frequency electromagnetic wave), and is capable of producing, at low cost, crosslinked rubber molded products which have good appearance due to no bleed of a crosslinking agent, which show excellent compression set resistance and heat aging resistance and which are mild to environment because of no release of a nitrosoamine compound suspected to be so-called carcinogenic material.

The crosslinkable rubber composition for glass run according to the invention has a high crosslinking rate and excellent productivity, is capable of undergoing hot-air crosslinking such as HAV or UHF, and is capable of producing, at low cost, crosslinked rubber molded products which have excellent compression set and good appearance due to no bleed of a crosslinking agent and which are mild to environment because of no release of a nitrosoamine compound suspected to be so-called carcinogenic material.

The crosslinkable rubber composition for hose according to the invention has the following properties:

a hot-air crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours, and a hot-press crosslinked rubber sheet obtained by molding said rubber composition into a sheet and then subjecting the sheet to hot-press crosslinking has a volume resistivity (23° C.) of $10^3$ to $10^{16}$ Ω·cm, a tensile strength of 5 to 30 MPa and a compression set (CS) of not more than 70%, preferably not more than 50%, more preferably not more than 40%, still preferably not more than 30%, especially not more than 20%, after a heat treatment at 150° C. for 22 hours.

The rubber composition comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 80/20, preferably 65/35 to 80/20, more preferably 60/40 to 75/25, (ii) the iodine value (g/100 g) is in the range of 1 to 30, preferably 1 to 25, more preferably 2 to 20, particularly preferably 3 to 18, most preferably 4 to 15, (iii) the intrinsic viscosity (η) as measured in decalin at 135° C. is in the range of 0.3 to 5.0 dl/g, preferably 1.0 to 4.0 dl/g, more preferably 1.2 to 3.5 dl/g, particularly preferably 1.5 to 3.0 dl/g, and (iv) the branch index as measured by a kinematic viscoelasticity measuring machine is not less than 5, preferably not less than 7, more preferably not less than 9, particularly preferably not less than 10.

The crosslinkable rubber composition for hose according to the invention may further comprise a catalyst (E), or the catalyst (E) and a reaction inhibitor (F), if necessary, in addition to the ethylene/α-olefin/non-conjugated polyene random copolymer rubber (A) and the SiH group-containing compound (B).

As the catalyst (E), a platinum catalyst is preferably employed.

The hose according to the invention is formed from the above-described crosslinkable rubber composition for hose.

The crosslinkable rubber composition for hose according to the invention is favorably used for producing automobile water hose, automobile brake hose and industrial hose (for steam, water, air or the like).

The crosslinkable rubber composition for hose according to the invention has a high crosslinking rate and excellent productivity, is capable of undergoing hot-air crosslinking in which oxygen is present, for example, crosslinking in hot air vulcanization vessel, microwave vulcanization vessel or fluidized bed vulcanization vessel, and is capable of producing crosslinked rubber molded products (for hose) having excellent compression set resistance, electrical properties, strength properties and crosslinking rate. Further, even if no zinc oxide is added to the rubber composition, crosslinked rubber molded products for hose can be produced from the composition.

Since the hose of the invention comprises the crosslinked rubber molded product exhibiting the above effects, it can be widely used as an automobile hose, such as automobile brake hose or automobile water hose, and an industrial hose, such as steam hose, water hose or air hose.

The crosslinkable rubber composition for weatherstrip sponge according to the invention is crosslinkable by hot air and has the following properties:

a hot-air crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours, a specific gravity of 0.1 to 0.8 and a water absorption of not more than 50%.

This rubber composition comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 90/10, preferably 65/35 to 90/10, particularly preferably 65/35 to 85/15, (ii) the iodine value (g/100 g) is in the range of 1 to 30, preferably 1 to 25, particularly preferably 2 to 20, (iii) the intrinsic viscosity ($\eta$) as measured in decalin at 135° C. is in the range of 0.3 to 5 dl/g, preferably 0.3 to 4.5 dl/g, particularly preferably 0.5 to 4 dl/g, and (iv) the branch index as measured by a kinematic viscoelasticity measuring machine is not less than 3, preferably not less than 3.5, particularly preferably not less than 4.

The crosslinkable rubber composition for weatherstrip sponge according to the invention may further comprise a catalyst (E), or the catalyst (E) and a reaction inhibitor (F), or the catalyst (E), a reaction inhibitor and a blowing agent (G), if necessary, in addition to the ethylene/α-olefin/non-conjugated polyene random copolymer rubber (A) and the SiH group-containing compound (B).

As the catalyst (E), a platinum catalyst is preferably employed.

The crosslinkable rubber composition for weatherstrip sponge according to the invention is favorably used for producing weatherstrip sponge that is one of industrial products for automobile.

The weatherstrip sponge according to the invention comprises the above-described crosslinkable rubber composition for weatherstrip sponge.

The crosslinkable rubber composition for weatherstrip sponge according to the invention has a high crosslinking rate and excellent productivity to produce crosslinked rubber molded products (sponges), is capable of undergoing hot-air crosslinking such as HAV or UHF, and is capable of producing crosslinked rubber molded products (sponges) having excellent compression set resistance, strength properties, heat resistance, weathering resistance and abrasion resistance.

Since the crosslinked rubber molded product obtained from the crosslinkable rubber composition for weatherstrip sponge of the invention exhibits the above effects, it can be widely used for weatherstrip sponge.

The crosslinkable rubber composition for highly expanded sponge according to the invention is crosslinkable by hot air and has the following properties:

a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours, a specific gravity of 0.01 to 0.5, a water absorption of 1 to 500% and an Asker C hardness of 0.1 to 50.

This rubber composition comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 90/10, preferably 65/35 to 90/10, more preferably 65/35 to 85/15, particularly preferably 65/35 to 80/20, (ii) the iodine value (g/100 g) is in the range of 1 to 30, preferably 1 to 25, more preferably 2 to 20, particularly preferably 3 to 18, most preferably 4 to 15, (iii) the intrinsic viscosity ($\eta$) as measured in decalin at 135° C. is in the range of 0.3 to 4 dl/g, preferably 0.3 to 3.5 dl/g, more preferably 0.3 to 3 dl/g, particularly preferably 0.3 to 2.8 dl/g, and (iv) the branch index as measured by a kinematic viscoelasticity measuring machine is not less than 5.

The crosslinkable rubber composition for highly expanded sponge according to the invention may further comprise a catalyst (E), or the catalyst (E) and a reaction inhibitor (F), or a blowing agent (G), a polyolefin resin (D2) or a blowing assistant (H), if necessary, in addition to the ethylene/α-olefin/non-conjugated polyene random copolymer rubber (A) and the SiH group-containing compound (B).

As the catalyst (E), a platinum catalyst is preferably employed.

The highly expanded sponge according to the invention is formed from the above-described crosslinkable rubber composition for highly expanded sponge.

The crosslinkable rubber composition for highly expanded sponge according to the invention is favorably used for producing highly expanded sponges, such as heat insulating sponge, cushioning sponge, sealing sponge and flame-retardant sponge.

The crosslinkable rubber composition for highly expanded sponge according to the invention has a high crosslinking rate and excellent productivity, is capable of undergoing hot-air crosslinking such as HAV (hot air vulcanization vessel) or UHF (ultra high frequency electromagnetic wave), and is capable of producing crosslinked rubber expanded products (for highly expanded sponge) having excellent compression set resistance, expandability, non-staining properties, strength properties and crosslinking rate.

Since the highly expanded sponge according to the invention is formed from the crosslinked rubber expanded product exhibiting the above effects, it can be widely used as sealing sponge for automobile, sealing sponge for electric appliance, sealing sponge for building and civil engineering, heat insulating sponge for automobile, heat insulating sponge for electric appliance, heat insulating sponge for building and civil engineering, cushioning sponge for automobile, cushioning sponge for electric appliance, cushioning sponge for building and civil engineering, flame-retardant sponge for automobile, flame-retardant sponge for electric appliance, flame-retardant sponge for building and civil engineering, protecting sponge for automobile, protecting sponge for electric appliance, or protecting sponge for building and civil engineering.

The crosslinkable rubber composition for electric or electronic part according to the invention is crosslinkable by hot air and a hot press and has the following properties:
  a hot-air crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours, and
  a hot-press crosslinked rubber sheet obtained by molding said rubber composition into a sheet and then subjecting the sheet to hot-press crosslinking has a volume resistivity (23° C.) of $10^7$ to $10^{17}$ Ω·cm, a tensile strength of 3 to 20 MPa and a compression set (CS) of not more than 70%, preferably not more than 50%, more preferably not more than 40%, still preferably not more than 30%, especially not more than 20%, after a heat treatment at 150° C. for 22 hours.

This rubber composition comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:
  (i) the molar ratio (ethylene/α-olefin) of ethylene to an α-olefin of 3 to 20 carbon atoms is in the range of 60/40 to 90/10, preferably 65/35 to 90/10, more preferably 65/35 to 85/15, particularly preferably 65/35 to 80/20,
  (ii) the iodine value (g/100 g) is in the range of 1 to 30, preferably 1 to 25, more preferably 2 to 20, particularly preferably 3 to 18, most preferably 4 to 15,
  (iii) the intrinsic viscosity (η) as measured in decalin at 135° C. is in the range of 0.3 to 2.5 dl/g, preferably 0.3 to 2.4 dl/g, more preferably 0.3 to 2.3 dl/g, particularly preferably 0.3 to 2.2 dl/g, and
  (iv) the branch index as measured by a kinematic viscoelasticity measuring machine is not less than 5.

The crosslinkable rubber composition for electric or electronic part according to the invention may further comprise a catalyst (E), or the catalyst (E) and a reaction inhibitor (F), if necessary, in addition to the ethylene/α-olefin/non-conjugated polyene random copolymer rubber (A) and the SiH group-containing compound (B).

As the catalyst (E), a platinum catalyst is preferably employed.

The electric or electronic part according to the invention is formed from the above-described crosslinkable rubber composition for electric or electronic part.

The crosslinkable rubber composition for electric or electronic part according to the invention is favorably used for producing insulating electric or electronic parts, such as electric wire covering materials and electric insulating parts, and semi-conducting electric or electronic parts.

The crosslinkable rubber composition for electric or electronic part according to the invention has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products (for electric or electronic part, including sponges) having excellent compression set resistance, electrical properties, strength properties and crosslinking rate.

Since the electric or electronic part according to the invention is formed from the crosslinked rubber molded product exhibiting the above effects, it can be widely used as electric wire covering material (e.g., power cable, cabtire cord, electric wire for boat, electric insulating rubber tape, rubber mold stress cone, electric wire joint part), electric insulating household rubber part (e.g., anode cap, wedge), electric insulating part for automobile (e.g., plug cap, grommet, ignition cable, lamp socket cover), insulating electric or electronic part (e.g., terminal cover), or semi-conducting electric or electronic part.

The crosslinkable rubber composition for hydraulic cylinder seal according to the invention is crosslinkable by hot air and a hot press and has the following properties:
  a hot-air crosslinked rubber sheet obtained by molding said rubber composition into a sheet and then subjecting the sheet to hot-air crosslinking has no scratch on the surface in a pencil hardness test using a pencil of HB, and
  a hot-press crosslinked rubber sheet obtained by molding said rubber composition into a sheet and then subjecting the sheet to hot-press crosslinking has the following properties:
    (1) the compression set (CS) after a heat treatment at 150° C. for 22 hours is not more than 70%, preferably not more than 50%, more preferably not more than 40%, still preferably not more than 30%, especially not more than 20%,
    (2) the volume change (ΔV) after immersion in a DOT-3 brake liquid at 150° C. for 70 hours is in the range of −10 to +50%,
    (3) the tensile strength retention after heat aging at 150° C. for 70 hours is in the range of 50 to 150% and the elongation retention after the same heat aging is not less than 50%, and
    (4) the dry tensile strength is in the range of 3 to 25 MPa.

The above-mentioned rubber composition for hydraulic cylinder seal comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:
  (i) the molar ratio (ethylene/α-olefin) of ethylene to an α-olefin of 3 to 20 carbon atoms is in the range of 50/50 to 75/25, preferably 55/45 to 75/25, more preferably 60/40 to 75/25,
  (ii) the iodine value (g/100 g) is in the range of 1 to 30, preferably 1 to 25, more preferably 1 to 20, particularly preferably 1 to 18,
  (iii) the intrinsic viscosity (η) as measured in decalin at 135° C. is in the range of 0.3 to 2.5 dl/g, preferably 0.5 to 2.4 dl/g, more preferably 0.5 to 2.3 dl/g, particularly preferably 0.5 to 2.2 dl/g, and (iv) the branch index as measured by a kinematic viscoelasticity measuring machine is not less than 5, preferably not less than 7, more preferably not less than 9, particularly preferably not less than 10.

The crosslinkable rubber composition for hydraulic cylinder seal according to the invention may further comprise a catalyst (E), or the catalyst (E) and a reaction inhibitor (F), if necessary, in addition to the ethylene/α-olefin/non-conjugated polyene random copolymer rubber (A) and the SiH group-containing compound (B).

As the catalyst (E), a platinum catalyst is preferably employed.

The hydraulic cylinder part according to the invention is formed from the above-described crosslinkable rubber composition for hydraulic cylinder seal.

The crosslinkable rubber composition for hydraulic cylinder seal according to the invention is favorably used for producing aster cylinder of automobile hydraulic brake and clutch system, rubber cup of wheel cylinder, and disc seal of disc brake system.

The crosslinkable rubber composition for hydraulic cylinder seal according to the invention has a high crosslinking rate and excellent productivity, is capable of undergoing hot-air crosslinking such as HAV (hot air vulcanization vessel) or UHF (ultra high frequency electromagnetic wave), and is capable of producing crosslinked rubber molded products (for hydraulic cylinder part, including sponges) having excellent compression set resistance, heat aging resistance, liquid resistance and strength properties.

Since the hydraulic cylinder part according to the invention is formed from the crosslinked rubber molded product exhibiting the above effects, it can be widely used as an automobile cup/sealing material or an industrial equipment sealing material.

The crosslinkable rubber composition for seal packing according to the invention is crosslinkable by hot air and a hot press and has the following properties:

a hot-air crosslinked rubber sheet obtained by molding said rubber composition into a sheet and then subjecting the sheet to hot-air crosslinking has no scratch on the surface in a pencil hardness test using a pencil of HB, and a hot-press crosslinked rubber sheet obtained by molding said rubber composition into a sheet and then subjecting the sheet to hot-press crosslinking has the following properties:

(1) the compression set (CS) after a heat treatment at 150° C. for 22 hours is not more than 70%, preferably not more than 50%, more preferably not more than 40%, still preferably not more than 30%, especially not more than 20%, (2) the volume change (ΔV) after immersion in an ethylene glycol solution at 120° C. for 70 hours is in the range of −20 to +20%, (3) the tensile strength retention after heat aging at 150° C. for 70 hours is in the range of 50 to 150%, the elongation retention after the same heat aging is not less than 50%, and the hardness change after the same heat aging is in the range of 0 to +50 points, (4) the dry tensile strength is in the range of 3 to 20 MPa, and (5) the number of shots at which staining on the mold takes place in a mold stain test is not less than 30.

The rubber composition for seal packing of the invention having the above-mentioned properties comprises the ethylene/α-olefin/non-conjugated polyene random copolymer rubber (A) and the SiH group-containing compound (B) and has a crosslinking rate ($t_c(90)$) at 160° C. of not more than 15 minutes.

The ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 85/15, preferably 65/35 to 85/15, more preferably 65/35 to 80/20, (ii) the iodine value (g/100 g) is in the range of 0.5 to 30, preferably 1 to 25, more preferably 2 to 20, particularly preferably 3 to 18, most preferably 4 to 15, (iii) the intrinsic viscosity (η) as measured in decalin at 135° C. is in the range of 0.3 to 3.0 dl/g, preferably 0.3 to 2.5 dl/g, more preferably 0.3 to 2.3 dl/g, particularly preferably 0.3 to 2.2 dl/g, and (iv) the branch index as measured by a kinematic viscoelasticity measuring machine is not less than 5, preferably not less than 7, more preferably not less than 9, particularly preferably not less than 10.

This crosslinkable rubber composition may further comprise a catalyst (E), or the catalyst (E) and a reaction inhibitor (F), if necessary, in addition to the ethylene/α-olefin/non-conjugated polyene random copolymer rubber (A) and the SiH group-containing compound (B).

As the catalyst (E), a platinum catalyst is preferably employed.

The seal packing part according to the invention is formed from the above-described crosslinkable rubber composition for seal packing.

The crosslinkable rubber composition for seal packing according to the invention is favorably used for producing seal packing, such as household jar packing, hot water supply packing or industrial packing, and condenser seal packing.

The term "rubber composition for seal packing" used herein is intended to include a rubber composition for condenser seal packing.

The crosslinkable rubber composition for seal packing according to the invention has a high crosslinking rate, excellent productivity and excellent non-staining properties to mold is capable of undergoing hot-air crosslinking such as HAV or UHF, and is capable of producing crosslinked rubber molded products (for seal packing, including sponges) having excellent strength properties, scratch resistance, heat aging resistance, compression set resistance and chemical resistance.

Since the seal packing part according to the invention is formed from the crosslinked rubber molded product exhibiting the above effects, it can be widely used as seal packing, such as household jar packing, hot water supply packing or industrial packing, or condenser seal packing.

The rubber composition for constructional gasket according to the invention comprises:

5 to 100 parts by weight of the ethylene/α-olefin/non-conjugated polyene random copolymer rubber (A), 95% to 0 parts by weight of an organopolysiloxane (I) represented by the following average composition formula (1), the total amount of said components (A) and (I) being 100 parts by weight, $$R^1{}_n SiO_{(4-n)/2} \qquad (1)$$

wherein $R^1$ is an unsubstituted or substituted monohydrocarbon group, and n is a positive number of 1.95 to 2.05, a SiH group-containing compound (B1) having at least two SiH groups in one molecule in such an amount as gives 0.2 to 5 hydrogen atoms bonded to silicon atoms based on one aliphatic unsaturated bond in the component (A) and the component (I), and a platinum group metal catalyst (E1) in a catalytic amount.

This rubber composition may be an olefin rubber composition further containing 0.5 to 30 parts by weight of a blowing agent based on 100 parts by weight of the total of the component (A) and the component (I).

The constructional gasket according to the invention comprises a cured product of the above-described crosslinkable rubber composition (olefin rubber composition) for constructional gasket.

The gasket may comprise a cured sponge of the olefin rubber composition.

From the crosslinkable rubber composition for constructional gasket according to the invention, gaskets having excellent heat resistance, creep resistance and elasticity can be efficiently produced for a short period of time through compression molding and hot air vulcanization.

The constructional gasket according to the invention has high glass holding power, is excellent in weathering resistance, creep resistance and colorability and is stable to temperature change.

The rubber composition for rubber roll according to the invention comprises:

5 to 100 parts by weight of the ethylene/α-olefin/non-conjugated polyene random copolymer rubber (A), 95 to 0 parts by weight of an organopolysiloxane (I) represented by the following average composition formula (1), the total amount of said components (A) and (I) being 100 parts by weight, $$R^1{}_n SiO_{(4-n)/2} \tag{1}$$

wherein $R^1$ is an unsubstituted or substituted monohydrocarbon group, and n is a positive number of 1.95 to 2.05, a SiH group-containing compound (B1) having at least two SiH groups in one molecule in such an amount as gives 0.2 to 5 hydrogen atoms bonded to silicon atoms based on one aliphatic unsaturated bond in the component (A) and the component (I), and a platinum group metal catalyst (E1) in a catalytic amount.

The rubber composition for rubber roll may further comprise a conductive material to impart conductivity or semi-conductivity to a cured rubber layer of the composition.

From the crosslinkable rubber composition for rubber roll according to the invention, olefin rubber rolls having excellent heat resistance and elasticity can be efficiently produced for a short period of time through compression molding and hot air vulcanization.

The rubber roll according to the invention is free from increase of hardness that is observed when a rubber roll obtained by sulfur vulcanization is used in the high-temperature region, has excellent weathering resistance, and exhibits excellent elastomeric properties obtainable by hot air vulcanization extrusion molding. If the rubber roll of the invention is made electrically conductive, the conductive roll has stable electric resistance with small dispersion and hardly causes OPC staining that is conspicuously found particularly in silicon rolls. Hence, a semi-conducting roll of high stability, which is favorable as a developing roll, a transfer roll, an electric charge roll or the like, can be obtained.

The term "crosslinked rubber molded product" used herein sometimes indicates a non-expanded product, or sometimes indicates both of a non-expanded product and an expanded product.

BEST MODE FOR CARRYING OUT THE INVENTION

Figure 1:
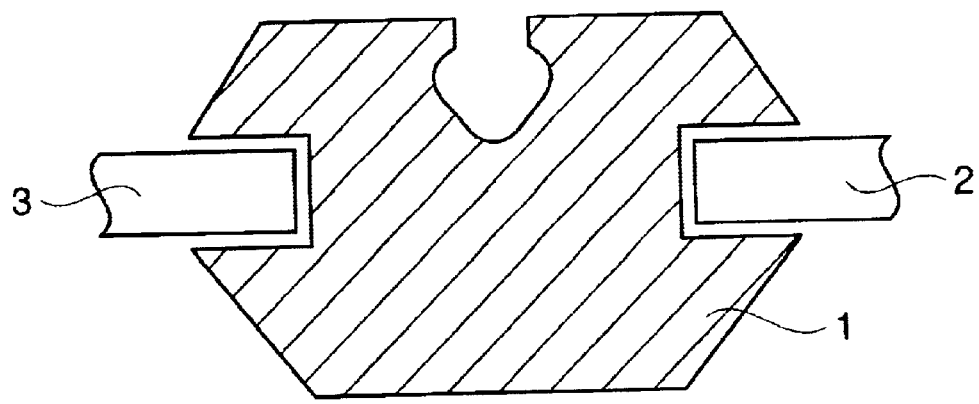
FIG. 1 is a sectional view of one embodiment of a gipper type gasket of the present invention, that is taken on line A—A in FIG. 2.

The crosslinkable (vulcanizable) rubber compositions according to the invention and uses thereof are described in detail hereinafter.

The first crosslinkable rubber composition according to the invention is crosslinkable by hot air and has the following properties:

a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70%, preferably not more than 50%, more preferably not more than 40%, still preferably not more than 30%, especially not more than 20%, after a heat treatment at 150° C. for 22 hours.

The second crosslinkable rubber composition of the invention comprises an ethylene/α-olefin/non-conjugated polyene random copolymer (A) and a SiH group-containing compound (B) having at least two SiH groups in one molecule and, if necessary, further comprise a catalyst (E) or the catalyst (E) and a reaction inhibitor (F).

The third crosslinkable rubber composition of the invention comprises and ethylene/α-olefin/non-conjugated polyene random copolymer (A1), and a SiH group-containing component (B) and, if necessary, further comprises a catalyst (E), or the catalyst (E) and a reaction inhibitor (F).

The fourth crosslinkable rubber composition of the invention comprises ethylene/α-olefin/non-conjugated polyene random copolymer (A), a SiH group-containing compound (B) and a polyolefin resin (D1) and, if necessary, further comprises a catalyst (E) or the catalyst (E) and a reaction inhibitor (F).

The fifth crosslinkable rubber composition of the invention comprises ethylene/α-olefin/non-conjugated polyene random copolymer (A), a SiH group-containing compound (B) and an alkenyl group-containing organopolysiloxane (C) and, if necessary, further comprises a catalyst (E) or the catalyst (E) and a reaction inhibitor (F).

Hereinafter, the above components will be described in detail.

Ethylene/α-olefin/non-conjugated Polyene Random Copolymer Rubber (A)

The ethylene/α-olefin/non-conjugated polyene random copolymer rubber (A) for use in the invention is a random copolymer of ethylene, an α-olefin of 3 to 20 carbon atoms and a non-conjugated polyene.

The ethylene/α-olefin/non-conjugated polyene random copolymer rubber (A) includes an ethylene/α-olefin/non-conjugated polyene random copolymer rubber (A1) of ethylene, an α-olefin of 3 to 20 carbon atoms and as non-conjugated polyenes a specific vinyl end group-containing norbornene compound (1) and another specific non-conjugated polyene compound (2).

Examples of the α-olefins of 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. Of these, preferable are α-olefins of 3 to 10 carbon atoms, and particularly preferable are propylene, 1-butene, 1-hexene and 1-octene.

These α-olefins are used singly or in combination of two or more kinds.

The non-conjugated polyene for use in the invention is a vinyl end group-containing norbornene compound represented by the following formula (I) or (II).

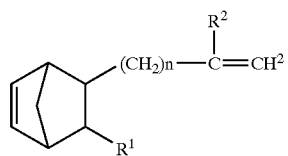

In the formula (I), n is an integer of 0 to 10, and $R^1$ is a hydrogen atom or an alkyl group of 1 to 10 carbon atoms.

Examples of the alkyl groups of 1 to 10 carbon atoms indicated by $R^1$ include methyl, ethyl, propyl, isopropyl, n-butyl, isobutyl, sec-butyl, t-butyl, n-pentyl, isopentyl, t-pentyl, neopentyl, hexyl, isohexyl, heptyl, octyl, nonyl and decyl.

$R^2$ is a hydrogen atom or an alkyl group of 1 to 5 carbon atoms.

Examples of the alkyl groups of 1 to 5 carbon atoms indicated by $R^2$ include alkyl groups of 1 to 5 carbon atoms selected from the examples described above with respect to $R^1$.

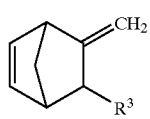

In the formula (II), $R^3$ is a hydrogen atom or an alkyl group of 1 to 10 carbon atoms.

Examples of the alkyl groups indicated by $R^3$ include the same alkyl groups as described above with respect to $R^1$.

Examples of the norbornene compounds represented by the formula (I) or (II) include 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene and 5-(1,2,3-trimethyl-4-pentenyl)-2-norbornene. Of these, preferable are 5-vinyl-2-norbornene, 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene. These norbornene compounds can be used singly or in combination.

With the norbornene compound such as 5-vinyl-2-norbornene, a non-conjugated polyene compound (2) containing a group represented by the following formula (III) can be used in combination within limits not detrimental to the aimed properties of the invention.

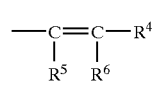

In the formula (III), $R^4$ is an alkyl group of 1 to 10 carbon atoms, and $R^5$ and $R^6$ are each independently a hydrogen atom or an alkyl group of 1 to 10 carbon atoms.

Examples of the alkyl groups of 1 to 10 carbon atoms indicated by $R^4$, $R^5$ and $R^6$ include methyl, ethyl, propyl, isopropyl, n-butyl, isobutyl, sec-butyl, t-butyl, n-pentyl, isopentyl, t-pentyl, neopentyl, hexyl, isohexyl, heptyl, octyl, nonyl and decyl.

Examples of the non-conjugated polyene compounds (2) containing a group represented by the formula (III) include:

chain non-conjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene and 6-methyl-1,6-undecadiene;

cyclic non-conjugated dienes, such as methyltetrahydroindene, 5-ethylidene-2-norbornene, 5-isopropylidene-2-norbornene, 5-vinylidene-2-norbornene, 6-chloromethyl-5-isopropenyl-2-norbornene and dicyclopentadiene; and trienes, such as 2,3-diisopropylidene-5-norbornene, 2-ethylidene-3-isopropylidene-5-norbornene, 2-propenyl-2,2-norbornadiene, 4-ethylidene-8-methyl-1,7-nonadiene and 4,8-dimethyl-1,4,8-decatriene. When these compounds are used in combination with the norbornene compound (1), adhesion properties and oil resistance after environmental deterioration are improved.

The ethylene/α-olefin/non-conjugated polyene random copolymer rubber (A) composed of the above components has the following properties.
(i) Molar Ratio (Ethylene/α-olefin) of Ethylene to α-olefin of 3 to 20 Carbon Atoms In the ethylene/α-olefin/non-conjugated polyene random copolymer rubber (A), constituent units (a) derived from ethylene and constituent units (b) derived from the α-olefin of 3 to 20 carbon atoms (sometimes referred to as "α-olefin" simply hereinafter) are contained in a molar ratio ((a)/(b)) of 40/60 to 95/5, preferably 50/50 to 90/10, more preferably 55/45 to 85/15, particularly preferably 60/40 to 80/20. When the molar ratio is in the above range, a rubber composition capable of providing a crosslinked rubber molded product excellent in low-temperature resistance and processability as well as in heat aging resistance, strength properties and elastomeric properties can be obtained.
(ii) Iodine Value The iodine value of the ethylene/α-olefin/non-conjugated polyene random copolymer rubber (A) is in the range of 0.5 to 50 (g/100 g), preferably 0.8 to 40 (g/100 g), more preferably 1 to 30 (g/100 g), particularly preferably 1.5 to 25 (g/100 g). When the iodine value is in the above range, a rubber composition having high crosslinking efficiency can be obtained, and besides a rubber composition capable of providing a crosslinked rubber molded product excellent in environmental deterioration resistance (i.e., heat aging resistance) as well as in compression set resistance can be obtained. An iodine value exceeding 50 is unfavorable because of disadvantageous cost.

(iii) Intrinsic Viscosity

The intrinsic viscosity ($\eta$) of the ethylene/α-olefin/non-conjugated polyene random copolymer rubber (A), as measured in decalin at 135° C., is in the range of 0.3 to 10 dl/g, usually 0.5 to 10 dl/g, preferably 0.6 to 8 dl/g, more preferably 0.7 to 6 dl/g, particularly preferably 0.8 to 5 dl/g. When the intrinsic viscosity ($\eta$) is in the above range, a rubber composition capable of providing a crosslinked rubber molded product excellent in processability as well as in strength properties and compression set resistance can be obtained.

(iv) Molecular Weight Distribution (Mw/Mn)

The molecular weight distribution (Mw/Mn) of the ethylene/α-olefin/non-conjugated polyene random copolymer rubber (A), as measured by GPC, is in the range of 2 to 200, preferably 3 to 50, more preferably 3.3 to 40, particularly preferably 3.5 to 30. For example, the molecular weight distribution (Mw/Mn) is in the range of 2 to 200, preferably 2.5 to 150, more preferably 3 to 120, particularly preferably 5 to 100. When the molecular weight distribution (Mw/Mn) is in the above range, a rubber composition capable of providing a crosslinked rubber molded product excellent in strength properties as well as in processability can be obtained.

(v) Effective Network Chain Density (ν) (Indication of Crosslink Density)

The effective network chain density (ν), as measured after the ethylene/α-olefin/non-conjugated polyene random copolymer rubber (A) is press crosslinked at 170° C. for 10 minutes using 0.01 mol of dicumyl peroxide based on 100 g of the copolymer rubber (A), is not less than $1.5 \times 10^{20}$ chains/cm$^3$, preferably not less than $1.8 \times 10^{20}$ chains/cm$^3$, more preferably not less than $2.0 \times 10^{20}$ chains/cm$^3$. When the effective network chain density (ν) is not less than $1.5 \times 10^{20}$ chains/cm$^3$, a rubber composition capable of providing a crosslinked rubber molded product having excellent compression set resistance can be obtained.

(vi) Log(γ2/γ1)/ν

The ratio between a ratio (γ2/γ1) of a shear rate γ2 at a shear stress of $2.4 \times 10^6$ dyn/cm$^2$ obtained from a melt flow curve and the ethylene/α-olefin/non-conjugated polyene random copolymer rubber (A) at 100° C. to a shear rate γ1 at a shear stress of $0.4 \times 10^6$ dyn/cm$^2$ obtained from the melt flow curve and the above-mentioned effective network chain density (ν) satisfies the following formula (III):

$$0.04 \times 10^{-19} \leq \mathrm{Log}(\gamma 2/\gamma 1)/\nu \leq 0.20 \times 10^{-19} \qquad \text{(III)}.$$

As for the ethylene/α-olefin/non-conjugated polyene random copolymer rubber (A), the ratio (Log(γ2/γ1)/ν) of Log(γ2/γ1) to the effective network chain density (ν) is in the range of $0.04 \times 10^{-19}$ to $0.20 \times 10^{-19}$, preferably $0.042 \times 10^{-19}$ to $0.19 \times 10^{-19}$, more preferably $0.050 \times 10^{-19}$ to $0.18 \times 10^{-19}$. When the Log(γ2/γ1)/ν ratio is in the above range, a rubber composition capable of providing a crosslinked rubber molded product excellent in strength properties and compression set resistance as well as in processability can be obtained.

The ethylene/α-olefin/non-conjugated polyene random copolymer rubber (A) preferably has the following property. (vii) branch index as measured by a kinematic viscoelasticity measuring machine The branch index of the ethylene/α-olefin/non-conjugated polyene random copolymer rubber (A), as measured by a kinematic viscoelasticity measuring machine, is desirably not less than 5, preferably not less than 7, more preferably not less than 9, particularly preferably not less than 10. When the branch index is less than 5, the viscosity at high sheer-rate region becomes high thereby to decrease flowability, as a result that roll processability and extrusion processability become bad.

The ethylene/α-olefin/non-conjugated polyene random copolymer rubber (A1) for use in the second crosslinkable rubber composition of the invention has the following properties.

(i) Molar Ratio (Ethylene/α-olefin) of Ethylene to α-olefin of 3 to 20 Carbon Atoms In the ethylene/α-olefin/non-conjugated polyene random copolymer rubber (A1), constituent units (a) derived from ethylene and constituent units (b) derived from the α-olefin of 3 to 20 carbon atoms (sometimes referred to as "α-olefin" simply hereinafter) are contained in a molar ratio ((a)/(b)) of 40/60 to 95/5, preferably 50/50 to 90/10, more preferably 55/45 to 85/15, particularly preferably 60/40 to 80/20.

When the molar ratio is in the above range, a rubber composition capable of providing a crosslinked rubber molded product excellent in low-temperature resistance and processability as well as in heat aging resistance, strength properties and elastomeric properties can be obtained.

(ii) Iodine Value

The iodine value of the ethylene/-olefin/non-conjugated polyene random copolymer rubber (A1) is in the range of 0.5 to 50 (g/100 g), preferably 0.8 to 40 (g/100 g), more preferably 1 to 30 (g/100 g), particularly preferably 1.5 to 25 (g/100 g).

It is preferred that the ratio ((x)/(y)) of the iodine value (x) derived from the non-conjugated polyene represented by the formula (I) or (II) to the iodine value (y) derived from the non-conjugated polyene containing a group represented by the formula (III) be in the range of 1/50 to 50/1, preferably 1/30 to 30/1, more preferably 1/10 to 10/1, still more preferably 1/5 to 5/1, particularly preferably 2/1 to 1/2. When the (x)/(y) ratio is smaller than 1/50, the degree of crosslinking is decreased to thereby lower compression set resistance. Moreover, the number of the long-chain branches is decreased to thereby lower flowability, and as a result, processability becomes bad. On the other hand, when the (x)/(y) ratio is larger than 50/1, adhesion properties and oil resistance after aging become bad.

When the iodine value is in the above range, a rubber composition having high crosslinking efficiency can be obtained, and besides a rubber composition capable of providing a crosslinked rubber molded product excellent in environmental deterioration resistance (i.e., heat aging resistance) as well as in compression set resistance can be obtained. An iodine value exceeding 50 is unfavorable because of disadvantageous cost.

(iii) Intrinsic Viscosity

The intrinsic viscosity ($\eta$) of the ethylene/α-olefin/non-conjugated polyene random copolymer rubber (A1), as measured in decalin at 135° C., is in the range of 0.3 to 10 dl/g, preferably 0.5 to 8 dl/g, more preferably 0.7 to 6 dl/g, particularly preferably 0.8 to 5 dl/g. When the intrinsic viscosity ($\eta$) is in the above range, a rubber composition capable of providing a crosslinked rubber molded product excellent in processability as well as in strength properties and compression set resistance can be obtained.

(iv) Branch Index Measured by Kinematic Viscoelasticity Measuring Machine

The branch index of the ethylene/α-olefin/non-conjugated polyene random copolymer rubber (A1), as measured by a kinematic viscoelasticity measuring machine, is not less than 5, preferably not less than 7, more preferably not less than 9, particularly preferably not less than 10. When the branch index is less than 5, the viscosity in the high shear rate region is increased to thereby lower flowability, and as a result, roll processability and extrusion processability become bad.

The ethylene/α-olefin/non-conjugated polyene random copolymer rubber (A1) preferably has the following properties (v) to (vii) in addition to the above properties (i) to (iv).

(v) Molecular Weight Distribution (Mw/Mn)

The molecular weight distribution (Mw/Mn) of the ethylene/α-olefin/non-conjugated polyene random copolymer rubber (A1), as measured by GPC, is in the range of 2 to 200, preferably 2.5 to 150, more preferably 3 to 120, particularly preferably 5 to 100.

When the molecular weight distribution (Mw/Mn) is in the above range, a rubber composition capable of providing a crosslinked rubber molded product excellent in strength properties as well as in processability can be obtained.

The effective network chain density (ν) (indication of crosslink density) (vi) and the Log(γ2/γ1)/ν ratio (vii) are identical with the properties (v) and (vi) of the ethylene/α-olefin/non-conjugated polyene random copolymer rubber (A).

The ethylene/α-olefin/non-conjugated polyene random copolymer rubber (A) is obtained by random copolymerizing ethylene, the α-olefin of 3 to 20 carbon atoms and the vinyl end group-containing norbornene compound represented by the formula (I) or (II) using a catalyst containing the following compounds (J) and (K) as main components under the conditions of a polymerization temperature of 30 to 60° C., particularly 30 to 59° C., a polymerization pressure of 4 to 12 kgf/cm², particularly 5 to 8 kgf/cm², and a feed rate molar ratio (non-conjugated polyene/ethylene) of the non-conjugated polyene to ethylene ranging from 0.01 to 0.2. It is preferable to conduct the copolymerization in a hydrocarbon medium.

(J) A soluble vanadium compound represented by $VO(OR)_nX_{3-m}$ (R is a hydrocarbon group, X is a halogen atom, and n is 0 or an integer of 1 to 3), or a vanadium compound represented by $VX_4$ (X is a halogen atom).

The soluble vanadium compound (J) is soluble in a hydrocarbon medium of the polymerization reaction system, and is specifically a vanadium compound represented by the formula VO(OR)aXb or V(OR)cXd (R is a hydrocarbon group, $0 \leq a \leq 3$, $0 \leq b \leq 3$, $2 \leq a+b \leq 3$, $0 \leq c \leq 4$, $0 \leq d \leq 4$ and $3 \leq c+d \leq 4$) or an electron donor adduct thereof.

More specifically, there can be mentioned, for example, $VOCl_3$, $CO(OC_2H_5)Cl_2$, $CO(OC_2H_5)_2Cl$, $VO(O\text{-iso-}C_3H_7)Cl_2$, $VO(O\text{-n-}C_4H_5)Cl_2$, $VO(OC_2H_5)_3$, $VOBr_3$, $VCl_4$, $VOCl_3$, $VO(O\text{-n-}C_4H_9)_3$ and $VCl_3 \cdot 2OC_6H_{12}OH$.

(K) An organoaluminum compound represented by $R'_mAlX'_{3-m}$ (R' is a hydrocarbon group, X' is a halogen atom, and m is a numeral in the range of 1 to 3).

Examples of the organoaluminum compounds (K) include:

trialkylaluminums, such as triethylaluminum, tributylaluminum and triisopropylaluminum;

dialkylaluminum alokoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having average composition represented by $R^1_{0.5}Al(OR^1)_{0.5}$ or the like;

dialkylaluminum halides, such as diethylaluminum chloride, dibutylaluminum chloride and diethylaluminum bromide;

partially halogenated alkylaluminums, such as alkylaluminum sesquihalides (e.g., ethylaluminum sesquichloride, butylaluminum sesquichloride, ethylaluminum sesquibromide) and alkylaluminum dihalides (e.g., ethylaluminum dichloride, propylaluminum dichloride, butylaluminum dibromide);

partially hydrogenated alkylaluminums, such as dialkylaluminum hydrides (e.g., diethylaluminum hydride, dibutylaluminum hydride) and alkylaluminum dihydrides (e.g., ethylaluminum dihydride, propylaluminum dihydride): and partially alkoxylated and halogenated alkylaluminums, such as ethylaluminum ethoxychloride, butylaluminum butoxychloride and ethylaluminum ethoxybromide.

In the present invention, a soluble vanadium compound represented by VOCl3 selected from the compounds (J) and a blend of $Al(OC_2H_5)_2Cl/Al_2(OC_2H_5)_3Cl_3$ (blending ratio: not less than 1/5) selected from the compounds (K) are preferably used as the catalyst components, whereby an ethylene/α-olefin/non-conjugated polyene random copolymer rubber (A) having an insoluble content of not more than 1% after Soxhlet extraction (solvent: boiling xylene, extraction time: 3 hours, mesh: 325) can be obtained.

As the catalyst for the copolymerization, a "metallocene catalyst", e.g., a metallocene catalyst described in Japanese Patent Laid-Open Publication No. 40586/1997, may be used.

The ethylene/α-olefin/non-conjugated polyene random copolymer rubber (A) for use in the invention may be graft modified with a polar monomer such as an unsaturated carboxylic acid or its derivative (e.g., acid anhydride, ester).

Examples of the unsaturated carboxylic acids include acrylic acid, methacrylic acid, maleic acid, fumaric acid, itaconic acid, citraconic acid, tetrahydrophthalic acid and bicyclo(2,2,1)hept-2-ene-5,6-dicarboxylic acid.

Example of the anhydrides of unsaturated carboxylic acids include maleic anhydride, itaconic anhydride, citraconic anhydride, tetrahydrophthalic anhydride and bicyclo (2,2,1)hept-2-ene-5,6-dicarboxylic anhydride. Of these, maleic anhydride is preferable.

Examples of the unsaturated carboxylic esters include methyl acrylate, methyl methacrylate, dimethyl maleate, monomethyl maleate, dimethyl fumarate, dimethyl itaconate, diethyl citraconate, dimethyl tetrahydrophthalate and dimethyl bicyclo(2,2,1)hept-2-ene-5,6-dicarboxylate. Of these, methyl acrylate and ethyl acrylate are preferable.

The graft modifiers (graft monomers) such as the unsaturated carboxylic acids are used singly or in combination of two or more kinds, and in each case, the graft quantity is not more than 0.1 mol based on 100 g of the ethylene/α-olefin/non-conjugated polyene random copolymer rubber (A) before the graft modification.

When an ethylene/α-olefin/non-conjugated polyene random copolymer rubber (A) having the above graft quantity is used, a rubber composition having excellent flowability (molding processability) and capable of providing a crosslinked rubber molded product having excellent low-temperature resistance can be obtained.

The graft modified ethylene/α-olefin/non-conjugated polyene random copolymer rubber (A) can be obtained by allowing the unmodified ethylene/α-olefin/non-conjugated polyene random copolymer rubber (A) to react with the unsaturated carboxylic acid or its derivative in the presence of a radical initiator.

The graft reaction may be carried out in a solution state or a molten state. In case of the graft reaction in a molten state, it is most efficient and favorable to conduct the reaction continuously in an extruder.

Examples of the radical initiators for use in the graft reaction include:

dialkyl peroxides, such as dicumyl peroxide, di-t-butyl peroxide, di-t-butylperoxy-3,3,5-trimethylcyclohexane, t-butylcumyl peroxide, di-t-amyl peroxide, t-butyl hydroperoxide, 2,5-dimethyl-2,5-di(t-butylperoxy)hexyne-3, 2,5-dimethyl-2,5-di(benzoylperoxy)hexane, 2,5-dimethyl-2,5-di(t-butylperoxy)hexane and α,α'-bis(t-butylperoxy-m-isopropyl)benzene;

peroxy esters, such as t-butyl peroxyacetate t-butyl peroxyisobutyrate, t-butyl peroxypivalate, t-butyl peroxymaleate, t-butyl peroxyneodecanoate, t-butyl peroxybenzoate and di-t-butyl peroxyphthalate;

ketone peroxides, such as dicyclohexanone peroxide; and mixtures thereof. Of these, preferable are organic peroxides in which a temperature at which the half-life period corresponds to one minute ranges 130 to 200° C., and particularly preferable are dicumyl peroxide, di-t-butyl peroxide, di-t-butylperoxy-3,3,5-trimethylcyclohexane, t-butylcumyl peroxide, di-t-amyl peroxide and t-butyl hydroperoxide.

Examples of the polar monomers other than the unsaturated carboxylic acids and their derivatives (e.g., acid anhydrides, esters) include hydroxyl group-containing ethylenically unsaturated compounds, amino group-containing ethylenically unsaturated compounds, epoxy group-containing ethylenically unsaturated compounds, aromatic vinyl compounds, vinyl ester compounds and vinyl chloride.

SiH Group-containing Compound (B)

The SiH group-containing compound (B) for use in the invention reacts with the ethylene/α-olefin/non-conjugated polyene random copolymer rubber (A) and functions as a crosslinking agent. There is no specific limitation on the molecular structure of the SiH group-containing compound (B), and resins heretofore manufactured, such as those of linear, cyclic, branched and three-dimensional network structures, are employable. However, it is required that at least two (preferably three or more) hydrogen atoms bonded to silicon atoms (i.e., SiH group) are contained in one molecule.

As the SiH group-containing compound (B), a compound represented by the following composition formula is generally employable.

In the above composition formula, $R^7$ is a substituted or unsubstituted mono-valent hydrocarbon group of 1 to 10 carbon atoms, preferably 1 to 8 carbon atoms, except a group having an aliphatic unsaturated bond. Examples of such mono-valent hydrocarbon groups include the alkyl groups previously exemplified with respect to $R^1$ in the formula (I), phenyl and halogen-substituted alkyl groups such as trifluoropropyl. Of these, preferable are methyl, ethyl, propyl, phenyl and trifluoropropyl, and particularly preferable are methyl and phenyl.

b is a number satisfying the condition of 0≦b<3, preferably 0.6<b<2.2, particularly preferably 1.5≦b≦2; c is a number satisfying the condition of 0<c≦3, preferably 0.002≦c<2, particularly preferably 0.01≦c≦1; and b+c is a umber satisfying the condition of 0<b+c≦3, preferably 1.5<b+c≦2.7.

The SiH group-containing compound (B) is an organohydrogen polysiloxane having preferably 2 to 1000 silicon atoms, particularly preferably 2 to 300 silicon atoms, most preferably 4 to 200 silicon atoms, in one molecule. Examples of such compounds include:

siloxane oligomers, such as 1,1,3,3-tetramethyldisiloxane, 1,3,5,7-tetramethyltetracyclosiloxane and 1,3,5,7,8-pentamethylpentacyclosiloxane; and methylhydrogenpolysiloxane terminated with trimethylsiloxy groups at the both ends of molecular chain, a copolymer of dimethylsiloxane and methylhydrogensiloxane, which is terminated with trimethylsiloxy groups at the both ends of molecular chain, methylhydrogenpolysiloxane terminated with silanol groups at the both ends of molecular chain, a copolymer of dimethylsiloxane and methylhydrogensiloxane, which is terminated with silanol groups at the both ends of molecular chain, dimethylpolysiloxane terminated with dimethylhydrogensiloxy groups at the both ends of molecular chain, a copolymer of dimethylpolysiloxane and methylhydrogensiloxane, which is terminated with dimethylhydrogensiloxy groups at the both ends of molecular chain, and a silicone resin comprising $R^7_2$(H)SiO$_{1/2}$ unit and SiO$_{4/2}$ unit and capable of containing $R^7_3$SiO$_{1/2}$ unit, $R^7_2$SiO$_{2/2}$ unit, $R^7$(H)SiO$_{2/2}$ unit, (H)SiO$_{3/2}$ unit or $R^7$SiO$_{3/2}$ unit.

The methylhydrogenpolysiloxane terminated with trimethylsiloxy groups at the both ends of molecular chain is, for example, a compound represented by the following formula or a compound wherein a part of or all of methyl groups in the following formula are substituted with ethyl, propyl, phenyl, trifluoropropyl or the like.

wherein d is an integer of 2 or more.

The copolymer of dimethylsiloxane and methylhydrogensiloxane, which is terminated with trimethylsiloxy groups at the both ends of molecular chain is, for example, a compound represented by the following formula or a compound wherein a part of or all of methyl groups in the following formula are substituted with ethyl, propyl, phenyl, trifluoropropyl or the like.

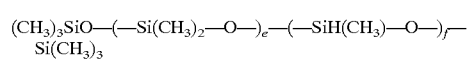

wherein e is an integer of 1 or more, and f is an integer of 2 or more.

The methylhydrogenpolysiloxane terminated with silanol groups at the both ends of molecular chain is, for example, a compound represented by the following formula or a compound wherein a part of or all of methyl groups in the following formula are substituted with ethyl, propyl, phenyl, trifluoropropyl or the like.

The copolymer of dimethylsiloxane and methylhydrogensiloxane, which is terminated with silanol groups at the both ends of molecular chain is, for example, a compound represented by the following formula or a compound wherein a part of or all of methyl groups in the following formula are substituted with ethyl, propyl, phenyl, trifluoropropyl or the like.

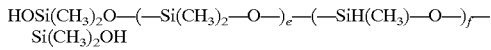

wherein e is an integer of 1 or more, and f is an integer of 2 or more.

The dimethylpolysiloxane terminated with dimethylhydrogensiloxy groups at the both ends of molecular chain is, for example, a compound represented by the following formula or a compound wherein a part of or all of methyl groups in the following formula are substituted with ethyl, propyl, phenyl, trifluoropropyl or the like.

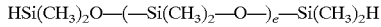

wherein e is an integer of 1 or more.

The methylhydrogenpolysiloxane terminated with dimethylhydrogensiloxy groups at the both ends of molecular chain is, for example, a compound represented by the following formula or a compound wherein a part of or all of methyl groups in the following formula are substituted with ethyl, propyl, phenyl, trifluoropropyl or the like.

wherein e is an integer of 1 or more.

The copolymer of dimethylsiloxane and methylhydrogensiloxane, which is terminated with dimethylhydrogensiloxy groups at the both ends of molecular chain is, for example, a compound represented by the following formula or a compound wherein a part of or all of methyl groups in the following formula are substituted with ethyl, propyl, phenyl, trifluoropropyl or the like.

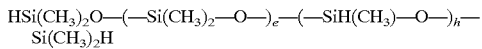

wherein e and h are each an integer of 1 or more.

The above compounds can be prepared by conventional processes. For example, octamethylcyclotetrasiloxane and/or tetramethylcyclotetrasiloxane, and a compound containing triorganosilyl group or diorganohydrogensiloxy group capable of becoming an end group, such as hexamethyldisiloxane or 1.3-dihydro-1,1,3,3-tetramethyldisiloxane, are equilibrated at a temperature of about −10 to about +40° C. in the presence of a catalyst, such as sulfuric acid, trifluoromethanesulfonic acid or methanesulfonic acid.

The SiH group-containing compound (B) is used in an amount of 0.1 to 100 parts by weight, preferably 0.1 to 75 parts by weight, more preferably 0.1 to 50 parts by weight, still more preferably 0.2 to 30 parts by weight, still more preferably 0.2 to 20 parts by weight, particularly preferably 0.5 to 10 parts by weight, most preferably 0.5 to 5 parts by weight, based on 100 parts by weight of the ethylene/α-olefin/non-conjugated polyene random copolymer rubber (A) or based on 100 parts by weight of the total of the ethylene/α-olefin/non-conjugated polyene random copolymer rubber (A) and the alkenyl group-containing organopolysiloxane (C). When the SiH group-containing compound (B) is used in the above amount, a rubber composition capable of forming a crosslinked rubber molded product (including sponge) having excellent compression set resistance, moderate crosslink density and excellent strength properties and excellent elongation properties can be obtained. Use of the SiH group-containing compound (B) in an amount exceeding 100 parts by weight is unfavorable because of disadvantageous cost.

The ratio (SiH group/aliphatic unsaturated group) of the SiH groups to the aliphatic unsaturated groups participating in the crosslink of the ethylene/α-olefin/non-conjugated polyene random copolymer rubber (A) is in the range of 0.2 to 20, preferably 0.5 to 10, particularly preferably 0.7 to 5.

The SiH group-containing compound (B) for use in the rubber composition for constructional gasket or rubber roll may be linear, cyclic or branched, and a known organohydrogen polysiloxane is employable. In general, it is desirable to use a SiH group-containing compound (B1) represented by the following average composition formula:

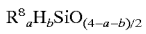

wherein each $R^8$ is the same or different and is a unsubstituted or substituted mono-valent hydrocarbon group, such as an alkyl group of 1 to 12 carbon atoms, particularly 1 to 8 carbon atoms, an alkenyl group, an aryl group, an aralkyl group or any of these groups substituted with halogen. Specific examples of the groups include alkyl groups, such as methyl, ethyl and propyl; cycloalkyl groups, such as cyclohexyl; alkenyl groups, such as vinyl, allyl, butenyl and hexenyl; aryl groups, such as phenyl and tolyl; aralkyl groups, such as benzyl, 2-phenylethyl and 2-phenylpropyl; and groups wherein at least a part of hydrogen atoms are replaced with halogen atoms, such as 3,3,3-trifluoropropyl. a and b are positive numbers satisfying the conditions of $1 \leq a \leq 2.2$, $0.002 \leq b \leq 1$ and $1.002 \leq a+b \leq 3$.

The organohydrogenpolysiloxane has two or more (preferably three or more) SiH groups in one molecule, and these groups may be present at the terminals of the molecular chain or may be present midway the molecular chain. The organohydrogenpolysiloxane preferably has a viscosity at 25° C. of 0.5 to 10,000 cSt, particularly 1 to 300 cSt.

Examples of the organohydrogenpolysiloxanes include compounds of the following structural formulas.

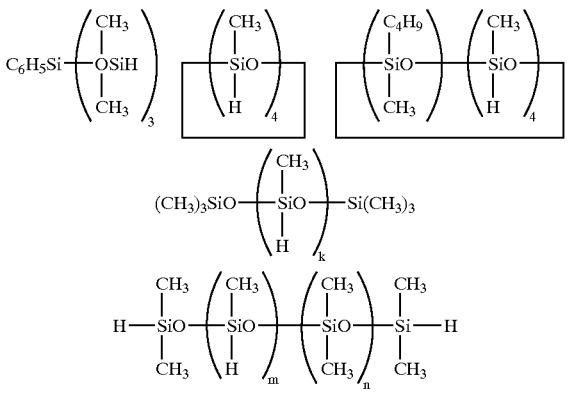

In the above formulas, k is an integer of 2 to 10, and m and n are each an integer of 0 to 10.

The organohydrogenpolysiloxane is added in an amount of 0.1 to 40 parts by weight based on 100 parts by weight of the total of the component (A) and the component (B). The number of hydrogen atoms bonded to silicon atoms (≡SiH group) is in the range of 0.5 to 10, preferably 0.7 to 5, based on one aliphatic unsaturated bond (e.g., akenyl group, diene group) in the component (A) and the component (B). When the number is smaller than 0.5, crosslinking may be insufficiently made, and satisfactory mechanical strength may not be obtained in some cases. When the number is larger than 10, physical properties of the cured product are likely to be lowered, so that heat resistance and compression set resistance may be markedly decreased.

Alkenyl Group-containing Organopolysiloxane (C)

The alkenyl group-containing organopolysiloxane (C) for use in the fifth crosslinkable rubber composition of the invention is represented by the following average composition formula (1).

$$R^9_n SiO_{(4-n)/2} \quad (1)$$

wherein each $R^9$ is the same or different and is an unsubstituted or substituted mono-valent hydrocarbon group, and n is a positive number of 1.98 to 2.02.

$R^9$ is preferably a mono-valent hydrocarbon group of 1 to 10 carbon atoms, particularly 1 to 8 carbon atoms. Examples of such groups include aliphatic saturated hydrocarbon groups, such as alkyl groups (e.g., methyl, ethyl, propyl, butyl) and cycloalkyl groups (e.g., cyclohexyl); alkenyl groups, such as vinyl, allyl, butenyl and hexenyl; aryl groups, such as phenyl and tolyl; and groups wherein a part of or all of hydrogen atoms in the above groups are replaced with a halogen atom or a cyano group, such as chloromethyl, trifluoropropyl and cyanoethyl. Of these, preferable are methyl, vinyl, phenyl and trifluoropropyl.

The organopolysiloxane (C) is required to have at least two alkenyl groups, preferably at least two alkenyl groups of 2 to 8 carbon atoms, particularly preferably at least two vinyl groups. The content of the alkenyl groups in $R^9$ is in the range of preferably 0.001 to 20% by mol, particularly preferably 0.025 to 6% by mol.

Although the alkenyl group-containing organopolysiloxane (C) represented by the formula (1) is desired to be basically linear, the compounds of the formula (1) having different molecular structures (e.g., linear, branched) may be used singly or in combination of two or more kinds.

The average degree of polymerization of the organopolysiloxane (C) is preferably in the range of 100 to 20,000, particularly preferably 3,000 to 10,000.

Examples of the organopolysiloxanes (C) include:

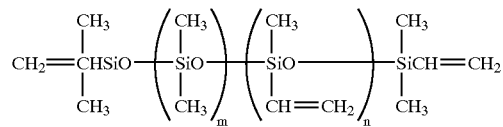

wherein m is a positive integer, and n is a positive number of 0 or more;

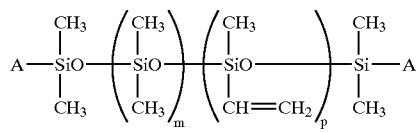

wherein m is a positive integer, p is an integer of 2 or more, and A is —$CH_3$ group or —OH group; and compounds wherein the following unit is introduced into the above main chains.

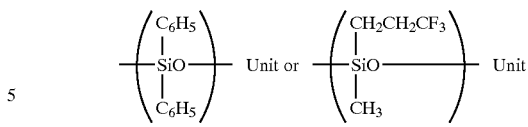

The organopolysiloxane (C) can be synthesized by a known process. The process for synthesizing the alkenyl group-containing organopolysiloxane (C) is described in detail, for example, as a process for synthesizing a silicone rubber in Japanese Patent Application No. Laid-Open Publication No. 116811/1999.

In the present invention, the blending ratio ((A)/(C)) of the ethylene/α-olefin/non-conjugated polyene random copolymer rubber (A) to the alkenyl group-containing organopolysiloxane (C) is in the range of 2/98 to 98/2, preferably 3/97 to 97/3, more preferably 5/95 to 95/5. When the blending ratio is in the above range, a rubber composition capable of producing a crosslinked rubber molded product having excellent scratch resistance, compression set resistance and abrasion resistance and capable of producing a crosslinked rubber molded product hardly, causing stain on the mold and having excellent strength properties in the press crosslinking molding or injection crosslinking molding can be obtained.

Polyolefin Resin (D1)

The polyolefin resin (D1) for use in the fourth crosslinkable rubber composition of the invention is a thermoplastic resin. Examples of the polyolefin resins (D1) include:

ethylene homopolymers (polyethylene), such as high-density polyethylene (HDPE), medium-density polyethylene (MDPE), low-density polyethylene (LDPE) and linear low-density polyethylene (LLDPE), and crystalline ethylene/α-olefin copolymers of ethylene and α-olefins of 3 to 20 carbon atoms, preferably 3 to 8 carbon atoms;

polypropylenes, such as a propylene homopolymer, a propylene block copolymer and a propylene random copolymer; and crystalline homopolymers or copolymers of α-olefins of 3 to 20 carbon atoms, preferably 3 to 8 carbon atoms, such as propylene, 1-butene, 4-methyl-1-pentene, 1-hexene, 1-heptene and 1-octene.

The polyolefin resin (D1) has a melting point of not higher than 250° C. Of the above resins, polyethylene and polypropylene are preferable, and polypropylene is particularly preferable.

When a blowing agent is added to the fourth crosslinkable rubber composition of the invention, a crystalline α-olefin homopolymer or copolymer comprising an α-olefin of 3 to 8 carbon atoms (preferably polypropylene), which has a Vicat softening point of not lower than 130° C., preferably not lower than 140° C., is desirably used as the polyolefin resin (D1).

In the present invention, the blending ratio ((D1)/(A)) of the polyolefin resin (D1) to the ethylene/α-olefin/non-conjugated polyene random copolymer rubber (A) is in the range of 5/95 to 50/50, preferably 10/90 to 40/60. When the polyolefin resin (D1) is used in the above ratio, elastomeric properties can be retained.

The polyolefin resin (D1) such as polyethylene has not only a function of allowing a reinforcing agent or a filler to enhance the product hardness to almost the same level as given by carbon black but also a function of decreasing the viscosity of a rubber compound at a processing temperature to thereby improve processability of the rubber compound.

When polypropylene is used as the polyolefin resin (D1) in an amount of not more than 50 parts by weight based on 100 parts by weight of the total of the polypropylene and the ethylene/α-olefin/non-conjugated polyene random copolymer rubber (A), the resulting rubber compound has a "sea-island" structure wherein the copolymer rubber (A) phase is sea and the polypropylene phase is island. The island of the polypropylene phase plays a role of a reinforcing agent and is melted at a temperature higher than the melting point to decrease the rubber compound viscosity to thereby enhance flowability of the rubber compound.

In the present invention, the ethylene/α-olefin/non-conjugated polyene random copolymer rubber (A) and the polyolefin resin (D1) can be blended by kneading them at a temperature higher than the melting point of the polyolefin resin (D1) using a rubber kneading machine generally used, such as a Banbury mixer, an internal mixer, a kneader or an open roll. In this method, however, there is much probability that the poorly kneaded polyolefin resin (D1) becomes a foreign matter, so that preferable is a method described in WO97/02316, that is, a method in which the ethylene/α-olefin/non-conjugated polyene random copolymer rubber (A) and the polyolefin resin (D1) are sufficiently melted in an extruder and they are blended until the polyolefin resin (D1) is microdispersed in the ethylene/α-olefin/non-conjugated polyene random copolymer rubber (A).

Polyolefin Resin (D2)

In the crosslinkable rubber composition for highly expanded sponge according to the invention, a polyolefin resin (D2) may be used, if necessary. As the polyolefin resin (D2), a resin having a melting point in the crosslinking/expanding process is preferably selected. The polyolefin resin (D2) is melted in the crosslinking/expanding process to decrease the viscosity of the rubber compound, and therefore the expandability is enhanced or the expanded state is stabilized.

Examples of the polyolefin resins (D2) include:

ethylene homopolymers (polyethylene), such as high-density polyethylene (HDPE), medium-density polyethylene (MDPE), low-density polyethylene (LDPE) and linear low-density polyethylene (LLDPE), and crystalline ethylene/α-olefin copolymers of ethylene and α-olefins of 3 to 20 carbon atoms, preferably 3 to 8 carbon atoms;

polypropylenes, such as a propylene homopolymer, a propylene block copolymer and a propylene random copolymer; and crystalline homopolymers or copolymers of α-olefins of 3 to 20 carbon atoms, preferably 3 to 8 carbon atoms, such as propylene, 1-butene, 4-methyl-1-pentene, 1-hexene, 1-heptene and 1-octene.

The polyolefin resin (D2) has a melting point of not higher than 250° C. Of the above resins, polyethylene and polypropylene are preferable, and polypropylene is particularly preferable.

When a blowing agent is added to the rubber composition of the invention, a crystalline α-olefin homopolymer or copolymer comprising an α-olefin of 3 to 8 carbon atoms (preferably polypropylene), which has a Vicat softening point of not lower than 130° C., preferably not lower than 140° C., is desirably used as the polyolefin resin (D2).

In the present invention, the blending ratio ((A)/(D2)) of the ethylene/α-olefin/non-conjugated polyene random copolymer rubber (A) to the polyolefin resin (D2) is in the range of 5/95 to 50/50, preferably 10/90 to 40/60. When the polyolefin resin (D2) is used in the above ratio, elastomeric properties can be retained.

Catalyst (E)

The catalyst (E) that is optionally used is an addition reaction catalyst, and is not specifically limited as far as it accelerates addition reaction (hydrosilyl reaction of alkene) of the alkenyl group of the ethylene/α-olefin/non-conjugated polyene random copolymer rubber (A) with the SiH group of the SiH group-containing compound (B) or (B1). For example, addition reaction catalysts comprising platinum group elements (i.e., Group 8 metal type catalysts of Group 8 metals, Group 8 metal complexes or Group 8 metal compounds), such as a platinum catalyst, a palladium catalyst and a rhodium catalyst, are employable. Of these, the platinum catalyst is preferable.

As the platinum catalyst, a known platinum catalyst for use in curing of addition reaction curable resins is generally used. For example, a finely divided metallic platinum catalyst described in U.S. Pat. No. 2,970,150, a chloroplatinic acid catalyst described U.S. Pat. No. 2,823,218, a complex compound of platinum and hydrocarbon described in U.S. Pat. No. 3,159,601 and U.S. Pat. No. 3,159,662, a complex compound of chloroplatinic acid and an olefin described in U.S. Pat. No. 3,516,946, and a complex compound of platinum and vinylsiloxane described in U.S. Pat. No. 3,775,452 and U.S. Pat. No. 3,814,780 are employable. More specifically, there can be mentioned platinum alone (platinum black), chloroplatinic acid, a platinum/olefin complex, a platinum/alcohol complex, and platinum supported on a carrier such as alumina or silica.

Examples of the palladium catalysts include palladium, a palladium compound and chloropalladium acid, and examples of the rhodium catalysts include rhodium, a rhodium compound and chlororhodium acid.

Examples of the catalysts (E) other than the above catalysts include Lewis acid and cobalt carbonyl.

The catalyst (E) is used in an amount, in terms of Pt metal, of 0.1 to 100,000 ppm by weight, preferably 0.1 to 10,000 ppm by weight, more preferably 1 to 1,000 ppm by weight, particularly preferably 4.1 to 500 ppm by weight, especially 5 to 100 ppm by weight based on the ethylene/α-olefin/non-conjugated polyene random copolymer rubber (A) (and the alkenyl group-containing organopolysiloxane (C)).

When the catalyst (E) is used in the above amount, a rubber composition capable of producing a crosslinked rubber molded product having moderate crosslink density, excellent strength properties and excellent elongation properties can be obtained. Use of the catalyst (E) in an amount exceeding 100,000 ppm by weight is unfavorable because of disadvantageous cost.

In the present invention, a crosslinked rubber molded product may be obtained by irradiating an uncrosslinked rubber molded product of the rubber composition containing no catalyst (E) with a light, γ rays, electron rays or the like.

For the rubber composition for constructional gasket or rubber roll according to the invention, a platinum group metal catalyst, particularly platinum or a platinum compound, is preferably employed. The catalyst is added in such an amount that the addition reaction is accelerated, and in general, the catalyst is used in an amount of 1 ppm to 1% by weight, preferably 10 to 100 ppm, in terms of a platinum group metal. The reason why the amount of the catalyst is not less than 1 ppm is as follows. If the amount thereof is less than 1 ppm, the crosslinking reaction is not accelerated sufficiently, resulting in insufficient curing and expanding. On the other hand, the reason why the amount of the catalyst is not more than 1% by weight is as follows. Even if the amount thereof is more than 1% by weight, the influence on the reactivity is small and such use is economically disadvantageous.

For the purpose of adjusting the curing rate, an addition crosslinking regulator may be used in addition to the catalyst. Specifically, ethynylcyclohexanol, tetracyclomethylvinylpolysiloxane or the like is employable.

Reaction Inhibitor (F)

In the present invention, a reaction inhibitor (F) is optionally used together with the catalyst (E). Examples of the reaction inhibitors (E) include benzotriazole, ethynyl group-containing alcohols (e.g., ethynylcyclohexanol), acrylonitrile, amide compounds (e.g., N,N-diallylacetamide, N,N-diallylbenzamide, N,N,N',N'-tetraallyl-o-phthalic acid diamide, N,N,N',N'-tetraallyl-m-phthalic acid diamide, N,N,N',N'-tetraallyl-o-phthalic acid diamide), sulfur, phosphorus, nitrogen, amine compounds, sulfur compounds, phosphorus compounds, tin, tin compounds, tetramethyltetravinylcyclotetrasiloxane, and organic peroxides such as hydroperoxide.

The reaction inhibitor (F) is used in an amount of 0 to 50 parts by weight, usually 0.0001 to 50 parts by weight, preferably 0.0001 to 30 parts by weight, more preferably 0.0001 to 20 parts by weight, still more preferably 0.0001 to 10 parts by weight, particularly preferably 0.0001 to 5 parts by weight, based on 100 parts by weight of the ethylene/α-olefin/non-conjugated polyene random copolymer rubber (A) (and the alkenyl group-containing organopolysiloxane (C)).

When the reaction inhibitor (F) is used in an amount of not more than 50 parts by weight, a rubber composition having a high crosslinking rate and excellent productivity to produce crosslinked rubber molded products can be obtained. Use of the reaction inhibitor in an amount exceeding 50 parts by weight is unfavorable because of disadvantageous cost.

Blowing Agent (G)

In the present invention, a blowing agent (G) is optionally used. Examples of the blowing agents (G) are given below, but even if a blowing agent is not used, expansion can be carried out by adjusting the amount of the SiH group-containing compound. In this case, the expansion is carried out by utilizing dehydrogenation reaction of OH group present on the surface of an additive such as carbon black or silica with the SiH group. On this account, the ratio of the SiH group to the aliphatic unsaturated group participating in the crosslink of the ethylene/α-olefin/non-conjugated polyene random copolymer rubber (A) is required to be not less than 1 (SiH group/aliphatic unsaturated group, by mol), preferably 1.5 to 2.0.

When the SiH group/aliphatic unsaturated group molar ratio is adjusted to be in the above range, the SiH group-containing compound (B) not participating in the crosslinking undergoes dehydrogenation reaction, whereby an expanded product is obtained. Therefore, in order to produce an expanded product, presence of OH group such as that of carbon black, silica, stearic acid or the like is essential.

In order to adjust the expansion ratio or the water absorption ratio, use of the following blowing agents and blowing assistants is better than use of the above reaction, and by the use of them, the desired expanded product can be easily obtained.

Examples of the blowing agents (G) include:

inorganic blowing agents, such as sodium bicarbonate, sodium carbonate, ammonium bicarbonate, ammonium carbonate and ammonium nitrite;

nitroso compounds, such as N,N'-dimethyl-N,N'-dinitrosoterephthalamide and N,N'-dinitrosopentamethylenetetramine;

azo compounds, such as azodicarbonamide, azobisisobutyronitrile, azocyclohexylnitrile, azodiaminobenzene and barium azodicarboxylate;

sulfonyl hydrazide compounds, such as benzenesulfonyl hydrazide, toluenesulfonyl hydrazide, p,p'-oxybis(benzenesulfonylhydrazide) and diphenylsulfone-3,3'-disulfonyl hydrazide; and azide compounds, such as calcium azide, 4,4-diphenyldisulfonyl azide and p-toluenesulfonyl azide.

The blowing agent is used in an amount of 0.5 to 30 parts by weight, preferably 1 to 20 parts by weight, based on 100 parts by weight of the ethylene/α-olefin/non-conjugated polyene random copolymer rubber (A) (and the alkenyl group-containing organopolysiloxane (C)). When the blowing agent is used in the above amount, an expanded product having an apparent specific gravity of 0.03 to 0.8 $g/cm^3$ can be produced, but it is desirable to appropriately determine the optimum amount according to the property values required.

As a blowing agent, plastic hollow microparticles are employable. The plastic hollow microparticles are characterized by being expanded with heat. The plastic which forms outer shells of the hollow microparticles is selected from plastics having suitable softening temperatures in consideration of the curing temperature of the rubber composition.

Blowing Assistant (H)

In the present invention, a blowing assistant (H) may be optionally used in combination with the blowing agent (G). The blowing assistant (H) has a function of decreasing the decomposition temperature of the blowing agent (G), a function of accelerating decomposition thereof and a function of forming uniform bubbles.

Examples of the blowing assistants (H) include organic acids, such as salicylic acid, phthalic acid, stearic acid and oxalic acid, urea, and derivatives thereof.

The blowing assistant (H) is used in an amount of 0 to 30 parts by weight, preferably 0.1 to 15 parts by weight, more preferably 0.5 to 10 parts by weight, based on 100 parts by weight of the ethylene/α-olefin/non-conjugated polyene random copolymer rubber (A), but it is desirable to appropriately determine the optimum amount according to the property values required.

For example, the blowing assistant (H) is used in an amount of 0.01 to 10 parts by weight, preferably 0.1 to 5 parts by weight, based on 100 parts by weight of the ethylene/α-olefin/non-conjugated polyene random copolymer rubber (A) (and the alkenyl group-containing organopolysiloxane (C)).

Organopolysiloxane (I)

The organopolysiloxane (I) for use in the rubber composition for constructional gasket or rubber roll according to the invention is represented by the following average composition formula (1).

$$R^1{}_n SiO_{(4-n)/2} \quad (1)$$

In the formula (1), $R^1$ is an unsubstituted or substituted mono-valent hydrocarbon group of 1 to 10 carbon atoms, preferably 1 to 8 carbon atoms. Examples of such groups include alkyl groups, such as methyl, ethyl, propyl, butyl, hexyl and octyl; cycloalkyl groups, such as cyclopentyl and cyclohexyl; alkenyl groups, such as vinyl, allyl and propenyl; cycloalkenyl groups; aryl groups, such as phenyl and tolyl; aralkyl groups, such as benzyl and phenylethyl; and halogenated hydrocarbon groups or cyanated hydrocarbon groups wherein a part of or all of hydrogen atoms in the above groups are replaced with organic groups such as chlorine atom, fluorine atom or organic groups, such as cyano group.

The main chain of the organopolysiloxane preferably consists of dimethylsiloxane units or is preferably one wherein diphenylsiloxane unit, methylvinylsiloxane unit or methyl-3,3,3-trifluoropropylsiloxane unit having phenyl group, vinyl group or 3,3,3-trifluoropropyl group is introduced into a part of the dimethylpolysiloxane main chain. In this case, the organopolysiloxane (I) is preferably an organopolysiloxane having two or more aliphatic unsaturated groups such as alkenyl groups or cycloalkenyl groups in one molecule, and is more preferably an organopolysiloxane wherein the content of the aliphatic unsaturated group (particularly vinyl group) in $R^1$ is in the range of 0.01 to 20% by mol, particularly 0.02 to 10% by mol. Although the aliphatic unsaturated groups may be present at the terminals of the molecular chain, midway the molecular chain or at the both places, they are preferably present at least at the terminals of the molecular chain. n is a positive number of 1.95 to 2.05.

The organopolysiloxane (I) for use in the invention is, for example, an organopolysiloxane terminated with trimethylsilyl groups, dimethylphenylsilyl groups, dimethylhydroxysilyl groups, dimethylvinylsilyl groups, trivinylsilyl groups or the like at the ends of the molecular chain. Example of the organopolysiloxanes (I) particularly preferably used are methylvinylpolysiloxane, methylphenylvinylpolysiloxane and methyltrifluoropropylvinylpolysiloxane. The organopolysiloxane (I) can be obtained by, for example, hydrolysis (co)condensation of one or more organohalogenosilanes or ring-opening polymerization of cyclic polysiloxane (dimer or tetramer of siloxane) using an alkaline or acid catalyst. The organopolysiloxane is basically a linear diorganopolysiloxane but may be a mixture of two or more kinds having different molecular structures. The viscosity of the organopolysiloxane (I) at 25° C. is preferably not less than 100 centistokes (cSt), particularly preferably 100,000 to 100,000,000 cSt. The degree of polymerization of the organopolysiloxane (I) is preferably not less than 100, particularly preferably 3,000 to 20,000.

In the present invention, a mixture of the ethylene/α-olefin/non-conjugated polyene random copolymer rubber (A) and the organopolysiloxane (I) in a mixing weight ratio therebetween of preferably 100:0 to 5:95, more preferably 100:0 to 60:40, still more preferably 100:0 to 70:30, is used as the rubber component.

Other Components

The crosslinkable rubber compositions according to the invention can be used in the uncrosslinked state, but when they are used as crosslinked products such as crosslinked rubber molded products or crosslinked rubber expanded products, their properties can be most conspicuously exhibited.

To the crosslinkable rubber compositions of the invention, hitherto known additives, such as rubber reinforcing agent, inorganic filler, softener, anti-aging agent, processing aid, vulcanization accelerator, organic peroxide, crosslinking assistant, colorant, dispersant, flame retardant and electrically conductive material, can be added according to the intended uses, within limits not detrimental to the objects of the invention.

The rubber reinforcing agent functions to increase mechanical properties of the crosslinked rubber, such as tensile strength, tear strength and abrasion resistance. Examples of the rubber reinforcing agents include carbon black, such as SRF, GPF, FEF, HAF, ISAF, SAF, FT and MT, carbon black surface treated with silane coupling agent or the like, finely divided silicic acid, and silica.

Examples of silica include fumed silica and precipitated silica. The silica may be surface treated with reactive silane, such as hexamethyldisilazane, chlorosilane or alkoxysilane, or low-molecular weight siloxane. The specific surface area (BED method) of the silica is preferably not less than 50 $m^2/g$, more preferably 100 to 400 $m^2/g$.

Although the type and the amount of the rubber reinforcing agent can be appropriately determined according to the intended use, the rubber reinforcing agent is used in an amount of usually at most 300 parts by weight, preferably at most 200 parts by weight, based on 100 parts by weight of the ethylene/α-olefin/non-conjugated polyene random copolymer rubber (A) (and the alkenyl group-containing organopolysiloxane (C)).

Examples of the inorganic fillers include light calcium carbonate, heavy calcium carbonate, talc and clay.

Although the type and the amount of the inorganic filler can be appropriately determined according to the intended use, the inorganic filler is used in an amount of usually at most 300 parts by weight, preferably at most 200 parts by weight, based on 100 parts by weight of the ethylene/α-olefin/non-conjugated polyene random copolymer rubber (A) (and the alkenyl group-containing organopolysiloxane (C)).

As the softener, a softener generally used for rubbers is employable.

Examples of such softeners include:

petroleum type softeners, such as process oil, lubricating oil, paraffin, liquid paraffin, petroleum asphalt and vaseline;

coal tar type softeners, such as coal tar and coal tar pitch;

fatty oil type softeners, such as castor oil, linseed oil, rape seed oil, coconut oil;

tall oil;

factice;

waxes, such as beeswax, carnauba wax and lanolin;

fatty acids and fatty acid salts, such as ricinoleic acid, palmitic acid, barium stearate, calcium stearate and zinc laurate; and synthetic polymer materials, such as petroleum resin, atactic polypropylene and coumarone-indene resin. Of these, preferably used are petroleum type softeners, and particularly preferably used is process oil.

The amount of the softener is appropriately determined according to the intended use of the vulcanized product.

Examples of the anti-aging agents include those of amine type, hindered phenol type and sulfur type. The anti-aging agent is used in an amount not detrimental to the objects of the invention.

The amine type anti-aging agents employable in the invention are, for example, dipenylamines and phenylenediamines.

Examples of the dipheylamines include p-(p-toluenesulfonylamido)diphenylamine, 4,4'-(α,α-dimethylbenzyl)diphenylamine, 4,4'-dioctyldiphenylamine, a high-temperature reaction product of diphenylamine and acetone, a low-temperature reaction product of diphenylamine and acetone, a low-temperature reaction product of diphenylamine, aniline and aceton, a reaction product of diphenylamine and diisobutylene, octylated diphenylamine, dioctylated diphenylamine, p,p'-dioctyldiphenylamine and alkylated diphenylamine.

Examples of the phenylenediamines include p-phenylenediamines, such as N,N'-diphenyl-p-phenylenediamine, n-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-(1,3-dimethylbutyl)-N'-phenyl-p-phenylenediamine, phenylhexyl-p-phenylenediamine and phenyloctyl-p-phenylenediamine.

Of these, particularly preferable are 4,4'-(α,α-dimethylbenzyl)diphenylamine and N,N'-di-2-naphthyl-p-phenylenediamine.

These compounds can be used singly or in combination.

Examples of the hindered phenol type anti-aging agents include:

(1) 1,1,3-tris(2-methyl-4-hydroxy-5-t-butylphenyl)butane,
(2) 4,4'-butylidenebis(3-methyl-6-t-butylphenol),
(3) 2,2-thiobis(4-methyl-6-t-butylphenol),
(4) 7-octyldecyl-3-(4'-hydroxy-3',5'-di-t-butylphenyl)propionate,
(5) tetrakis(methylene-3-(3',5'-di-t-butyl-4'-hydroxyphenyl)propionate)methane,
(6) pentaerythritol-tetrakis(3-(3,5,-di-t-butyl-4-hydroxyphenyl)propionate),
(7) triethylene glycol-bis(3-(3-t-butyl-5-methyl-4-hydroxyphenyl)propionate),
(8) 1,6-hexanediol-bis(3-(3,5-di-t-butyl-4-hydroxyphenyl)propionate),
(9) 2,4-bis(n-octylthio)-6-(4-hydroxy-3,5-di-t-butylanilino)-1,3,5-triazine,
(10) tris(3,5-di-t-butyl-4-hydroxybenzyl)isocyanurate,
(11) 2,2-thiodiethylenebis(3-(3,5-di-t-butyl-4-hydroxyphenyl)propionate),
(12) N,N'-hexamethylenebis(3,5-di-t-butyl-4-hydroxy)hydrocinnamide,
(13) 2,4-bis((octylthio)methyl)-o-cresol,
(14) 3,5-di-t-butyl-4-hydroxybenzyl phosphonate diethyl ester,
(15) tetrakis(methylene(3,5-di-t-butyl-4-hydroxyhydrocinnamate))methane,
(16) octadecyl-3-(3,5-di-t-butyl-4-hydroxyphenyl)propionate, and
(17) 3,9-bis(2-(3-(3-t-butyl-4-hydroxy-5-methylphenyl)propionyloxy)-1,1-dimethylethyl)-2,4,8,10-tetraoxaspiro(5,5)undecane.

Of these, preferable are the phenol compounds (5) and (17).

As the sulfur type anti-aging agent, a sulfur type anti-aging agent generally used for rubbers is employable in the invention.

Examples of such sulfur type anti-aging agents include:
imidazole type anti-aging agents, such as 2-mercaptobenzimidazole, zinc salt of 2-mercaptobenzimidazole, 2-mercaptomethylbenzimidazole, zinc salt of 2-mercaptomethylbenzimidazole and zinc salt of 2-mercaptomethylimidazole; and
aliphatic thioether type anti-aging agents, such as dimyristyl thiodipropionate, dilauryl thiodipropionate, distearyl thiodipropionate, ditridecyl thiodipropionate and pentaerythritol-tetrakis(β-lauryl-thiopropionate).

Of these, preferable are 2-mercaptobenzimidazole, zinc salt of 2-mercaptobenzimidazole, 2-mercaptomethylbenzimidazole, zinc salt of 2-mercaptomethylbenzimidazole and zinc salt and pentaerythritol-tetrakis(β-lauryl-thiopropionate).

As the processing aid, a compound generally used for rubbers is employable.

Examples of such processing aids include higher fatty acids, such as ricinoleic acid, stearic acid, palmitic acid and lauric acid; salts of higher fatty acids, such as barium stearate, zinc stearate and calcium stearate; and esters of higher fatty acids such as ricinoleic acid, stearic acid, palmitic acid and lauric acid.

The processing aid is used in an amount of usually not more than 10 parts by weight, preferably not more than 5 parts by weight, based on 100 parts by weight of the ethylene/α-olefin/non-conjugated polyene random copolymer rubber (A), but it is desirable to appropriately determine the optimum amount according to the property values required.

In the present invention, an organic peroxide may be used in addition to the aforesaid catalyst (E) to conduct both of addition crosslinking and radical crosslinking. The organic peroxide is used in an amount of about 0.1 to 10 parts by weight based on 100 parts by weight of the ethylene/α-olefin/non-conjugated polyene random copolymer rubber (A). As the organic peroxide, a hitherto known organic peroxide generally used for rubber crosslinking is employable.

When the organic peroxide is used, a crosslinking assistant is preferably used in combination.

Examples of the crosslinking assistants include sulfur; quinone dioxime compounds, such as p-quinone dioxime; methacrylate compounds, such as polyethylene glycol dimethacrylate; allyl compounds, such as diallyl phthalate and triallyl cyanurate; maleimide compounds; and divinylbenzene. The crosslinking assistant is used in an amount of 0.5 to 2 mol based on 1 mol of the organic peroxide used, preferably about equimolar amount.

To the crosslinkable rubber compositions of the invention, other known rubbers may be further added in amounts not detrimental to the objects of the invention.

Examples of such rubbers include isoprene type rubbers, such as natural rubber (NR) and isoprene rubber (IR); and conjugated diene type rubbers, such as butadiene rubber (BR), styrene-butadiene rubber (SBR), acrylonitrile-butadiene rubber (NBR) and chloroprene rubber (CR).

Moreover, hitherto known ethylene/α-olefin copolymer rubbers are employable. For example, an ethylene/propylene random copolymer (EPR) and an ethylene/α-olefin/polyene copolymer other than the ethylene/α-olefin/non-conjugated polyene random copolymer rubber (A), such as EPDM, are employable.

There is no specific limitation on the type and the amount of the conductive material for use in the invention, as far as the volume resistivity of, for example, the rubber material in the rubber roll according to the invention becomes not more than $1 \times 10^{10}$ Ω·cm, but it is preferable to use conductive carbon black, conductive carbon fiber, conductive zinc white and conductive titanium oxide singly or in combination of two or more kinds.

Rubber Composition and Uses Thereof

The crosslinkable rubber compositions of the invention are favorably used for producing automobile weatherstrip, automobile hose, water supply hose, gas hose, automobile rubber vibration insulator, railway rubber vibration insulator, industrial equipment rubber vibration insulator, earthquake proof rubber for construction, transmission belt, conveyor belt, automobile cup/sealing material, industrial equipment sealing material, automobile weatherstrip sponge, constructional sealing sponge or other expanded products, covered electric wire, electric wire joint, electric insulating part, semi-conducting rubber part, OA machine roll, industrial roll, household rubber product, etc.

Examples of the automobile weatherstrips include door weatherstrip, trunk weatherstrip, luggage weatherstrip, roof side rail weatherstrip, slide door weatherstrip, ventilator weatherstrip, sliding loop panel weatherstrip, front window weatherstrip, rear window weatherstrip, quarter window weatherstrip, lock pillar weatherstrip, door glass outer weatherstrip, door glass inner weatherstrip, dam windshield, glass run channel, door mirror bracket, seal head lamp and seal cowl top.

Examples of the automobile hoses include brake hose, radiator hose, heater hose and air cleaner hose.

Examples of the automobile rubber vibration insulators include engine mount, liquid seal engine mount, damper pulley, chain damper, carburetor mount, torsional damper, strut mount, rubber bush, bumper rubber, helper rubber, spring sheet, shock absorber, air spring, body mount, bumper guard, muffler support, rubber coupling, center bearing supporter, clutch rubber, deaf mount, suspension bush, slide bush, cushion strut bar, stopper, handle damper, radiator supporter and muffler hanger.

Examples of the railway rubber vibration insulators include slab mat, ballast mat and track mat.

Examples of the industrial equipment rubber vibration insulators include expansion joint, flexible joint, bush and mount.

Examples of the transmission belts include V-belt, flat belt and synchronous belt.

Example of the conveyor belts include light conveyor belt, cylindrical belt, rough top belt, flanged conveyor belt, U-type guided conveyor belt and V guided conveyor belt.

Examples of the automobile cup/sealing materials include master cylinder piston cup, wheel cylinder piston cup, uniform motion joint boot, pin boot, dust cover, piston seal, packing, O-ring and diaphragm.

Examples of the industrial equipment sealing materials include condenser packing, O-ring and packing.

Examples of the automobile weatherstrip sponges include door weatherstrip sponge, bonnet weatherstrip sponge, trunk room weatherstrip sponge, sunshine roof weatherstrip sponge, ventilator weatherstrip sponge and corner sponge.

Examples of the sealing sponges for construction include sealing sponges for gasket, airtight, joint and door stop.

Examples of other expanded products include hose-protecting sponge, cushioning sponge, heat insulating sponge and insulation pipe.

Examples of the OA machine rolls include electric charge roll, transfer roll, developing roll and paper feed roll.

Examples of the industrial rolls include iron manufacturing roll, paper manufacturing roll and printing electric wire roll.

Examples of the household rubber products include rain wear, rubber band, shoe, rubber glove, latex and golf ball.

The rubber compositions of the invention can be crosslinked at ordinary temperature and are favorably used for reaction injection molding (RIM). Further, the rubber compositions can be used for producing thermoplastic elastomers or modifying engineering plastics.

The automobile weatherstrip, hose (automobile hose, water supply hose, gas hose), rubber vibration insulator (automobile rubber vibration insulator, railway rubber vibration insulator, industrial equipment rubber vibration insulator, earthquake proof rubber for construction), belt (transmission belt, conveyor belt), sealing material (automobile cup/sealing material, industrial equipment sealing material), expanded product (automobile weatherstrip sponge, constructional sealing sponge, another expanded product), covered electric wire, electric wire joint, electric insulating part, semi-conducting rubber part, OA machine roll, industrial roll and household rubber product according to the invention comprise the crosslinkable rubber compositions of the invention.

Preparation of Rubber Composition and Crosslinked Rubber Molded Product Thereof

As described above, the crosslinkable rubber compositions of the invention can be used in the uncrosslinked state, but when they are used as crosslinked products such as crosslinked rubber molded products or crosslinked rubber expanded products, their properties can be most conspicuously exhibited.

For producing the crosslinked products from the crosslinkable rubber compositions of the invention, an uncrosslinked compounded rubber is first prepared, and the compounded rubber is molded into a desired shape and then crosslinked by a method similar to that for vulcanization (crosslinking) of conventional rubbers.

As the crosslinking method, any of a heating method using a crosslinking agent (SiH group-containing compound (B)) and a method of irradiation with a light, γ rays or electron rays may be adopted.

The crosslinkable rubber compositions according to the invention can be prepared by, for example, the following process.

The crosslinkable rubber compositions of the invention, e.g., the fifth crosslinkable rubber composition, can be prepared as follows. The ethylene/α-olefin/non-conjugated polyene random copolymer rubber (A), the alkenyl group-containing organopolysiloxane (C), and if necessary, additives such as a rubber reinforcing agent, an inorganic filler and a softener are kneaded by an internal mixer (closed mixing machine) such as a Banbury mixer, a kneader or an intermixer at a temperature of 80 to 170° C. for 3 to 10 minutes, then the SiH group-containing compound (B), and if necessary, the catalyst (E), the reaction inhibitor (F), the vulcanization accelerator, the crosslinking assistant, the blowing agent (G) and the blowing assistant (H) are added and mixed by means of rolls such as open rolls or a kneader, and then preferably the mixture is further kneaded at a roll temperature of not higher than 80° C. for 1 to 30 minutes, followed by sheeting.

In the present invention, the ethylene/α-olefin/non-conjugated polyene random copolymer rubber (A), the alkenyl group-containing organopolysiloxane (C), the rubber reinforcing agent and the inorganic filler can be kneaded at a high temperature. However, if the SiH group-containing compound (B) and the catalyst (E) are kneaded at the same time at a high temperature, crosslinking (scorching) may take place. Therefore, when the SiH group-containing compound (B) and the catalyst (E) are added at the same time, kneading is preferably carried out at a temperature of not higher than 80° C. When one of the SiH group-containing compound (B) and the catalyst (E) is added, kneading can be carried out at a high temperature exceeding 80° C. To cope with heat generated by kneading, use of cooling water is sometimes preferable.

When the kneading temperature in an internal mixer is low, the anti-aging agent, colorant, dispersant, flame retardant and the blowing agent (G) may be kneaded at the same time together with the ethylene/α-olefin/non-conjugated polyene random copolymer rubber (A), the alkenyl group-containing organopolysiloxane (C), the SiH group-containing compound (B), the rubber reinforcing agent, the inorganic filler, the softener and the like.

Other rubber compositions according to the invention can be prepared in accordance with the above-mentioned process.

The crosslinkable rubber composition of the invention prepared as above is molded into a desired shape by various molding methods using an extrusion molding machine, a calender roll, a press, an injection molding machine, a transfer molding machine, etc., and crosslinked simultaneously with the molding or after being introduced into a vulcanization vessel. The crosslinking is carried out by heating at a temperature 120 to 170° C. for 1 to 30 minutes or by irradiation with a light, γ rays or electron rays through the aforesaid method, whereby a crosslinked product is obtained. The crosslinking may be conducted using a mold or without using a mold. If a mold is not used, the crosslinking process is generally carried out continuously. For heating in a vulcanization vessel, various means, such as hot air, glass bead fluidized bed, UHF (ultra high frequency electromagnetic wave) and steam, are employable.

In the case of the so-called "non-dynamic crosslinking" in which the crosslinking is carried out after molding, it is particularly advantageous that the composition is capable of being crosslinked in the presence of oxygen, especially capable of being crosslinked with the hot-air. When the crosslinking in the presence of oxygen can be made, sealing of the crosslinking vessel and removal of air therefrom are not necessary, as a result, simplification of production machine and reduction of production period can be made. These advantages are particularly conspicuous in producing extruded crosslinked moldings.

When an ethylene/α-olefin/non-conjugated polyene random copolymer rubber (A) having a low molecular weight is used, the rubber (A) is in a liquid state, so that it is possible that the rubber (A) in a liquid state is mixed with the SiH group-containing compound (B), and if necessary, with the catalyst (E), the reaction inhibitor (F), the blowing agent (G) or the blowing assistant (H), and then the mixture is introduced into a mold of a desired shape and crosslinked therein at room temperature.

EXAMPLE

The present invention is further described with reference to the following examples, but it should be construed that the invention is in no way limited to those examples.

Composition, iodine value, intrinsic viscosity (η), molecular weight distribution (Mw/Mn), γ2/γ1, effective network chain density (ν), and relation between γ2/γ1 and the effective network chain density (indication of crosslink density) of the copolymer rubbers obtained in the examples and the comparative examples were measured or determined by the following methods.

(1) Composition of Copolymer Rubber

The composition of the copolymer rubber was measured by a $^{13}$C-NMR method.

(2) Iodine Value of Copolymer Rubber

The iodine value of the copolymer rubber was determined by a titration method.

(3) Intrinsic Viscosity (η)

The intrinsic viscosity (η) of the copolymer rubber was measured in decalin at 135° C.

(4) Molecular Weight Distribution (Mw/Mn)

The molecular weight distribution of the copolymer rubber was expressed in a ratio (Mw/Mn) of the weight-average molecular weight (Mw) obtained by GPC to the number-average molecular weight (Mn) obtained by GPC. In the GPC, columns of GMH-HT and GMH-HTL available from TOSOH K.K. were used and orthochlorobenzene was used as a solvent.

(5) $\gamma_2/\gamma_1$

A melt flow curve of the copolymer rubber at 100° C. was obtained, and the ratio ($\gamma_2/\gamma_1$) of a shear rate at a shear stress of $0.4 \times 10^6$ dyn/cm$^2$ in the melt flow curve to a shear rate $\gamma_2$ at a shear stress of $2.4 \times 10^6$ dyn/cm$^2$ in the melt flow curve was determined.

$$L/D = 60 \text{ mm}/3 \text{ mm}$$

(6) Effective Network Chain Density (ν)

In accordance with JIS K 6258 (1993), the copolymer rubber was immersed in toluene at 37° C. for 72 hours, and the effective network chain density was calculated from the Flory-Rehner's formula.

$$\nu(\text{chains/cm}^3) = \frac{v_R + \ln(1 - v_R) + \mu v_R^2}{-V_O(v_R^{1/3} - v_R/2)}$$

$v_R$: fraction of pure rubber volume to swollen pure rubber volume (pure rubber volume+absorbed solvent volume) in swollen vulcanized rubber $\mu$: constant of interaction between rubber and solvent= 0.49

$V_o$: molar volume of solvent

ν (chains/cm$^3$): effective network chain concentration, number of effective network chains in 1 cm$^3$ of pure rubber Preparation of sample: To 100 g of a copolymer rubber was added 0.01 mol of dicumyl peroxide, the mixture was kneaded by means of 8-inch roll open mill rolls at a kneading temperature of 50° C. in accordance with the method described in Japanese Rubber Institute Standards (SRIS), and the resulting kneadate was press vulcanized at 170° C. for 10 minutes to prepare a sample.

(7) Relation Between $\gamma_2/\gamma_1$ and Effective Network Chain density (indication of crosslink density)

A value of Log($\gamma_2/\gamma_1$)/ν was determined by calculation.

(8) Branch Index

Frequency dispersion of complex viscosity coefficient η* of EPR having no long-chain branch (four samples having different molecular weights) was measured using a kinematic viscoelasticity tester.

Complex viscosity coefficients $\eta^*$ at 0.01 rad/sec and 8 rad/sec on each sample were sought. Each data consisting of complex viscosity coefficient $\eta_{1L}^*$ (0.01 rad/sec) as ordinate and the viscosity coefficient $\eta_{2L}^*$ (8 rad/sec) as abscissa was plotted to form a reference line, and $\eta_{1L0}^*$ in case of $\eta_{2L}^*=1\times10^3/\text{Pa·s}$, that is on a prolong line of the reference line, was measured.

Then, also on the objective sample, complex viscosity coefficients $\eta^*$ at 0.01 rad/sec and 8 rad/sec were sought, and the data consisting of the complex viscosity coefficient $\eta_{1B}^*$ (0.01 rad/sec) as ordinate and the viscosity coefficient $\eta_{2B}^*$ (8 rad/sec) as abscissa was okitted. This plot takes larger values than the reference line, and with increase of long-chain branches, this plot gets apart greater from the reference line.

Then, the reference line was shifted parallel so that the reference line passed on the plot of the objective sample, to measure the intersection point $\eta_{1B0}^*$ of the complex viscosity coefficient $\eta_2^*=1\times10^3/\text{Pa·s}$.

The values of $\eta_{1L0}^*$ and $\eta_{1B0}^*$ measured as above were applied to the following formula to calculate the branch index.

Branch index=$(\log \eta_{1B0}^* - \log \eta_{1B0}^*) \times 10$

The measuring conditions are as follows.

Reference sample: 4 kinds of EPR

TAFMER® P-0280, P-0480, P-0680, P-0880 (trade names), available from Mitsui Chemicals Inc.

Kinematic viscoelasticity tester (RDS): manufactured by Rheometrics Co.

Sample: disc having a diameter of 25 mm punched from a sheet having a thickness of 2 mm Temperature: 190° C.

Strain: 1%

Frequency dependence: 0.001–500 rad/sec

Preparation Example 1

Preparation of Ethylene/propylene/5-vinyl-2-norbornene Random Copolymer Rubber (A-1)

In a 100-liter stainless steel polymerization reactor equipped with a stirring blade (number of stirring revolutions: 250 rpm), terpolymerization of ethylene, propylene and 5-vinyl-2-norbornene was continuously carried out. To the liquid phase in the reactor were fed hexane at a rate of 60 l/hr, ethylene at a rate of 3.7 kg/hr, propylene at a rate of 8.0 kg/hr and 5-vinyl-2-norbornene at a rate of 480 g/hr, and were further continuously fed hydrogen at a rate of 50 l/hr and as catalysts $VOCl_3$ at a rate of 48 mmol/hr, $Al(Et)_2Cl$ at a rate of 240 mmol/hr and $Al(Et)_{1.5}Cl_{1.5}$ at a rate of 48 mmol/hr, through the side inlet of the reactor.

Through the copolymerization reaction under the above conditions, an ethylene/propylene/5-vinyl-2-norbornene random copolymer rubber (A-1) was obtained as a homogeneous solution.

Thereafter, to the polymer solution continuously drawn out from the bottom of the reactor was added a small amount of methanol to terminate polymerization reaction, and the polymer was separated from the solvent by a steam stripping treatment, followed by vacuum drying at 55° C. for 48 hours.

Properties of the ethylene/propylene/5-vinyl-2-norbornene random copolymer (A-1) obtained above are set forth in Table 1.

Preparation Examples 2 and 3

An ethylene/propylene/5-ethylidene-2-norbornene random copolymer rubber (A-2) and an ethylene/propylene/dicyclopentadiene random copolymer rubber (A-3) having different properties were obtained in the same manner as in Preparation Example 1, except that the polymerization conditions were changed as shown in Table 1. Properties of the copolymer rubbers (A-2) and (A-3) are set forth in Table 1.

Preparation Example 4

Preparation of Ethylene/propylene/5-vinyl-2-norbornene/5-ethylidene-2-norbornene Random Copolymer Rubber (A-4)

In a 100-liter stainless steel polymerization reactor equipped with a stirring blade (number of stirring revolutions: 250 rpm), tetrapolymerization of ethylene, propylene, 5-vinyl-2-norbornene and 5-ethylidene-2-norbornene was continuously carried out. To the liquid phase in the reactor were fed hexane at a rate of 60 l/hr, ethylene at a rate of 3.0 kg/hr, propylene at a rate of 8.5 kg/hr, 5-vinyl-2-norbornene at a rate of 370 g/hr and 5-ethylidene-2-norbornene at a rate of 470 g/hr, and were further continuously fed hydrogen at a rate of 50N l /hr and as catalysts $VOCl_3$ at a rate of 90 mmol/hr, $Al(Et)_2Cl$ at a rate of 420 mmol/hr and $Al(Et)_{1.5}Cl_{1.5}$ at a rate of 120 mmol/hr, through the side inlet of the reactor.

Through the copolymerization reaction under the above conditions, an ethylene/propylene/5-vinyl-2-norbornene/5-ethylidene/2-norbornene random copolymer rubber (A-4) was obtained as a homogeneous solution.

Thereafter, to the polymer solution continuously drawn out from the bottom of the reactor was added a small amount of methanol to terminate polymerization reaction, and the polymer was separated from the solvent by a steam stripping treatment, followed by vacuum drying at 55° C. for 48 hours.

Properties of the ethylene/propylene/5-vinyl-2-norbornene/5-ethylidene-2-norbornene random copolymer (A-4) obtained above are set forth in Table 1.

Preparation Examples 5 to 7

An ethylene/propylene/5-ethylidene-2-norbornene random copolymer rubber (A-5), an ethylene/propylene/dicyclopentadiene random copolymer rubber (A-6) and an ethylene/propylene/5-vinyl-2-norbornene copolymer (A-7) having different properties were obtained in the same manner as in Preparation Example 1, except that the polymerization conditions were changed as shown in Table 1. Properties of the copolymer rubbers (A-5), (A-6) and (A-7) are set forth in Table 1.

Preparation Example 8

Preparation of Ethylene/propylene/5-vinyl-2-norbornene Random Copolymer Rubber (A-8)

In a 100-liter stainless steel polymerization reactor equipped with a stirring blade (number of stirring revolutions: 250 rpm), terpolymerization of ethylene, propylene and 5-vinyl-2-norbornene was continuously carried out. To the liquid phase in the reactor were fed hexane at a rate of 60 l/hr, ethylene at a rate of 3.8 kg/hr, propylene at a rate of 9.2 kg/hr and 5-vinyl-2-norbornene at a rate of 120 g/hr, were further continuously fed hydrogen at a rate of 30 l/hr and as catalysts $VOCl_3$ at a rate of 18 mmol/hr, $Al(Et)_2Cl$ at a rate of 90 mmol/hr and $Al(Et)_{1.5}Cl_{1.5}$ at a rate of 18 mmol/hr, through the side inlet of the reactor.

Through the copolymerization reaction under the above conditions, an ethylene/propylene/5-vinyl-2-norbornene random copolymer rubber (A-8) was obtained as a homogeneous solution.

Thereafter, to the polymer solution continuously drawn out from the bottom of the reactor was added a small amount of methanol to terminate polymerization reaction, and the polymer was separated from the solvent by a steam stripping treatment, followed by vacuum drying at 55° C. for 48 hours.

Properties of the ethylene/propylene/5-vinyl-2-norbornene random copolymer (A-8) obtained above are set forth in Table 1.

Preparation Example 9

An ethylene/propylene/5-vinyl-2-norbornene random copolymer rubber (A-9) having different properties was obtained in the same manner as in Preparation Example 8, except that the polymerization conditions were changed as shown in Table 1. Properties of the copolymer rubber 9) are set forth in Table 1.

TABLE 1

| Copolymer rubber | Catalyst | Al/V | Al(Et)$_2$Cl/ Al(Et)$_{1.5}$Cl$_{1.5}$ | Polymer temperature (° C.) |
|---|---|---|---|---|
| A-1 | VOCl$_3$—Al(Et)$_2$Cl/ Al(Et)$_{1.5}$Cl$_{1.5}$ | 6 | 5/1 | 40 |
| A-2 | VOCl$_3$—Al(Et)$_2$Cl/ Al(Et)$_{1.5}$Cl$_{1.5}$ | 6 | 5/1 | 45 |
| A-3 | VOCl$_3$—Al(Et)$_2$Cl/ Al(Et)$_{1.5}$Cl$_{1.5}$ | 6 | 7/2 | 45 |
| A-4 | VOCl$_3$—Al(Et)$_2$Cl/ Al(Et)$_{1.5}$Cl$_{1.5}$ | 6 | 7/2 | 40 |
| A-5 | VOCl$_3$—Al(Et)$_2$Cl/ Al(Et)$_{1.5}$Cl$_{1.5}$ | 6 | 7/2 | 40 |
| A-6 | VOCl$_3$— Al(Et)$_{1.5}$Cl$_{1.5}$ | 6 | — | 35 |
| A-7 | VO(OEt)Cl$_2$— Al(Et)$_{1.5}$Cl$_{1.5}$ | 7 | — | 35 |
| A-8 | VOCl$_3$—Al(Et)$_2$Cl/ Al(Et)$_{1.5}$Cl$_{1.5}$ | 6 | 5/1 | 40 |
| A-9 | VOCl$_3$—Al(Et)$_2$Cl/ Al(Et)$_{1.5}$Cl$_{1.5}$ | 6 | 1/1 | 40 |

| Copolymer rubber | Polymerization pressure (kg/cm$^2$) | Catalyst feed (mmol/h) | Diene | Diene feed (g/h) | α-olefin |
|---|---|---|---|---|---|
| A-1 | 6.5 | 48 | VNB | 480 | Propylene |
| A-2 | 6.5 | 65 | ENB | 350 | Propylene |
| A-3 | 6.3 | 75 | DCPD | 480 | Propylene |
| A-4 | 7.3 | 90 | VNB ENB | 370 470 | Propylene |
| A-5 | 7.2 | 90 | VNB | 550 | Propylene |
| A-6 | 4.9 | 14 | VNB | 280 | 1-butene |
| A-7 | 7.2 | 10 | VNB | 150 | Propylene |
| A-8 | 6.8 | 18 | VNB | 120 | Propylene |
| A-9 | 7.4 | 38 | VNB | 240 | Propylene |

| Copolymer rubber | Ethylene/ α-olefin feed (kg/h) | H$_2$ (NL/h) | Yield (kg/h) | Ethylene content (mol %) | (η) (dl/g) | IV (g/100 g) |
|---|---|---|---|---|---|---|
| A-1 | 3.7/8.0 | 50 | 4.5 | 75 | 1.83 | 10.9 |
| A-2 | 3.2/9.5 | 7 | 4.8 | 66 | 1.98 | 13 |
| A-3 | 3.2/9.3 | 12 | 4.5 | 66 | 1.85 | 12 |
| A-4 | 3.0/8.5 | 50 | 4.5 | 70 | 1.0 | 13 (VNB) 21 (ENB) |
| A-5 | 2.8/11.5 | 40 | 4.1 | 50 | 1.1 | 15 |
| A-6 | 3.9/24 | 0 | 2.0 | 81 | 2.62 | 5.4 |
| A-7 | 3.8/7.7 | 42 | 3.9 | 78 | 3.2 | 4.5 |
| A-8 | 3.8/9.2 | 30 | 4.4 | 74 | 1.97 | 3.1 |
| A-9 | 3.3/17 | 10 | 1.2 | 68 | 3.10 | 6.0 |

TABLE 1-continued

| Copolymer rubber | $\gamma_2/\gamma_1$ | Effective network chain density (×10$^9$/cm$^3$) | Log $(\gamma_2/\gamma_1)/\nu$ | Mw/Mn | Branching index |
|---|---|---|---|---|---|
| A-1 | 145.1 | 31.8 | 0.068 | 28.2 | 13.2 |
| A-2 | 27.7 | 14.2 | 0.102 | 5.1 | 3.5 |
| A-3 | 54.6 | 14.0 | 0.124 | 9.5 | 8.4 |
| A-4 | — | — | — | 45 | 11.0 |
| A-5 | — | — | — | 40 | 11.5 |
| A-6 | 63.3 | 28.9 | 0.062 | 5.1 | 18.2 |
| A-7 | — | — | — | 10.4 | 20.3 |
| A-8 | 53.1 | 19.1 | 0.090 | 11.3 | 10.2 |
| A-9 | — | — | — | 10.5 | 18.5 |

Note 1 VNB: 5-vinyl-2-norbornene,
ENB: 5-ethylidene-2-norbornene,
DCPD: dicyclopentadiene
Note 2 Et: ethoxy group
Note 3 IV: iodine value Example A1

First, 100 parts by weight of an ethylene/α-olefin/non-conjugated polyene random copolymer rubber (A-1) shown in Table 1 was wound around 8-inch rolls (surface temperature of front roll: 40° C., surface temperature of back roll: 40° C., number of revolutions of front roll: 16 rpm, number of revolutions of back roll: 18 rpm), then thereto were added 2 parts by weight of methylhydrogen polysiloxane (B) (trade name: L-31, available from Nippon Unika Kogyo K.K.) and chloroplatinic acid (C) in such an amount that its concentration would become 300 ppm, and they were kneaded for 10 minutes, sheeted and pressed at 40° C. for 6 minutes using a 50-ton press molding machine to prepare an unvulcanized sheet having a thickness of 2 mm. The unvulcanized sheet was allowed to stand for 5 minutes in HAV (hot air vulcanizing vessel) at 230° C. under no pressure to prepare a crosslinked sheet.

The resulting crosslinked sheet was subjected to tensile test, heat aging resistance test, scratch resistance test and compression set test in accordance with the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated.

(3) Scratch Resistance Test

The surface of the crosslinked sheet immediately after taken out of the HAV (hot air vulcanizing vessel) was scratched with a pencil of HB, and the state of the scratched surface was observed with the naked eye and evaluated based on the four criteria.

Four Criteria Evaluation of Scratch Resistance

A: No scratch is observed on the surface.
B: A slight scratch is observed on the surface.
C: A scratch is observed on the surface.
D: A conspicuous scratch is observed on the surface.

(4) Compression Set

The crosslinked sheet prepared was laminated in accordance with JIS K6250, and the laminate was subjected to a compression set test in accordance with JIS K6262. This test was carried out under the conditions of 150° C. and 22 hours.

The results are set forth in Table 2.

In Example A1, KF-99 (trade name, available from Shinetsu Chemical Industry Co., Ltd.) was used instead of the methylhydrogen polysiloxane (B) (trade name: L-31, available from Nippon Unika Kogyo K.K.), and in this case the same results were obtained.

Comparative Example A1

The procedure of Example A1 was repeated, except that an ethylene/propylene/5-ethylidene-2-norbornene random copolymer rubber (A-2) shown in Table 1 was used instead of the ethylene/propylene/5-vinyl-2-norbornene random copolymer (A-1). The results are set forth in Table 2.

In Comparative Example A1, KF-99 (trade name, available from Shinetsu Chemical Kogyo Co., Ltd.) was used instead of methylhydrogen polysiloxane (B) (trade name: L-31, available from Nippon Unika Industry K.K.), and in this case the same results were obtained.

Comparative Example A2

The procedure of Example A1 was repeated, except that an ethylene/propylene/dicyclopentadiene random copolymer rubber (A-3) shown in Table 1 was used instead of the ethylene/propylene/5-vinyl-2-norbornene random copolymer (A-1). The results are set forth in Table 2.

In Comparative Example A2, KF-99 (trade name, available from Shinetsu Chemical Kogyo Co., Ltd.) was used instead of the methylhydrogen polysiloxane (B) (trade name: L-31, available from Nippon Unika Kogyo K.K.), and in this case the same results were obtained.

Comparative Example A3

The procedure of Example A1 was repeated, except that 2.7 parts by weight of dicumyl peroxide of 100% concentration was added instead of the methylhydrogen polysiloxane (B) and the chloroplatinic acid (C). The results are set forth in Table 2.

Comparative Example A4

The procedure of Example A1 was repeated, except that 1.5 parts by weight of sulfur, 0.5 part by weight of 2-mercaptobenzothiazole (trade name: Sanseller M, available from Sanshin Kagaku Kogyo K.K.), 1.0 part by weight of tetramethylthiuram disulfide (trade name: Sanseller TT, available from Sanshin Kagaku Kogyo K.K.), 5 parts by weight of zinc white and 1 part by weight of stearic acid were added instead of the methylhydrogen polysiloxane (B) and the chloroplatinic acid (C). The results are set forth in Table 2.

Comparative Example A5

The procedure of Comparative Example A4 was repeated, except that an ethylene/propylene/5-ethylidene-2-norbornene random copolymer rubber (A-2) shown in Table 1 was used instead of the ethylene/propylene/5-vinyl-2-norbornene random copolymer rubber (A-1. The results are set forth in Table 2.

Example A2

In a 1.7-liter Banbury mixer (produced by Kobe Steel Ltd.), 100 parts by weight of an ethylene/propylene/5-vinyl-2-norbornene random copolymer rubber (A-1), 50 parts by weight of carbon black (trade name: Shiest™ 3, available from Tokai Carbon K.K.) and 10 parts by weight of a softener (trade name: Diana Process Oil™ PW-380, available from Idemitsu Kosan Co., Ltd.) were kneaded.

In detail, the ethylene/propylene/5-vinyl-2-norbornene random copolymer rubber (A-1) was roughly kneaded for 30 seconds, then carbon black and the softener were added, and they were kneaded for 2 minutes. Then, the ram was raised to clean the mixer, and kneading was further conducted for 1 minute, followed by discharging at about 130° C. to obtain a rubber compound (I-1). The kneading was carried out in a fill of 70%.

Thereafter, 160 parts by weight of the rubber compound (I-1) was wound around 8-inch rolls (surface temperature of front roll: 50° C., surface temperature of back roll: 50° C., number of revolutions of front roll: 16 rpm, number of revolutions of back roll: 18 rpm), then thereto were added 5 parts by weight of methylhydrogen polysiloxane (B) and 1 part by weight of chloroplatinic acid (C), and they were kneaded for 10 minutes, sheeted and pressed at 40° C. for 6 minutes using a 50-ton press molding machine to prepare an unvulcanized rubber sheet having a thickness of 2 mm. The unvulcanized sheet was allowed to stand for 5 minutes in HAV (hot air vulcanizing vessel) at 230° C. under no pressure to prepare a crosslinked sheet.

The resulting crosslinked sheet was subjected to tensile test, heat aging resistance test, scratch resistance test and compression set test in accordance with the aforesaid methods. Further, the crosslinked sheet was measured in turbidity according to the following method.

(Measuring Method of Turbidity)

A sheet specimen of 2 cm×2 cm was punched out from the resultant crosslinked sheet (2 mm) in thickness. The sheet specimen was immersed in 10 g of xylene for 48 hours at room temperature and the turbidity of the remaining liquid was measured by integrating sphere type photoelectric photometory with using as measuring machine SEP-PT-50 (tradename: manufactured by Nihon Seimitsu Kagaku K.K.). A specific tungsten incandescent lamp was used as a light source.

As a standard liquid for turbidity, a kaolin standard liquid (100° C. kaolin)) defined in JIS-K0101, 9.1 (1)(d) was used. When light scattering intensity is the same as that of the standard liquid, the turbidity is 100 ppm.

The results are set forth in Table 2.

In Example A2, KF-99 (trade name, available from Shinetsu Chemical Industry Co., Ltd.) was used instead of the methylhydrogen polysiloxane (B) (trade name: L-31, available from Nippon Unika Kogyo K.K.), and in this case the same results were obtained.

Comparative Example A6

The procedure of Example A2 was repeated, except that an ethylene/propylene/5-ethylidene-2-norbornene random copolymer rubber (A-2) shown in Table 1 was used instead of the ethylene/propylene/5-vinyl-2-norbornene random copolymer (A-1). The results are set forth in Table 2.

In Comparative Example A6, KF-99 (trade name, available from Shinetsu Chemical Industry Co., Ltd.) was used instead of the methylhydrogen polysiloxane (B) (trade name: L-31, available from Nippon Unika Kogyo K.K.), and in this case the same results were obtained.

Comparative Example A7

The procedure of Example A2 was repeated, except that an ethylene/propylene/dicyclopentadiene random copolymer rubber (A-3) shown in Table 2 was used instead of the ethylene/propylene/5-vinyl-2-norbornene random copolymer (A-1). The results are set forth in Table 2.

In Comparative Example A7, KF-99 (trade name, available from Shinetsu Chemical Industry Co., Ltd.) was used instead of the methylhydrogen polysiloxane (B) (trade name: L-31, available from Nippon Unika Kogyo K.K.), and in this case the same results were obtained.

Comparative Example A8

The procedure of Example A2 was repeated, except that 2.7 parts by weight of dicumyl peroxide of 100% concentration was added instead of the methylhydrogen polysiloxane (B) and the chloroplatinic acid (C). The results are set forth in Table 2.

Comparative Example A9

The procedure of Example A2 was repeated, except that 1.5 parts by weight of sulfur, 0.5 part by weight of 2-mercaptobenzothiazole (trade name: Sanseller M, available from Sanshin Kagaku Kogyo K.K.), 1.0 part by weight of tetramethylthiuram disulfide (trade name: Sanseller TT, available from Sanshin Kagaku Kogyo K.K.), 5 parts by weight of zinc white and 1 part by weight of stearic acid were added instead of the methylhydrogen polysiloxane (B) and the chloroplatinic acid (C). The results are set forth in Table 2.

Comparative Example A10

The procedure of Comparative Example A9 was repeated, except that an ethylene/propylene/5-ethylidene-2-norbornene random copolymer rubber (A-2) shown in Table 1 was used instead of the ethylene/propylene/5-vinyl-2-norbornene random copolymer rubber (A-1). The results are set forth in Table 2.

Example 3

The procedure of Example A2 was repeated, except that the uncrosslinked sheet was allowed to stand for 10 minutes in HAV at 250° C. under no pressure to produce a crosslinked sheet.

The results are set forth in Table 2.

Comparative Example A11

The procedure of Comparative Example A6 was repeated, except that the uncrosslinked sheet was allowed to stand for 10 minutes in HAV at 250° C. under no pressure to produce a crosslinked sheet.

Comparative Example A12

The procedure of Comparative Example A7 was repeated, except that the uncrosslinked sheet was allowed to stand for 10 minutes in HAV at 250° C. under no pressure to produce a crosslinked sheet.

TABLE 2

| | Exam. A1 | Comp. Ex. A1 | Comp. Ex. A2 | Comp. Ex. A3 | Comp. Ex. A4 | Comp. Ex. A5 |
|---|---|---|---|---|---|---|
| Composition (pt. by wt.) | | | | | | |
| Copolymer rubber (A-1) | 100 | | | 100 | 100 | |
| Copolymer rubber (A-2) | | 100 | | | | 100 |
| Copolymer rubber (A-3) | | | 100 | | | |
| Methylhydrogen polysiloxane (B) | 2 | 2 | 2 | | | |
| Chloroplatinic acid (C) | 0.5 | 0.5 | 0.5 | | | |
| Dicumyl peroxide | | | | 2.7 | | |
| Sulfur | | | | | 1.5 | 1.5 |
| Sanseller M | | | | | 0.5 | 0.5 |
| Sanseller TT | | | | | 1 | 1 |
| Zinc white | | | | | 5 | 5 |
| Stearic acid | | | | | 1 | 1 |
| Shiest 3 | | | | | | |
| PW-380 | | | | | | |
| Crosslinked rubber property | | | | | | |
| CS (150° C. × 22 h) (%) | 10 | not cross-linked | not Cross-linked | 18 | 82 | 76 |
| Heat aging resistance (150° C. × 72 h) | | | | | | |
| $A_R$ ($T_B$) (%) | 95 | | | 82 | 24 | 20 |
| $A_R$ ($E_B$) (%) | 93 | | | 68 | 24 | 19 |
| $T_B$ (MPa) | 2.3 | | | 2.1 | 2.2 | 2.5 |
| $E_B$ (%) | 190 | | | 210 | 210 | 250 |
| Scratch resistance | A | D | D | B~C | A | A |
| Turbidity (PPM) | | | | | | |

| | Exam. A2 | Comp. Ex. A6 | Comp. Ex. A7 | Comp. Ex. A8 | Comp. Ex. A9 | Comp. Ex. A10 |
|---|---|---|---|---|---|---|
| Composition (pt. by wt.) | | | | | | |
| Copolymer rubber (A-1) | 100 | | | 100 | 100 | |
| Copolymer rubber (A-2) | | 100 | | | | 100 |
| Copolymer rubber (A-3) | | | 100 | | | |
| Methylhydrogen | 5 | 5 | 5 | | | |

TABLE 2-continued

|  |  |  |  |  |  |  |
|---|---|---|---|---|---|---|
| polysiloxane (B) |  |  |  |  |  |  |
| Chloroplatinic acid (C) | 1 | 1 | 1 |  |  |  |
| Dicumyl peroxide |  |  |  | 2.7 |  |  |
| Sulfur |  |  |  |  | 1.5 | 1.5 |
| Sanseller M |  |  |  |  | 0.5 | 0.5 |
| Sanseller TT |  |  |  |  | 1 | 1 |
| Zinc white |  |  |  |  | 5 | 5 |
| Stearic acid |  |  |  |  | 1 | 1 |
| Shiest 3 | 50 | 50 | 50 | 50 | 50 | 50 |
| PW-380 | 10 | 10 | 10 | 10 | 10 | 10 |
| Crosslinked rubber property |  |  |  |  |  |  |
| CS (150° C. × 22 h) (%) | 18 | not crosslinked | not Crosslinked | 26 | 88 | 79 |
| Heat aging resistance (150° C. × 72 h) |  |  |  |  |  |  |
| $A_R$ ($T_B$) (%) | 90 |  |  | 75 | 20 | 19 |
| $A_R$ ($E_B$) (%) | 89 |  |  | 92 | 35 | 28 |
| $T_B$ (MPa) | 12.5 |  |  | 11.5 | 8.5 | 15.4 |
| $E_B$ (%) | 240 |  |  | 310 | 340 | 210 |
| Scratch resistance | A | D | D | D | A | A |
| Turbidity (PPM) | 0.2 |  |  | 5.6 | 0.2 | 0.2 |

|  | Example A3 | Comp. Ex. A11 | Comp. Ex. A12 |
|---|---|---|---|
| Hot air crosslinked (HAV) rubber property |  |  |  |
| CS (150° C., 22 hrs) (%) | 16 | 78 | 68 |
| $A_R$ ($T_B$) (%) | 93 | 75 | 76 |
| $A_R$ ($E_B$) (%) | 92 | 42 | 38 |
| $T_B$ (MPa) | 13.1 | 8.5 | 9.2 |
| $E_B$ (%) | 200 | 750 | 620 |
| Scratch resistance | A | C | C |
| Turbidity (ppm) | 0.2 | 2.6 | 1.9 |

Remarks: condition of hot air crosslinking: 250° C., 10 minutes

Example A4

100 Parts by weight of an ethylene/propylene/5-vinyl-2-norbornene random copolymer rubber (EPT (1), ethylene/propylene (by mol): 68/32, iodine value: 10, intrinsic viscosity (η) measured in decalin at 135° C.: 2.1 dl/g) and 30 parts by weight of Silica Aerosil 200 (trade name, available from Nippon Aerosil K.K., specific surface area: 200 m²/g) were kneaded by a twin roll to prepare a rubber compound (1).

Then, to the rubber compound (1), 1.5 parts by weight of organohydrogen polysiloxane represented by $C_6H_5$—Si(OSi $(CH_3)_2H)_3$, 0.06 part by weight of ethynylcyclohexanol as a reaction controller and 0.05 part by weight of an isopropyl alcohol solution of chloroplatinic acid having a concentration of 5% by weight were added by a twin roll, and they were mixed to obtain a rubber compound (2). The rubber compound (2) was subjected to compression molding at 165° C. for 10 minutes to form a sheet having a thickness of 2 mm.

Further, from the unthermoset rubber compound (2) containing a crosslinking agent, a sheet having a thickness of 2 mm was formed by a twin roll, and the sheet was subjected to hot air vulcanization (HAV) for 20 minutes in a hot-air dryer at 150° C.

The two sheets obtained above were measured on the mechanical properties in accordance with JIS K-6249. As a measure of a crosslinking rate, $T_{10}$ was measured by a rheometer under the conditions of 150° C. and 12 minutes. $T_{10}$ indicates a period of time at the end of which a torque value of 10% is reached from the beginning of crosslinking of a rubber material, with the proviso that the final torque value is taken as 100% when the rubber material is crosslinked for a given period of time. The short $T_{10}$ indicates that the sheet has high crosslinking rate. Further, the sheet having been crosslinked by hot air was subjected to scratch resistance test. The results are set forth in Table 3.

Example A5

Two conductive sheets having a thickness of 2 mm were prepared in the same manner as in Example A4, except that an ethylene/propylene/5-vinyl-2-norbornene random copolymer rubber (EPT (2), ethylene/propylene (by mol): 62/38, iodine value: 15, intrinsic viscosity (η) measured in decalin at 135° C.: 1.15 dl/g) was used instead of the ethylene/propylene/5-vinyl-2-norbornene random copolymer rubber (EPT (1)).

The sheets were subjected to the same tests as in Example A4. The results are set forth in Table 3.

Example A6

100 Parts by weight of an ethylene/propylene/5-vinyl-2-norbornene random copolymer rubber (EPT (2)) and 50 parts by weight of acetylene black (trade name: Denka Black, available from Denki Kagaku Kogyo K.K.) were kneaded by a twin roll to prepare a rubber compound (3).

Then, to the rubber compound (3), 1.5 parts by weight of organohydrogen polysiloxane represented by $C_6H_5$—Si(OSi $(CH_3)_2H)_3$, 0.06 part by weight of ethynylcyclohexanol as a reaction controller and 0.05 part by weight of an isopropyl alcohol solution of chloroplatinic acid having a concentration of 5% by weight were added by a twin roll, and they were mixed to obtain a rubber compound (4). The rubber compound (4) was subjected to compression molding at 165° C. for 10 minutes to form a sheet having a thickness of 2 mm.

Further, from the unthermoset rubber compound (3) containing a crosslinking agent, a sheet having a thickness of 2 mm was formed by a twin roll, and the sheet was subjected to hot air vulcanization (HAV) for 20 minutes in a hot-air dryer at 150° C.

The sheets were subjected to the same tests as in Example A4. The results are set forth in Table 3.

Comparative Example 13

Two sheets having a thickness of 2 mm were prepared in the same manner as in Example A3, except that an ethylene/propylene/5-ethylidene-2-norbornene random copolymer rubber (EPT (3)), ethylene/propylene (by mol): 63/37, iodine value: 22, intrinsic viscosity ($\eta$) measured in decalin at 135° C.: 1.05 dl/g) was used instead of the ethylene/propylene/5-vinyl-2-norbornene random copolymer rubber (EPT (1)).

The sheets were subjected to the same tests as in Example A4. The results are set forth in Table 3.

Comparative Example A14

Two conductive sheets having a thickness of 2 mm were prepared in the same manner as in Example A6, except that an ethylene/propylene/5-ethylidene-2-norbornene random copolymer rubber (EPT (3)) was used instead of the ethylene/propylene/5-vinyl-2-norbornene random copolymer rubber (EPT (2)).

The sheets were subjected to the same tests as in Example A6. The results are set forth in Table 3.

K.K., specific surface area: 200 m$^2$/g) were kneaded for 10 minutes by 8-inch rolls (surface temperature of front roll: 30° C., surface temperature of back roll: 30° C., number of revolutions of front roll: 16 rpm, number of revolutions of back roll: 18 rpm) to prepare a rubber compound (1).

Then, to the rubber compound (1), 1.5 parts by weight of organohydrogen polysiloxane represented by $C_6H_5$—Si(OSi$(CH_3)_2$H)$_3$ and 0.06 part by weight of ethynylcyclohexanol as a reaction controller were added, and they were kneaded for 10 minutes. Then, 0.1 part by weight of an isopropyl alcohol solution of chloroplatinic acid having a concentration of 2% by weight was further added by 8-inch rolls (surface temperature of front roll: 40° C., surface temperature of back roll: 30° C., number of revolutions of front roll: 16 rpm, number of revolutions of back roll: 18 rpm), and they were mixed to obtain a rubber compound (2). The rubber compound (2) was subjected to compression molding at 140° C. for 10 minutes to form a sheet having a thickness of 2 mm.

Further, from the unthermoset rubber compound (2) containing a crosslinking agent, a sheet having a thickness of 2 mm was formed by 8-inch rolls (surface temperature of front roll: 40° C., surface temperature of back roll: 30° C., number of revolutions of front roll: 16 rpm, number of revolutions of back roll: 18 rpm), and the sheet was pressed at 40° C. for 6 minutes by a 50-ton press molding machine to prepare an uncrosslinked sheet having a thickness of 2 mm. The uncrosslinked sheet was allowed to stand for 5 minutes in HAV (hot air vulcanization vessel) at 200° C. under no pressure to prepare a crosslinked sheet.

TABLE 3

|  | Example A4 | Example A5 | Example A6 | Compar. Example A13 | Compar. Example A14 |
|---|---|---|---|---|---|
| Composition (pt. By wt.) | | | | | |
| EPT (1) | 100 | | | | |
| EPT (2) | | 100 | 100 | | |
| EPT (3) | | | | 100 | 100 |
| Silica aerozil 200 | 30 | 30 | | 30 | |
| Denka Black | | | 50 | | 50 |
| Organohydrogen Polysiloxan *1 | 1.5 | 1.5 | 1.5 | 1.5 | 1.5 |
| IPA solution of 5 wt % of chloroplatinic acid | 0.05 | 0.05 | 0.05 | 0.05 | 0.05 |
| Ethynylcyclohexanol | 0.06 | 0.06 | 0.06 | 0.06 | 0.06 |
| Property of press molded crosslinked rubber | | | | | |
| $T_{10}$ (minute) | 0.25 | 0.23 | 0.28 | 1.20 | 2.10 |
| Hardness (Durometer A) | 73 | 70 | 65 | 40 | 30 |
| Tensile strength (MPa) | 12.0 | 10.0 | 7.3 | 3.5 | 2.0 |
| Elongation (%) | 180 | 200 | 230 | 600*2 | 750*2 |
| Property of heat air crosslinked rubber (HAV) | | | | | |
| Hardness (Durometer A) | 71 | 68 | 63 | Not completely | Not completely |
| Tensile strength (MPa) | 10.5 | 9.5 | 7.0 | com- | com- |
| Elongation (%) | 180 | 210 | 230 | pletely | pletely |
| Scratch resistance | A | A | A | C | D |

*1 represented by $C_6H_5$—Si(OSi$(CH_3)_2$H)$_3$
*2 Elongation is large because of insufficient cure Example B1

100 Parts by weight of an ethylene/propylene/5-vinyl-2-norbornene/5-ethylidene-2-norbornene random copolymer rubber shown in Table 1 and 30 parts by weight of Silica Aerosil 200 (trade name, available from Nippon Aerosil The resulting crosslinked sheet was subjected to tensile test, heat aging resistance test, scratch resistance test, compression set test, adhesion test and oil resistance after deterioration test in accordance with the following methods.

(1) Tensile Test
The same tensile test as that in Example A1.
(2) Heat Aging Resistance Test
The same heat aging resistance test as that in Example A1.
(3) Scratch Resistance Test
The same scratch resistance test as that in Example A1.
(4) Compression Set Test
The same compression test as that in Example A1.
(5) Adhesion Test Adhesion property (%)=(Adhesion strength/Matrix strength)×100

Measurement of Adhesion Strength

100 Parts by weight of Mitsui EPT 4045 (trade name, available from Mitsui Chemicals, Inc.), 30 parts by weight of Silica Aerosil 200 (trade name, available from Nippon Aerosil K.K.), 1.5 part by weight of sulfur, 1 part by weight of a vulcanization accelerator Sanseller M (trade name, available from Sanshin Kagaku Kogyo K.K.) and 1 part by weight of a vulcanization accelerator Sanseller TT (trade name, available from Sanshin Kagaku Kogyo K.K.) were kneaded by 8-inch rolls (surface temperature of front roll: 50° C., surface temperature of back roll: 50° C., number of revolutions of front roll: 16 rpm, number of revolutions of back roll: 18 rpm) to prepare a rubber compound. The rubber compound was subjected to compression molding at 170° C. for 10 minutes to prepare a sheet having a thickness of 2 mm. From the resulting vulcanized sheet, a specimen of JIS dumbbell No. 3 was punched by the use of a punch cutter in accordance with JIS K6250.

Then, the dumbbell specimen (length: 100 mm) was cut in half (50 mm) in the lengthwise direction to give an adhesion test sample (A).

Separately, from the rubber compound (2) obtained above, an amount corresponding to 60% of the volume of the JIS No. 3 dumbbell specimen was weighed to obtain an adhesion test sample (B).

Then, the adhesion test sample (A) (vulcanized sheet) and the adhesion test sample (B) (uncrosslinked rubber) were placed in a mold of JIS No. 3 dumbbell shape (thickness: 2 mm) in the right and left symmetry and crosslinked at 140° C. for 10 minutes using a 100-ton press molding machine to obtain an adhesion test sample (C) of dumbbell No. 3 shape.

The tensile strength of the sample (C) was measured in accordance with JIS K6251, and the obtained value was taken as an adhesion strength.

Measurement of Matrix Strength

The rubber compound (2) obtained as above was crosslinked at 140° C. for 10 minutes by a 100-ton press molding machine to obtain a crosslinked rubber sheet having a thickness of 2 mm.

The tensile strength of the sample (C) was measured in accordance with JIS K6251, and the obtained value was taken as a matrix strength.

(6) Oil Resistance After Deterioration Test

Oil resistance after deterioration=mass change after deterioration/mass change before deterioration The rubber compound (2) obtained above was crosslinked at 140° C. for 10 minutes by a 100-ton press molding machine to obtain a crosslinked rubber sheet (i) having a thickness of 2 mm.

Then, the sheet (i) was immersed in a lubricating oil No. 2 for the test at 70° C. for 72 hours. A mass $W_1$ after immersion and a mass $W_2$ before immersion were measured to determine a mass change before aging.

Mass change before aging (%)=$W_1/W_2$×100

Then, the crosslinked rubber sheet (i) was subjected to aging test at 150° C. for 72 hours in accordance with JIS K6257 to obtain a crosslinked rubber sheet (ii).

The crosslinked rubber sheet (ii) was subjected the same immersion test as described above, and a mass change after aging was determined.

The results are set forth in Table 4.

Comparative Example B1

The procedure of Example B1 was repeated, except that an ethylene/propylene/5-ethylidene-2-norbornene random copolymer rubber (A-2) shown in Table 1 was used instead of the ethylene/propylene/5-vinyl-2-norbornene/5-ethylidene-2-norbornene random copolymer rubber (A-1). The results are set forth in Table 4.

Comparative Example B2

The procedure of Example B1 was repeated, except that an ethylene/propylene/dicyclopentadiene random copolymer rubber (A-3) shown in Table 1 was used instead of the ethylene/propylene/5-vinyl-2-norbornene/5-ethylidene-2-norbornene random copolymer rubber (A-1). The results are set forth in Table 4.

Comparative Example B3

The procedure of Example B1 was repeated, except that an ethylene/propylene/5-vinyl-2-norbornene random copolymer rubber (A-4) shown in Table 1 was used instead of the ethylene/propylene/5-vinyl-2-norbornene/5-ethylidene-2-norbornene random copolymer rubber (A-1). The results are set forth in Table 4.

TABLE 4

|  | Example B1 | Comp. Ex. B1 | Comp. Exam. B2 | Comp. Exam. B3 |
|---|---|---|---|---|
| Composition (pt. by wt.) | | | | |
| Copolymer rubber (A-4) | 100 | | | |
| Copolymer rubber (A-2) | | 100 | | |
| Copolymer rubber (A-3) | | | 100 | |
| Copolymer rubber (A-5) | | | | 100 |
| Compound containing SiH group *1 | 1. | 1.5 | 1.5 | 1.5 |
| IPA solution of chloroplatinic acid of 2 wt % | 0.1 | 0.1 | 0.1 | 0.1 |
| Ethynylcyclohexanol | 0.06 | 0.06 | 0.06 | 0.06 |
| Silica aerosil 200 | 30 | 30 | 30 | 30 |
| Property of press-molded crosslinked rubber | | | | |
| Adhesion property (%) | 72 | 75 | 67 | 54 |
| Oil resistance after Deterioration (%) | 30 | | | 55 |
| Property of hot air vulcanized rubber (HAV) | | | | |
| Hardness (Durometer A) | 72 | Insufficiently cross-linked | Insufficiently cross-linked | 71 |
| Tensile strength $T_B$ (MPa) | 10.3 | | | 10.3 |
| Elongation $T_B$ (%) | 170 | | | 180 |
| Scratch resistance | A | D | D | A |
| Heat aging resistance | | | | |
| $A_B$ ($T_B$) (%) | 120 | — | — | 112 |
| $A_B$ ($E_B$) (%) | 50 | — | — | 62 |
| Compression set (%) | 20 | 100 | 100 | 23 |

*1: Organohydrogenpolysiloxane represented by $C_6H_5$—Si(OSi(CH$_3$)$_2$H)$_3$

Example C1

An ethylene/propylene/5-vinyl-2-norbornene random copolymer rubber (A-1) and polyethylene (B-1) (trade name: Ultozex 20200J, available from Mitsui Chemicals Inc.) were blended by a twin-screw kneading extruder with controlling the number of screw revolutions of the extruder and the feed rate of the polyethylene (B-1) from the metering device so that the weight ratio of (B-1)/(A-1) became 20/100, to obtain a blend (I).

The average dispersed particle diameter of the polyethylene (B-1) in the blend (I) was measured by an electron microscope (trade name: H-8100 (200 KV), manufactured by Hitachi, Ltd.) using a sample prepared in the following manner. As a result, the average dispersed particle diameter was not more than 0.01 μm.

Preparation of Sample

Pellets of the blend (I) were trimmed by a microtome to prepare thin film sections of not more than 0.1 μm, and the thin film sections were dyed with ruthenic acid. Then, carbon was deposited on the thin film sections to obtain a sample for electron microscopy.

Further, in a 1.7-liter Banbury mixer (BB-2 model mixer, produced by Kobe Steel Ltd.), 120 parts by weight of the blend (I), 80 parts by weight of carbon black (trade name: Asahi #60G, available from Asahi Carbon K.K.), 35 parts by weight of a softener (trade name: Diana Process Oil™ PW-380, available from Idemitsu Kosan Co., Ltd.), 1 part by weight of stearic acid and 5 parts by weight of zinc white No. 1 were kneaded.

In detail, the blend (I) was roughly kneaded for 30 seconds, then carbon black, the softener, stearic acid and zinc white No. 1 were added, and they were kneaded for 2 minutes. Then, the ram was raised to clean the mixer, and kneading was further conducted for 1 minute, followed by discharging at about 110° C. to obtain a rubber compound (1). The kneading was carried out in a fill of 70%.

Thereafter, 241 parts by weight of the rubber compound (1) was wound around 8-inch rolls (surface temperature of front roll: 40° C., surface temperature of back roll: 30° C., number of revolutions of front roll: 16 rpm, number of revolutions of back roll: 18 rpm), then thereto were added 3 parts by weight of organohydrogen polysiloxane represented by $C_6H_5—Si(OSi(CH_3)_2H)_3$, 0.2 part by weight of ethynylcyclohexanol as a reaction controller, 0.3 part by weight of an isopropyl alcohol solution of chloroplatinic acid having a concentration of 2% by weight, and they were kneaded for 10 minutes. The resulting rubber compound (2) was subjected to compression molding at 140° C. for 10 minutes to prepare a sheet having a thickness of 2 mm.

Further, from the unthermoset rubber compound (2) containing a crosslinking agent, a sheet having a thickness of 2 mm was formed by B-inch rolls (surface temperature of front roll: 40° C., surface temperature of back roll: 30° C., number of revolutions of front roll: 16 rpm, number of revolutions of back roll: 18 rpm), and the sheet was pressed at 40° C. for 6 minutes by a 50-ton press molding machine to prepare an uncrosslinked sheet having a thickness of 2 mm. The uncrosslinked sheet was allowed to stand for 5 minutes in HAV (hot air vulcanization vessel) at 200° C. under no pressure to prepare a crosslinked sheet.

The resulting crosslinked sheet was subjected to tensile test, heat aging resistance test, scratch resistance test, compression set test and flowability test in accordance with the following methods.
(1) Tensile Test The same tensile test as that in Example A1.
(2) Heat Aging Resistance Test The same heat aging resistance test as that in Example A1.

(3) Scratch Resistance Test

The same scratch resistance test as that in Example A1.
(4) Compression Set Test The same compression test as that in Example A1.
(5) Flowability Test The minimum torque S'MIN was measured using a machine for measuring degree of crosslinking (trade name: RHEOMETER MDR2000, manufactured by Alpha Technology Acquisition Inc.). The measuring temperature was 140° C.

The results are set forth in Table 5.

Example C2

The procedure of Example C1 was repeated, except that 20 parts by weight of polypropylene (B-2) (trade name: F337D, available from Grand Polymer K.K.) was used instead of 20 parts by weight of the polyethylene (B-1).

The results are set forth in Table 5.

The average dispersed particle diameter of the polyethylene (B-2) in the resulting blend (II) was measured by an electron microscope (trade name: H-8100 (200 KV), manufactured by Hitachi, Ltd.) using a sample prepared by the aforesaid manner. As a result, the average dispersed particle diameter was 0.5 μm and the aspect ratio was 1.7.

The results are set forth in Table 5.

Comparative Example C1

The procedure of Example C2 was repeated, except that an ethylene/propylene/5-ethylidene-2-norbornene random copolymer rubber (A-2) shown in Table 1 was used instead of the ethylene/propylene/5-vinyl-2-norbornene random copolymer rubber (A-1).

The results are set forth in Table 5.

The average dispersed particle diameter of the polyethylene (B-2) in the resulting blend (III) was measured by an electron microscope (trade name: H-8100 (200 KV), manufactured by Hitachi, Ltd.) using a sample prepared by the aforesaid manner. As a result, the average dispersed particle diameter was 0.6 μm and the aspect ratio was 1.6.

Comparative Example C2

The procedure of Example C1 was repeated, except that an ethylene/propylene/dicyclopentadiene random copolymer rubber (A-3) shown in Table 1 was used instead of the ethylene/propylene/5-vinyl-2-norbornene random copolymer rubber (A-1), and polypropylene (B-2) was used instead of the polyethylene (B-1).

The results are set forth in Table 5.

The average dispersed particle diameter of the polyethylene (B-2) in the resulting blend (IV) was measured by an electron microscope (trade name: H-8100 (200 KV), manufactured by Hitachi, Ltd.) using a sample prepared by the aforesaid manner. As a result, the average dispersed particle diameter was 0.5 μm and the aspect ratio was 1.8.

Comparative Example C3

The procedure of Example C1 was repeated, except that the polyethylene (B-1) was not used and the amount of the carbon black (trade name: Asahi #50G, available from Asahi Carbon K.K.) was changed to 100 parts by weight.

The results are set forth in Table 5.

Comparative Example C4

The procedure of Example C2 was repeated, except that 1.5 part by weight of sulfur, 0.5 part by weight of 2-mercaptobenzothiazole (trade name: Sanseller M, available from Sanshin Kagaku Kogyo K.K.) and 1.0 part by weight of tetramethylthiuram disulfide (trade name: Sanseller TT, available from Sanshin Kagaku Kogyo K.K.) were used instead of the crosslinking agent (organohydrogen polysiloxane), the catalyst (isopropyl alcohol solution of chloroplatinic acid having a concentration of 2% by weight) and the reaction inhibitor (ethynylcyclohexanol).

The results are set forth in Table 5.

Comparative Example C5

The procedure of Example C2 was repeated, except that 3.5 parts by weight of dicumyl peroxide (trade name: Mitsui DCP40C, available from Mitsui Chemicals, Inc.) was used instead of the crosslinking agent (organohydrogen polysiloxane), the catalyst (isopropyl alcohol solution of chloroplatinic acid having a concentration of 2% by weight) and the reaction inhibitor (ethynylcyclohexanol), and no zinc white No. 1 and no stearic acid were used.

The results are set forth in Table 5.

Example D1

100 Parts by weight of an ethylene/propylene/5-vinyl-2-norbornene random copolymer rubber (A-1) shown in Table 1 and 35 parts by weight of Silica Aerosil 200 (trade name, available from Nippon Aerosil K.K., specific surface area: 200 m$^2$/g) were kneaded for 10 minutes by 8-inch rolls (surface temperature of front roll: 30° C., surface temperature of back roll: 30 C, number of revolutions of front roll: 16 rpm, number of revolutions of back roll: 18 rpm) to prepare a rubber compound (1).

Separately, 100 parts by weight of polysiloxane having methyl group and vinyl group (average degree of polymerization: 8000, content of vinyl groups sealed with dimethylvinylsilyl groups at the both terminals: 0.11% by mol), 35 parts by weight of Silica Aerosil 200 (trade name, available from Nippon Aerosil K.K., specific surface area: 200 m$^2$/g) and 1 part by weight of dimethylpolysiloxane (average degree of polymerization: 10, sealed with silanol groups at the both terminals) were kneaded for 10 minutes by 8-inch rolls (surface temperature of front roll: 30° C., surface temperature of back roll: 30° C., number of revolutions of

TABLE 5

|  | Ex. C1 | Ex. C2 | Comp. Ex. C1 | Comp. Ex. C2 | Comp. Ex. C3 | Comp. Ex. C4 | Comp. Ex. C5 |
| --- | --- | --- | --- | --- | --- | --- | --- |
| Composition (pt. by wt.) | | | | | | | |
| Copolymer rubber (A-1) | 100 | 100 | | | 100 | 100 | 100 |
| Copolymer rubber (A-2) | | | 100 | | | | |
| Copolymer rubber (A-3) | | | | 100 | | | |
| Polyethylene (B-1) | 20 | | | | | | |
| Polypropylene (B-2) | | 20 | 20 | 20 | | 20 | 20 |
| Compound containing SiH group *1 | 3 | 3 | 3 | 3 | 3 | | |
| IPA solution of chloro-platinic acid of 2 wt % | 0.3 | 0.3 | 0.3 | 0.3 | 0.3 | | |
| Ethynylcyclohexanol | 0.2 | 0.2 | 0.2 | 0.2 | 0.2 | | |
| Dicumylperoxide | | | | | | | 3.5 |
| Sulfur | | | | | | 1.5 | |
| Sanseller M | | | | | | 0.5 | |
| Sanseller TT | | | | | | 1.0 | |
| Zinc white | 5 | 5 | 5 | 5 | 5 | 5 | |
| Stearic acid | 1 | 1 | 1 | 1 | 1 | 1 | |
| Carbon black (Asahi #60G) | 80 | 80 | 80 | 80 | 100 | 80 | 80 |
| Softener (PW-380) | 35 | 35 | 35 | 35 | 35 | 35 | 35 |
| Flowability | 1.5 | 1.4 | Insufficiently crosslinked | Insufficiently crosslinked | 2.2 | Slowly vulcanized | Slowly crosslinked |
| Minimum torque S' of crosslinking, dN$_{10}$ (140° C.) | | | | | | | |
| Crosslinked rubber property | 41 | 35 | Insufficiently cross linked | Insufficiently cross linked | 32 | 72 | 25 |
| CS (150° C. × 22 h) (%) | | | | | | | |
| Heat aging resistance (150° C. × 72 h) | | | | | | | |
| A$_R$ (T$_B$) (%) | 115 | 121 | | | 128 | 34 | 121 |
| A$_R$ (E$_B$) (%) | 62 | 56 | | | 59 | 21 | 52 |
| T$_B$ (MPa) | 14.4 | 12.8 | | | 13.1 | 15.2 | 11.3 |
| E$_B$ (%) | 190 | 170 | | | 160 | 250 | 190 |
| Scratch resistance | A | A | D | D | A | A | D |

*1 $C_6H_5$—Si $(OSi(CH_3)_2H)_3$

As is evident from Table 5, Example C1 containing polyethylene and Example C2 containing polypropylene have smaller S', lower viscosity and better flowability, as compared with Comparative Example C3 containing no polyolefin such as polyethylene.

front roll: 16 rpm, number of revolutions of back roll: 18 rpm) to prepare a rubber compound (2).

Then, 121.5 parts by weight of the rubber compound (1) and 13.5 parts by weight of the rubber compound (2) were kneaded for 10 minutes by 8-inch rolls (surface temperature of front roll: 30° C., surface temperature of back roll: 30° C., number of revolutions of front roll: 16 rpm, number of revolutions of back roll: 18 rpm) to prepare a rubber compound (3).

Then, to the rubber compound (3), 1.5 parts by weight of organohydrogen polysiloxane represented by $C_6H_5$—$Si(OSi(CH_3)_2H)_3$ and 0.06 part by weight of ethynylcyclohexanol as a reaction controller were added, and they were kneaded for 10 minutes. Then, 0.1 part by weight of an isopropyl alcohol solution of chloroplatinic acid having a concentration of 2% by weight was further added by 8-inch rolls (surface temperature of front roll: 30° C., surface temperature of back roll: 30° C., number of revolutions of front roll: 16 rpm, number of revolutions of back roll: 18 rpm), and they were mixed for 5 minutes to obtain a rubber compound (4). The rubber compound (4) was subjected to compression molding at 140° C. for 10 minutes to form a sheet having a thickness of 2 mm.

Further, from the unthermoset rubber compound (4) containing a crosslinking agent, a sheet having a thickness of 2 mm was formed by 8-inch rolls (surface temperature of front roll: 30° C., surface temperature of back roll: 30° C., number of revolutions of front roll: 16 rpm, number of revolutions of back roll: 18 rpm), and the sheet was pressed at 40° C. for 6 minutes by a 50-ton press molding machine to prepare an uncrosslinked sheet having a thickness of 2 mm. The uncrosslinked sheet was allowed to stand for 5 minutes in HAV (hot air vulcanization vessel) at 200° C. under no pressure to prepare a crosslinked sheet.

The resulting crosslinked sheet was subjected to tensile test, heat aging resistance test, scratch resistance test, compression set test and abrasion resistance test in accordance with the following methods.

(1) Tensile Test

The same tensile test as that in Example A1.

(2) Heat Aging Resistance Test

The same heat aging resistance test as that in Example A1.

(3) Scratch Resistance Test

The same scratch resistance test as that in Example A1.

(4) Compression Set Test

The same compression set test as that in Example A1.

(5) Abrasion Resistance Test

A taper abrasion test was carried out in accordance with JIS K6264 under the following conditions to measure abrasion wear.

Conditions

Abrasive grind wheel: H22, No. 1 of flat type defined by JIS R6211-3

Load: 2.45 N

Number of test times: 1000

Thickness of specimen: 2.5 mm

Further, a mold stain test was carried out in the following manner. That is, injection molding was conducted using a vertical injection molding machine (VI-75P, manufactured by Matsuda Seisakusho K.K.) under the conditions of a stroke of 7.7 mm, a maximum mold clamping force of 75 tons, a crosslinking temperature of 160° C. and a crosslinking time of 100 seconds to measure the number of shots at which stain took place on the surface of a mold. The number of shots was taken as an indication of mold stain resistance.

The results are set forth in Table 6.

Example D2

The procedure of Example D1 was repeated, except that the amount of the rubber compound (1) was changed to 81 parts by weight from 121.5 parts by weight and the amount of the rubber compound (2) was changed to 54 parts by weight from 13.5 parts by weight.

The results are set forth in Table 6.

Example D3

The procedure of Example D1 was repeated, except that an ethylene/propylene/5-vinyl-2-norbornene random copolymer rubber (A-5) shown in Table 1 was used instead of the ethylene/propylene/5-vinyl-2-norbornene random copolymer rubber (A-1).

The results are set forth in Table 6.

Comparative Example D1

The procedure of Example D1 was repeated, except that an ethylene/propylene/5-ethylidene-2-norbornene random copolymer rubber (A-2) shown in Table 1 was used instead of the ethylene/propylene/5-vinyl-2-norbornene random copolymer rubber (A-1).

The results are set forth in Table 6.

Comparative Example D2

The procedure of Example D1 was repeated, except that an ethylene/propylene/dicyclopentadiene random copolymer rubber (A-3) shown in Table 1 was used instead of the ethylene/propylene/5-vinyl-2-norbornene random copolymer rubber (A-1).

The results are set forth in Table 6.

Comparative Example D3

The procedure of Example D1 was repeated, except that the amount of the rubber compound (1) was changed to 135 parts by weight from 121.5 parts by weight and the amount of the rubber compound (2) was changed to 0 part by weight from 13.5 parts by weight.

The results are set forth in Table 6.

Comparative Example D4

The procedure of Example D1 was repeated, except that 3.5 parts by weight of dicumyl peroxide (trade name: Mitsui DCP-40C, available from Mitsui Chemicals, Inc.) was used instead of 1.5 parts by weight of the SiH group-containing compound represented by $C_6H_5$—$Si(OSi(CH_3)_2H)_3$, 0.06 part by weight of ethynylcyclohexanol and 0.1 part by weight of the isopropyl alcohol solution of chloroplatinic acid having a concentration of 2% by weight.

The results are set forth in Table 6.

Comparative Example D5

The procedure of Comparative Example D1 was repeated, except that 1.5 parts by weight of sulfur, 0.5 part by weight of 2-mercaptobenzothiazole (trade name: Sanseller M, available from Sanshin Kagaku Kogyo K.K.) and 1.0 part by weight of tetramethylthiuram disulfide (trade name: Sanseller TT, available from Sanshin Kagaku Kogyo K.K.) were used instead of 1.5 parts by weight of the SiH group-containing compound represented by $C_6H_5$—$Si(OSi(CH_3)_2H)_3$, 0.06 part by weight of ethynylcyclohexanol and 0.1 part by weight of the isopropyl alcohol solution of chloroplatinic acid having a concentration of 2% by weight.

The results are set forth in Table 6.

TABLE 6

|  | Example D1 | Example D2 | Example D3 |
|---|---|---|---|
| Composition (pt. by wt.) | | | |
| Copolymer rubber (A-1) | 90 | 60 | |
| Copolymer rubber (A-5) | | | 90 |
| Copolymer rubber (A-2) | | | |
| Copolymer rubber (A-3) | | | |
| Polysiloxane | 10 | 40 | 10 |
| Compound containing SiH group *1 | 1.5 | 1.5 | 1.5 |
| IPA solution of chloro-platinic acid of 2 wt % | 0.1 | 0.1 | 0.1 |
| Ethynylcyclohexanol | 0.06 | 0.06 | 0.06 |
| Dicumylperoxide | | | |
| Sulfur | | | |
| Sanseller M | | | |
| Sanseller TT | | | |
| Silica (Aerosil 200) | 35 | 35 | 35 |
| Staining resistance of mold No. of shot (times) | 120 | 250 | 105 |
| Crosslinked rubber property | | | |
| Wearability resistance Wearing amount (g) | 23 | 15 | 29 |
| CS (150° C. × 22 h) (%) | 29 | 23 | 33 |
| Heat aging resistance (150° C. × 72 h) | | | |
| $A_R$ ($T_B$) (%) | 112 | 105 | 121 |
| $A_B$ ($E_B$) (%) | 63 | 72 | 56 |
| Tensile strength $T_B$ (MPa) | 12.4 | 10.8 | 10.4 |
| Elongation $E_B$ (%) | 190 | 170 | 180 |
| Scratch resistance | A | A | A |

|  | Comp. Ex. D1 | Comp. Ex. D2 | Comp. Ex. D3 | Comp. Ex. D4 | Comp. Ex. D5 |
|---|---|---|---|---|---|
| Composition (pt. by wt.) | | | | | |
| Copolymer rubber (A-1) | | | 100 | 90 | 90 |
| Copolymer rubber (A-5) | | | | | |
| Copolymer rubber (A-2) | 90 | | | | |
| Copolymer rubber (A-3) | | 90 | | | |
| Polysiloxane | 10 | 10 | | 10 | 10 |
| Compound containing SiH group *1 | 1.5 | 1.5 | 1.5 | | |
| IPA solution of chloro-platinic acid of 2 wt % | 0.1 | 0.1 | 0.1 | | |
| Ethynylcyclohexanol | 0.06 | 0.06 | 0.06 | | |
| Dicumylperoxide | | | | 3.5 | |
| Sulfur | | | | | 1.5 |
| Sanseller M | | | | | 0.5 |
| Sanseller TT | | | | | 1 |
| Silica (Aerosil 200) | 35 | 35 | 35 | 35 | 35 |
| Staining resistance of mold No. of shot (times) | In-sufficiently cross-linked | In-sufficiently cross-linked | 52 | 95 | 105 |
| Crosslinked rubber property | | | | | |
| Wearability resistance Wearing amount (g) | | | 62 | 65 | 32 |
| CS (150° C. × 22 h) (%) | | | 31 | 19 | 78 |
| Heat aging resistance (150° C. × 72 h) | | | | | |
| $A_R$ ($T_B$) (%) | | | 120 | 119 | 43 |
| $A_B$ ($E_B$) (%) | | | 50 | 52 | 22 |
| Tensile strength $T_B$ (MPa) | | | 12.2 | 11.3 | 13.4 |

TABLE 6-continued

|  |  |  | 180 | 190 | 230 |
|---|---|---|---|---|---|
| Elongation $E_B$ (%) | | | | | |
| Scratch resistance | D | D | A | D | A |

Examples Relating to Rubber Vibration Insulator

Example E1

In a 1.7-liter Banbury mixer (produced by Kobe Steel Ltd.), 100 parts by weight of an ethylene/propylene/5-vinyl-2-norbornene random copolymer rubber (A-1) shown in Table 1, 60 parts by weight of carbon black (trade name: Asahi #60G, available from Asahi Carbon K.K.), 60 parts by weight of a softener (trade name: Diana Process Oil TMPW-380, available from Idemitsu Kosan co., Ltd.), 5 parts by weight of zinc white No. 1 and 1 part by weight of stearic acid were kneaded.

In detail, the ethylene/propylene/5-vinyl-2-norbornene random copolymer rubber (A-1) was roughly kneaded for 30 seconds, then zinc white No. 1, stearic acid, carbon black and the softener were added, and they were kneaded for 2 minutes. Then, the ram was raised to clean the mixer, and kneading was further conducted for 1 minute, followed by discharging at about 165° C. to obtain a rubber compound (I-1). The kneading was carried out in a fill of 75%.

Thereafter, 226 parts by weight of the rubber compound (I-1) was wound around 8-inch rolls (surface temperature of front roll: 50° C., surface temperature of back roll: 50° C., number of revolutions of front roll: 16 rpm, number of revolutions of back roll: 18 rpm), then thereto were added 3 parts by weight of a SiH group-containing compound (crosslinking agent) represented by $C_6H_5$—$Si(OSi(CH_3)_2H)_3$ and 0.2 part by weight of ethynylcyclohexanol as a reaction controller, and they were kneaded for 10 minutes. Then, 0.3 part by weight of an isopropyl alcohol solution of chloroplatinic acid having a concentration of 5% by weight was added as a catalyst, and they were kneaded for 5 minutes. The kneadate was sheeted and pressed at 40° C. for 6 minutes using a 50-ton press molding machine to prepare an uncrosslinked rubber sheet having a thickness of 2 mm. Further, as a measure of a crosslinking rate of the unthermoset kneadate containing a crosslinking agent, $t_c(90)$ was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH−ML), and a period of time at the end of which 90% ME is reached is taken as $t_c(90)$.

Then, the uncrosslinked rubber sheet was allowed to stand for 5 minutes in HAV (hot air vulcanizing vessel) at 200° C. under no pressure to prepare a crosslinked sheet.

The resulting crosslinked sheet was subjected to the same scratch resistance as that in Example A1.

Further, the uncrosslinked rubber sheet obtained as above was pressed at 140° C. for 10 minutes using a 150-ton press molding machine to obtain a crosslinked sheet having a thickness of 2 mm. The crosslinked sheet was subjected to tensile test, hardness test and heat aging resistance test in accordance with the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Hardness Test

The hardness test was carried out in accordance with JIS K6253 (durometer type A) to measure a hardness $H_A$.

(3) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated. Further, the crosslinked sheet was aged in an oven at 150° C. for 72 hours, and a hardness test after aging was carried out. Using the hardness $H_1$ before heating and the hardness $H_2$ after heating, a hardness change AH was calculated from the following formula.

$$A_H = H_2 - H_1$$

Further, the uncrosslinked rubber sheet obtained as above was pressed at 140° C. for 10 minutes using a 150-ton press molding machine to obtain a crosslinked sheet. The crosslinked sheet was subjected to compression set test and vibration insulation property evaluation test in accordance with the following methods.

(1) Compression Set Test

The compression set test was carried out in accordance with JIS K6262 (1993). This test was carried out under the conditions of 150° C. and 22 hours.

(2) Vibration Insulation Property Evaluation Test

The vibration insulation property evaluation test was carried out using a viscoelasticity tester (model: RDS) manufactured by Scientific Far East K.K. under the following conditions to measure complex elastic modulus (G*) and loss tangent (tan δ), from which the vibration insulation property was evaluated.

Measuring Conditions (1) Temperature: 25° C., (2) Strain: 1%, (3) Frequency: 10 Hz, (4) Shape of specimen: 10 mm (width)×2 mm (thickness)×30 mm (length)

Example E2

The procedure of Example E1 was repeated, except that an ethylene/1-butene/5-vinyl-2-norbornene random copolymer rubber (A-6) was used instead of the ethylene/propylene/5-vinyl-2-norbornene random copolymer rubber (A-1). The temperature of the kneadate discharged from the Banbury mixer was 135° C.

The results are set forth in Table 7.

Example E3

The procedure of Example E1 was repeated, except that an ethylene/propylene/5-vinyl-2-norbornene random copolymer rubber (A-7) was used instead of the ethylene/propylene/5-vinyl-2-norbornene random copolymer rubber (A-1). The temperature of the kneadate discharged from the Banbury mixer was 140° C.

The results are set forth in Table 7.

Comparative Example E1

The procedure of Example E1 was repeated, except that Mitsui EPT4045 (trade name, ethylene/propylene/5-ethylidene-2-norbornene random copolymer rubber of Mitsui Chemicals, Inc.) was used instead of the ethylene/propylene/5-vinyl-2-norbornene random copolymer rubber (A-1), and 0.5 part by weight of sulfur, 3 parts by weight of Sanseller M (trade name, vulcanization accelerator, available from Sanshin Kagaku Kogyo K.K.), 1.5 parts by weight of Sanseller BZ (trade name, vulcanization accelerator, available from Sanshin Kagaku Kogyo K.K.) and 1.0 part by weight of Sanseller TT (trade name, vulcanization accelerator, available from Sanshin Kagaku Kogyo K.K.) were used instead of the SiH group-containing compound, the isopropyl alcohol solution of chloroplatinic acid having a concentration of 5% by weight and ethynylcyclohexanol. The temperature of the kneadate discharged from the Banbury mixer was 138° C.

The results are set forth in Table 7.

Comparative Example E2

The procedure of Example E1 was repeated, except that Mitsui EPT4045 (trade name, available from Mitsui Chemicals, Inc.) was used instead of the ethylene/propylene/5-vinyl-2-norbornene random copolymer rubber (A-1), and 6.8 parts by weight of dicumyl peroxide (DCP, crosslinking agent of Nippon Oils & Fats Co., Ltd.) and 0.5 part by weight of triallyl isocyanurate (TAIC, crosslinking assistant of Nippon Kasei K.K.) were used instead of the SiH group-containing compound, the isopropyl alcohol solution of chloroplatinic acid having a concentration of 5% by weight and ethynylcyclohexanol. The temperature of the kneadate discharged from the Banbury mixer was 142° C.

The results are set forth in Table 7.

TABLE 7

| | Example E1 | Example E2 | Example E3 | Comp. Ex. E1 | Comp. Ex. E2 |
|---|---|---|---|---|---|
| Composition (Part by weight) | | | | | |
| Copolymer rubber (A-1) | 100 | | | | |
| Copolymer rubber (A-6) | | 100 | | | |
| Copolymer rubber (A-7) | | | 100 | | |
| MITSUI EPT4045 | | | | 100 | 100 |
| SiH group-containing compound*1 | 3 | 3 | 3 | | |
| IPA solution of chloroplatinic acid of 5 wt % | 0.3 | 0.3 | 0.3 | | |
| Ethynylcyclohexanol | 0.2 | 0.2 | 0.2 | | |
| DCP (100%) | | | | | 6.8 |
| TAIC | | | | | 0.5 |

TABLE 7-continued

|  | Example E1 | Example E2 | Example E3 | Comp. Ex. E1 | Comp. Ex. E2 |
|---|---|---|---|---|---|
| Sulfur |  |  |  | 0.5 |  |
| Sanseller M |  |  |  | 3 |  |
| Sanseller BZ |  |  |  | 1.5 |  |
| Sanseller TT |  |  |  | 1 |  |
| Zinc white | 5 | 5 | 5 | 5 | 5 |
| Stearic acid | 1 | 1 | 1 | 1 | 1 |
| Asahi #60G | 60 | 60 | 60 | 60 | 60 |
| PW-380 | 60 | 60 | 60 | 60 | 60 |
| $t_c$ (90) (at 160° C.) (minute) | 1.5 | 0.5 | 1.4 | 17.2 | 8.3 |
| Property of press molded crosslinked rubber |  |  |  |  |  |
| $T_B$ (MPa) | 13.6 | 14.5 | 17.5 | 16.5 | 13.5 |
| $E_B$ (%) | 350 | 300 | 270 | 450 | 380 |
| $H_A$ | 50 | 50 | 50 | 51 | 53 |
| Heat aging resistance |  |  |  |  |  |
| $A_R$ ($T_B$) (%) | 80 | 76 | 77 | 35 | 28 |
| $A_R$ ($E_B$) (%) | 74 | 70 | 75 | 45 | 43 |
| $A_B$ | +5 | +6 | +5 | +15 | +18 |
| Compression set (%) | 30 | 17 | 42 | 75 | 28 |
| Vibration insulation property |  |  |  |  |  |
| $G^*$ ($\times 10^4$ dyn/cm$^2$) | 1.9 | 1.8 | 1.8 | 2.0 | 2.4 |
| tanδ(at 25° C.) ($\times 10^{-2}$) | 8.2 | 7.5 | 11.3 | 13.5 | 12.1 |
| Hot air crosslinked (HAV) rubber property |  |  |  |  |  |
| Scratch resistance | A | A | A | A | D |

*[1]Organohydrodienepolysiloxane represented by $C_6H_5$—Si(OSi(CH$_3$)$_2$H)$_3$

Examples Relating to Glass Run Rubber Composition

Example F1

In a 1.7-liter Banbury mixer (produced by Kobe Steel Ltd.), 100 parts by weight of an ethylene/propylene/5-vinyl-2-norbornene random copolymer rubber (A-1) shown in Table 1, 150 parts by weight of carbon black (trade name: Asahi #60G, available from Asahi Carbon K.K.), 57 parts by weight of a softener (trade name: Diana Process Oil™ PW-380, available from Idemitsu Kosan Co., Ltd.), 5 parts by weight of zinc white No. 1 and 1 part by weight of stearic acid were kneaded.

In detail, the ethylene/propylene/5-vinyl-2-norbornene random copolymer rubber (A-1) was roughly kneaded for 30 seconds, then zinc white No. 1, stearic acid, carbon black and the softener were added, and they were kneaded for 2 minutes. Then, the ram was raised to clean the mixer, and kneading was further conducted for 1 minute, followed by discharging at about 165° C. to obtain a rubber compound (I-1). The kneading was carried out in a fill of 75%.

Thereafter, 313 parts by weight of the rubber compound (I-1) was wound around 8-inch rolls (surface temperature of front roll: 50° C., surface temperature of back roll: 50° C., number of revolutions of front roll: 16 rpm, number of revolutions of back roll: 18 rpm), then thereto were added 3 parts by weight of a SiH group-containing compound (crosslinking agent) represented by $C_6H_5$—Si(OSi(CH$_3$)$_2$H)$_3$ and 0.2 part by weight of ethynylcyclohexanol as a reaction controller, and they were kneaded for 10 minutes, Then, 0.3 part by weight of an isopropyl alcohol solution of chloroplatinic acid having a concentration of 5% by weight was added as a catalyst, and they were kneaded for 5 minutes. The kneadate was sheeted and pressed at 40° C. for 6 minutes using a 50-ton press molding machine to prepare an uncrosslinked rubber sheet having a thickness of 2 mm.

Further, as a measure of a crosslinking rate of the uthermoset kneadate containing a crosslinking agent, $t_c$(90) was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH−ML), and a period of time at the end of which 90% ME is reached is taken as $t_c$(90).

Then, the uncrosslinked rubber sheet was allowed to stand for 5 minutes in HAV (hot air vulcanizing vessel) at 200° C. under no pressure to prepare a crosslinked sheet.

The resulting crosslinked sheet was subjected to the same scratch resistance test as that in Example A1.

Further, the uncrosslinked rubber sheet obtained as above was pressed at 140° C. for 10 minutes using a 150-ton press molding machine to obtain a crosslinked sheet having a thickness of 2 mm. The crosslinked sheet was subjected to tensile test and heat aging resistance test in accordance with the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated.

Further, the uncrosslinked rubber sheet obtained as above was pressed at 140° C. for 10 minutes using a 150-ton press molding machine to obtain a crosslinked sheet having a thickness of 1 mm. The crosslinked sheet was subjected to compression set test and bloom test in accordance with the following methods.

(1) Compression Set Test

The compression set test was carried out in accordance with JIS K6262 (1993). This test was carried out under the conditions of 150° C. and 22 hours.

(2) Bloom Test

After a manufactured article is fitted to an automobile, the surface of the article is sometimes discolored by the influence of the vulcanizing agent and the like. To examine occurrence of this deficiency, the following test was carried out.

A vulcanized rubber (crosslinked) sheet having a thickness of 1 mm obtained as above was immersed in hot water (distilled water) at 70° C., allowed to stand for 24 hours in an oven and taken out to examine whether the sheet was whitened as compared with the original.

The results are set forth in Table 8.

Example F2

The procedure of Example F1 was repeated, except that an ethylene/1-butene/5-vinyl-2-norbornene random copolymer rubber (A-6) was used instead of the ethylene/propylene/5-vinyl-2-norbornene random copolymer rubber (A-1). The temperature of the kneadate discharged from the Banbury mixer was 135° C.

The results are set forth in Table 8.

Example F3

The procedure of Example F1 was repeated, except that an ethylene/propylene/5-vinyl-2-norbornene random copolymer rubber (A-7) was used instead of the ethylene/propylene/5-vinyl-2-norbornene random copolymer rubber (A-1). The temperature of the kneadate discharged from the Banbury mixer was 143° C.

The results are set forth in Table 8.

Comparative Example F1

The procedure of Example F1 was repeated, except that Mitsui EPT3090E (trade name, ethylene/propylene/5-ethylidene-2-norbornene random copolymer rubber of Mitsui Chemicals, Inc.) was used instead of the ethylene/propylene/5-vinyl-2-norbornene random copolymer rubber (A-1), and 1.5 parts by weight of sulfur, 0.5 part by weight of Sanseller M (trade name, vulcanization accelerator, available from Sanshin Kagaku Kogyo K.K.) and 1.0 part by weight of Sanseller TT (trade name, vulcanization accelerator, available from Sanshin Kagaku Kogyo K.K.) were used instead of the SiH group-containing compound, the isopropyl alcohol solution of chloroplatinic acid having a concentration of 5% by weight and ethynylcyclohexanol.

The results are set forth in Table 8.

Comparative Example F2

The procedure of Example F1 was repeated, except that Mitsui EPT3090E (trade name, available from Mitsui Chemicals, Inc.) was used instead of the ethylene/propylene/5-vinyl-2-norbornene random copolymer rubber (A-1), and 11 parts by weight of dicumyl peroxide (DCP, crosslinking agent of Nippon Oils & Fats Co., Ltd.) and 4 parts by weight of triallyl isocyanurate (TAIC, crosslinking assistant of Nippon Kasei K.K.) were used instead of the SiH group-containing compound, the isopropyl alcohol solution of chloroplatinic acid having a concentration of 5% by weight and ethynylcyclohexanol. The temperature of the kneadate discharged from the Banbury mixer was 141° C.

The results are set forth in Table 8.

TABLE 8

|  | Ex. F1 | Ex. F2 | Ex. F3 | Comp. Ex. F1 | Comp. Ex. F2 |
| --- | --- | --- | --- | --- | --- |
| Composition (part(s) by weight) | | | | | |
| Copolymer rubber (A-1) | 100 | | | | |
| Copolymer rubber (A-6) | | 100 | | | |
| Copolymer rubber (A-7) | | | 100 | | |
| Mitsui EPT 3090 E | | | | 100 | 100 |
| SiH group-containing compound*1 | 3 | 3 | 3 | | |
| IPA solution of chloroplatinic acid of 5 wt % | 0.3 | 0.3 | 0.3 | | |
| Ethynylcyclohexanol | 0.2 | 0.2 | 0.2 | | |
| DCP (100%) | | | | | 11 |
| TAIC | | | | | 4 |
| Sulfur | | | | 1.5 | |
| Sanseller M | | | | 0.5 | |
| Sanseller TT | | | | 1 | |
| Zinc white No. 1 | 5 | 5 | 5 | 5 | 5 |
| Stearic acid | 1 | 1 | 1 | 1 | 1 |
| Asahi #60G | 150 | 150 | 150 | 150 | 150 |
| PW-380 | 57 | 57 | 57 | 57 | 57 |
| $t_c$ (90) (at 160° C.) (min) | 1.5 | 0.5 | 1.4 | 17.2 | 8.3 |
| Press crosslinked rubber property | | | | | |
| $T_B$ (MPa) | 8.9 | 10.5 | 11.5 | 11.6 | 9.5 |
| $E_B$ (%) | 300 | 310 | 290 | 320 | 270 |

TABLE 8-continued

|  | Ex. F1 | Ex. F2 | Ex. F3 | Comp. Ex. F1 | Comp. Ex. F2 |
| --- | --- | --- | --- | --- | --- |
| Heat aging resistance | | | | | |
| $A_R$ ($T_B$) (%) | 75 | 78 | 77 | 32 | 28 |
| $A_R$ ($E_B$) (%) | 74 | 76 | 72 | 35 | 35 |
| Compression set (%) | 39 | 25 | 50 | 85 | 40 |
| Hot air crosslinked (HAV) rubber property | | | | | |
| Scratch resistance | A | A | A | A | D |
| Appearance (bleed) | Not changed | Not changed | Not changed | Whitened | Not changed |

*[1]Organohydrogen polysiloxane represented by $C_6H_5$—Si(OSi(CH$_3$)$_2$H)$_3$

Example G1

In a 1.7-liter Banbury mixer (produced by Kobe Steel Ltd.), 100 parts by weight of an ethylene/propylene/5-vinyl-2-norbornene random copolymer rubber (A-8) shown in Table 1, 45 parts by weight of FEF carbon black (trade name: Asahi #60G, available from Asahi Carbon K.K.), 5 parts by weight of zinc white No. 1 and 1 part by weight of stearic acid were kneaded in a brake reservoir hose composition.

In detail, the ethylene/propylene/5-vinyl-2-norbornene copolymer rubber (A-8) was roughly kneaded for 30 seconds, then zinc white No. 1, stearic acid and the FEF carbon black were added, and they were kneaded for 2 minutes. Then, the ram was raised to clean the mixer, and kneading was further conducted for 1 minute, followed by discharging at about 170° C. to obtain a rubber compound (I-1). The kneading was carried out in a fill of 70%.

Thereafter, 151 parts by weight of the rubber compound (I-1) was wound around 8-inch rolls (surface temperature of front roll: 50° C., surface temperature of back roll: 50° C., number of revolutions of front roll: 16 rpm, number of revolutions of back roll: 18 rpm), then thereto were added 3 parts by weight of a SiH group-containing compound (crosslinking agent) represented by $C_6H_5$—Si(OSi(CH$_3$)$_2$H)$_3$ and 0.2 part by weight of ethynylcyclohexanol as a reaction controller, and they were kneaded for 10 minutes. Then, 0.3 part by weight of an isopropyl alcohol solution of chloroplatinic acid having a concentration of 5% by weight was added as a catalyst, and they were kneaded for 5 minutes. The kneadate was sheeted and pressed at 40° C. for 6 minutes using a 50-ton press molding machine to prepare an uncrosslinked rubber sheet having a thickness of 2 mm.

Further, as a measure of a crosslinking rate of the unthermoset kneadate containing a crosslinking agent, $t_c(90)$ was measured under the conditions of a temperature of 160° C. using JSR Curastometer 3 Model (manufactured by Japan Synthetic Rubber Co., Ltd.). A difference between the minimum, value ML of torque and the maximum value MH of torque obtained from a crosslinking (vulcanization) curve is taken as ME (=MH−ML), and a period of time at the end of which 90% ME is reached is taken as $t_c(90)$.

Then, the uncrosslinked rubber sheet was allowed to stand for 5 minutes in HAV (hot air vulcanizing vessel) at 200° C. under no pressure to prepare a crosslinked sheet.

The resulting crosslinked sheet was subjected to the same scratch resistance test as that in Example A1.

Further, the uncrosslinked rubber sheet obtained as above was pressed at 140° C. for 10 minutes using a 150-ton press molding machine to obtain a crosslinked sheet having a thickness of 2 mm. The crosslinked sheet was subjected to tensile test, hardness test, heat aging resistance test and volume resistivity test in accordance with the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Hardness Test

The hardness test was carried out in accordance with JIS K6253 (durometer type A) to measure a hardness.

(3) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated. Further, the crosslinked sheet was aged in an oven at 150° C. for 72 hours, and a hardness test after aging was carried out. Using the hardness $H_1$ before heating and the hardness $H_2$ after heating, a hardness change AH was calculated from the following formula.

$$A_H = H_2 - H_1$$

(4) Volume Resistivity Test

The volume resistivity test was carried out in accordance with Japanese Rubber Institute Standards (SRIS) 2304 (1971) to measure a volume resistivity of the crosslinked sheet.

Further, the uncrosslinked rubber sheet obtained as above was pressed at 140° C. for 15 minutes using a 150-ton press molding machine in accordance with JIS K6250 to obtain a crosslinked sheet. The crosslinked sheet was subjected to compression set test in accordance with the following method.

Compression Set Test

The compression set test was carried out in accordance with JIS K6262 (1993). This test was carried out under the conditions of 150° C. and 22 hours.

The results are set forth in Table 9.

Comparative Example G1

The procedure of Example G1 was repeated, except that an ethylene/propylene/5-ethylidene-2-norbornene copolymer rubber (trade name: EPT #3045, available from Mitsui Chemicals, Inc.) was used instead of the ethylene/propylene/

5-vinyl-2-norbornene random copolymer rubber (A-8). The temperature of the kneadate discharged from the Banbury mixer was 173° C.

The results are set forth in Table 9.

Comparative Example G2

The procedure of Example G1 was repeated, except that an ethylene/propylene/dicyclopentadiene random copolymer rubber (trade name: EPT #1045, available from Mitsui Chemicals, Inc.) was used instead of the ethylene/propylene/5-vinyl-2-norbornene random copolymer rubber (A-8). The temperature of the kneadate discharged from the Banbury mixer was 171° C.

The results are set forth in Table 9.

Comparative Example G3

The procedure of Comparative Example G1 was repeated, except that 6 parts by weight of 40% dicumyl peroxide (trade name: Mitsui DCP-40, available from Mitsui Chemicals, Inc.), 1.5 parts by weight of trimethylolpropane trimethyl acrylate (trade name: Highcross M, Seiko Kagaku K.K.) and 2.0 parts by weight of 2-mercaptobenzimidazole (trade name: Sandant MB, available from Sanshin Kagaku Kogyo K.K.) were used instead of 3 parts by weight of the SiH group-containing compound represented by $C_6H_5$—Si$(OSi(CH_3)_2H)_3$, 0.2 part by weight of ethynylcyclohexanol and 0.2 part by weight of the isopropyl alcohol solution of chloroplatinic acid having a concentration of 5% by weight. Vulcanization to obtain a crosslinked rubber for the property test was carried out at 180° C. for 10 minutes.

The results are set forth in Table 9.

Example G2

Kneading was carried out in the same manner as in Example G1, except that the brake reservoir hose composition in Example G1 was replaced with an automobile water hose composition of 100 parts by weight of an ethylene/propylene/5-vinyl-2-norbornene random copolymer rubber (A-9) shown in Table 1, 95 parts by weight of FEF carbon black (trade name: Asahi #60G, available from Asahi Carbon K.K.), 40 parts by weight of a softener (trade name: PW-380, available from Idemitsu Kosan Co., Ltd.), 5 parts by weight of zinc white No. 1 and 1 part by weight of stearic acid. The temperature of the kneadate discharged from the Banbury mixer was 165° C. The following procedure was carried out in the same manner as in Example G1.

The results are set forth in Table 9.

Example G3

The procedure of Example G2 was repeated, except that the zinc white No. 1 was not used in the automobile water hose composition. The temperature of the kneadate discharged from the Banbury mixer was 167° C.

The results are set forth in Table 9.

Comparative Example G4

The procedure of Example G2 was repeated, except that an ethylene/propylene/5-ethylidene-2-norbornene copolymer rubber (trade name: EPT #3070, available from Mitsui Chemicals, Inc.) was used instead of the ethylene/propylene/5-vinyl-2-norbornene random copolymer rubber (A-9). The temperature of the kneadate discharged from the Banbury mixer was 166° C.

The results are set forth in Table 9.

Comparative Example G5

The procedure of Comparative Example G4 was repeated, except that 0.3 part by weight of sulfur, 0.5 part by weight of N-cyclohexyl-2-benzothiazolyl sulfenamide (trade name: Sanseller CM, available from Sanshin Kagaku Kogyo K.K.), 1.5 part by weight of zinc dibutyldithiocarbamate (trade name: Sanseller BZ, available from Sanshin Kagaku Kogyo K.K.), 0.5 part by weight of tetramethylthiuram disulfide (trade name: Sanseller TT, available from Sanshin Kagaku Kogyo K.K.), 0.5 part by weight of dipentamethylenethiuram tetrasulfide (trade name: Sanseller TRA, available from Sanshin Kagaku Kogyo K.K.) and 1.5 parts by weight of 4,4'-dithiomorpholine (trade name: Sanphel R, available from Sanshin Kagaku Kogyo K.K.) were used instead of 3 parts by weight of the SiH group-containing compound represented by $C_6H_5$—Si$(OSi(CH_3)_2H)_3$, 0.2 part by weight of ethynylcyclohexanol and 0.2 part by weight of the isopropyl alcohol solution of chloroplatinic acid having a concentration of 5% by weight. Vulcanization to obtain a crosslinked rubber for the property test was carried out at 170° C. for 10 minutes.

The results are set forth in Table 9.

Comparative Example G6

The procedure of Comparative Example G4 was repeated, except that 7 parts by weight of 40% dicumyl peroxide (trade name: Mitsui DCP-40, available from Mitsui Chemicals, Inc.), 1.5 parts by weight of trimethylolpropane trimethyl acrylate (trade name: Highcross M, Seiko Kagaku K.K.) and 2.0 parts by weight of 2-mercaptobenzimidazole (trade name:.Sandant MB, available from Sanshin Kagaku Kogyo K.K.) were used instead of 3 parts by weight of the SiH group-containing compound represented by $C_6H_5$—Si$(OSi(CH_3)_2H)_3$, 0.2 part by weight of ethynylcyclohexanol and 0.3 part by weight of the isopropyl alcohol solution of chloroplatinic acid having a concentration of 5% by weight. Vulcanization to obtain a crosslinked rubber for the property test was carried out at 180° C. for 10 minutes.

The results are set forth in Table 9.

TABLE 9

| | Ex. G1 | Comp. Ex. G1 | Comp. Ex. G2 | Comp. Ex. G3 | Ex. G2 | Ex. G3 | Comp. Ex. G4 | Comp. Ex. G5 | Comp. Ex. G6 |
|---|---|---|---|---|---|---|---|---|---|
| Composition (part(s) by weight) | | | | | | | | | |
| Copolymer rubber (A-8) | 100 | | | | | | | | |
| Mitsui EPT#3045 | | 100 | | 100 | | | | | |
| Mitsui EPT#1045 | | | 100 | | | | | | |
| Copolymer rubber (A-9) | | | | | 100 | 100 | | | |
| Mitsui EPT#3070 | | | | | | | 100 | 100 | 100 |

TABLE 9-continued

| | Ex. G1 | Comp. Ex. G1 | Comp. Ex. G2 | Comp. Ex. G3 | Ex. G2 | Ex. G3 | Comp. Ex. G4 | Comp. Ex. G5 | Comp. Ex. G6 |
|---|---|---|---|---|---|---|---|---|---|
| SiH group-containing compound[*1] | 3 | 3 | 3 | | 3 | 3 | 3 | | |
| IPA solution of chloroplatinic acid of 5 Wt % | 0.3 | 0.3 | 0.3 | | 0.3 | 0.3 | 0.3 | | |
| Ethynylcyclohexanol | 0.2 | 0.2 | 0.2 | | 0.2 | 0.2 | 0.2 | | |
| Mitsui DCP-40 | | | | 6 | | | | | 7 |
| Highcross M | | | | 1.5 | | | | | 1.5 |
| Sanseller CM | | | | | | | | 0.5 | |
| Sanseller BZ | | | | | | | | 1.5 | |
| Sanseller TT | | | | | | | | 0.5 | |
| Sanseller TRA | | | | | | | | 0.5 | |
| Sanphel R | | | | | | | | 1.5 | |
| Sulfur | | | | | | | | 0.3 | |
| Zinc white No. 1 | 5 | 5 | 5 | 5 | 5 | | 5 | 5 | 5 |
| Stearic acid | 1 | 1 | 1 | 1 | 1 | 1 | 1 | 1 | 1 |
| Asahi #60G | 45 | 45 | 45 | 45 | 95 | 95 | 95 | 95 | 95 |
| PW-380 | | | | | 40 | 40 | 40 | 40 | 40 |
| Sandant MB | | | | 2 | | | | | 2 |
| $t_c$ (90) (at 160° C.) (min) | 1.6 | Not cross-linked | Not cross-linked | 23 | 1.7 | 1.8 | Not cross-linked | 10 | 18 |
| Press crosslinked rubber property | | | | | | | | | |
| $T_B$ (MPa) | 15.8 | Not cross-linked | Not cross-linked | 16.8 | 13 | 12.5 | Not cross-linked | 16.2 | 13.7 |
| $E_B$ (%) | 230 | | | 210 | 340 | 360 | | 450 | 350 |
| $H_A$ | 68 | | | 69 | 69 | 68 | | 72 | 70 |
| Heat aging resistance | | | | | | | | | |
| $A_R$ ($T_B$) (%) | 110 | Not cross-linked | Not cross-linked | 90 | 115 | 120 | Not cross-linked | 65 | 95 |
| $A_R$ ($E_B$) (%) | 75 | | | 80 | 73 | 67 | | 45 | 85 |
| $A_H$ (point) | +5 | | | +4 | +5 | +7 | | +8 | +4 |
| Compression set (%) | 25 | Not cross-linked | Not cross-linked | 20 | 40 | 43 | Not cross-linked | 76 | 37 |
| Electrical property | — | — | — | — | $5 \times 10^6$ | $2 \times 10^6$ | Not cross-linked | $5 \times 10^3$ | $8 \times 10^8$ |
| Hot air crosslinked (HAV) rubber property Scratch resistance | A | D | D | D | A | A | D | A | D |

[*1]Organohydrogen polysiloxane represented by $C_6H_5—Si(OSi(CH_3)_2H)_3$

Example H1

In a 2.95-liter Banbury mixer (produced by Kobe Steel Ltd.), 100 parts by weight of an ethylene/α-olefin/non-conjugated polyene random copolymer rubber (A-1), 70 parts by weight of silica (trade name: Ultrasil 360, available from Degusa Japan K.K.), 80 parts by weight of a softener (trade name: Diana Process Oil™ PW-90, available from Idemitsu Kosan Co., Ltd.), 5 parts by weight of zinc white, 1 part by weight of stearic acid and 1 part by weight of polyethylene glycol were kneaded.

In detail, the ethylene/propylene/5-vinyl-2-norbornene random copolymer rubber (A-1) was roughly kneaded for 30 seconds, then zinc white, stearic acid, polyethylene glycol, silica and the softener were added, and they were kneaded for 2 minutes. Then, the ram was raised to clean the mixer, and kneading was further conducted for 1 minute, followed by discharging at about 130° C. to obtain a rubber compound (I-1). The kneading was carried out in a fill of 75%.

Thereafter, 257 parts by weight of the rubber compound (I-1) was wound around 8-inch rolls (surface temperature of front roll: 30° C., surface temperature of back roll: 30° C., number of revolutions of front roll: 18 rpm, number of revolutions of back roll: 15 rpm), then thereto were added 7 parts by weight of plastic hollow microparticles (trade name: Micropearl F-30VSD, available from Matsumoto Yushi Seiyaku K.K.) as a blowing agent, 4 parts by weight of a SiH group-containing compound (crosslinking agent) represented by $C_6H_5—Si(OSi(CH_3)_2H)_3$ and 0.4 part by weight of ethynylcyclohexanol as a reaction controller, and they were kneaded for 10 minutes. Then, 0.4 part by weight of an isopropyl alcohol solution of chloroplatinic acid having a concentration of 2% by weight was added as a catalyst, and they were kneaded for 5 minutes. The kneadate was sheeted to give a ribbon-like sheet.

Then, the uncrosslinked rubber compound was extruded by an extruder having a diameter of 50 mm (manufactured by Mitsuba Seisakusho K.K., L/D=16) equipped with a tubular die (inner diameter: 10 mm, wall thickness 1 mm) at a die temperature of 60° C. and a cylinder temperature of 40° C. to produce a tubular molded product. The molded product was crosslinked for 15 minutes in HAV (hot-air vulcanization vessel) at 160° C. to obtain a sponge rubber.

Further, as a measure of a crosslinking rate of the unthermoset kneadate containing a crosslinking agent, $t_c(90)$ was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH−ML), and a period of time at the end of which 90% ME is reached is taken as $t_c(90)$.

The resulting crosslinked sponge rubber was subjected to specific gravity measurement, water absorption measurement, scratch resistance test and compression set test in accordance with the following methods.

(1) Specific Gravity Measurement

From the tubular sponge rubber having been crosslinked by hot air, a specimen of 20 mm×20 mm was punched, and the surface of the specimen was wiped with an alcohol to remove stain. Using an automatic specific gravity hydrometer (M-1 Model, manufactured by Toyo Seiki Seisakusho K.K.), a mass of the specimen in air and that in pure water were measured at 25° C., and from a difference therebetween a specific gravity of the specimen was measured to determine a specific gravity of the sponge rubber.

(2) Water Absorption

From the tubular sponge rubber having been crosslinked by hot air, a specimen of 20 mm×20 mm was punched. The specimen was placed at the position of 50 mm below the surface of water, and the pressure was reduced to 125 mmHg, followed by holding the specimen for 3 minutes. Then, the specimen was put back in the atmosphere. After a lapse of 3 minutes, the weight of the specimen with the absorbed water was measured, and the water absorption was calculated from the following formula.

Water absorption (%)=$[(W_2-W_1)/W_1] \times 100$ $W_1$: weight (g) of specimen before immersion $W_2$: weight (g) of specimen after immersion (3) Scratch Resistance Test The same scratch resistance test as that in Example A1.

(4) Compression Set Test

The same compression set test as that in Example A1.

The results are set forth in Table 10.

Example H2

The procedure of Example H1 was repeated, except that 80 parts by weight of carbon black (trade name: Asahi #50HG, available from Asahi Carbon K.K.), 2.5 parts by weight of an OBSH type blowing agent (trade name: Neoselbon N1000SW, available from Eiwa Kasei Kogyo K.K.) and 1.0 part by weight of an urea type blowing assistant (trade name: Selpaste 101P, available from Eiwa Kasei Kogyo K.K.) were used instead of 70 parts by weight of the Ultrasil 360 (trade name) and 7 parts by weight of the Micropearl F-30VSD (trade name), and the amount of the Diana process PW-90 (trade name) was changed to 70 parts by weight. The temperature of the kneadate discharged from the Banbury mixer was 136° C.

The results are set forth in Table 10.

Comparative Example H1

The procedure of Example H1 was repeated, except that an ethylene/propylene/5-ethylidene-2-norbornene copolymer rubber (A-2) shown in Table 1 was used instead of the ethylene/propylene/5-vinyl-2-norbornene random copolymer rubber (A-1). The temperature of the kneadate discharged from the Banbury mixer was 131° C.

The results are set forth in Table 10.

Comparative Example H2

The procedure of Example H1 was repeated, except that an ethylene/propylene/dicyclopentadiene random copolymer rubber (A-3) shown in Table 1 was used instead of the ethylene/propylene/5-vinyl-2-norbornene random copolymer rubber (A-1). The temperature of the kneadate discharged from the Banbury mixer was 134° C.

The results are set forth in Table 10.

Comparative Example H3

The procedure of Comparative Example H1 was repeated, except that 2.5 parts by weight of oxybisbenzenesulfonyl hydrazide (trade name: Neoselbon N1000SW, available from Eiwa Kasei Kogyo K.K.), 1.0 part by weight of an urea type blowing assistant (trade name: Selpaste 101P, available from Eiwa Kasei Kogyo K.K.), 1.5 parts by weight of sulfur, 1.0 part by weight of 2-mercaptobenzothiazole (trade name: Sanseller M, available from Sanshin Kagaku Kogyo K.K.), 1.0 part by weight of tetramethylthiuram disulfide (trade name: Sanseller DM, available from Sanshin Kagaku Koqyo K.K.), 1.0 part by weight of zinc dibutyldithiocarbamate (trade name: Sanseller BZ, available from Sanshin Kagaku Kogyo K.K.) and 0.3 part by weight of tellurium diethyldithiocarbamate (trade name: Sanseller TE, available from Sanshin Kagaku Kogyo K.K.) were used instead of 7 parts by weight of the Micropearl F-30VSD (trade name, plastic hollow microparticles), 4 parts by weight of the SiH group-containing compound represented by $C_6H_5$—$Si(OSi(CH_3)_2H)_3$, 0.4 part by weight of ethynylcyclohexanol and 0.4 part by weight of the isopropyl alcohol solution of chloroplatinic acid having a concentration of 2% by weight.

The results are set forth in Table 10.

Comparative Example H4

The procedure of Comparative Example H3 was repeated, except that an ethylene/propylene/5-vinyl-2-norbornene random copolymer rubber (A-1) shown in Table 1 was used instead of the ethylene/propylene/5-ethylidene-2-norbornene random copolymer rubber (A-2). The temperature of the kneadate discharged from the Banbury mixer was 129° C.

The results are set forth in Table 10.

TABLE 10

|  | Example | | Comparative example | | | |
| --- | --- | --- | --- | --- | --- | --- |
|  | H1 | H2 | H1 | H2 | H3 | H4 |
| Composition (part(s) by weight) | | | | | | |
| Copolymer rubber (A-1) | 100 | 100 |  |  |  | 100 |
| Copolymer rubber (A-2) |  |  | 100 |  | 100 |  |
| Copolymer rubber (A-3) |  |  |  | 100 |  |  |
| SiH group-containing compound | 4.0 | 4.0 | 4.0 | 4.0 |  |  |
| IPA solution of chloroplatinic acid of 2 wt % | 0.4 | 0.4 | 0.4 | 0.4 |  |  |

TABLE 10-continued

| | Example | | Comparative example | | | |
|---|---|---|---|---|---|---|
| | H1 | H2 | H1 | H2 | H3 | H4 |
| Ethynylcyclohexanol | 0.4 | 0.4 | 0.4 | 0.4 | | |
| Sanseller M | | | | | 1.0 | 1.0 |
| Sanseller DM | | | | | 1.0 | 1.0 |
| Sanseller BZ | | | | | 1.0 | 1.0 |
| Sanseller TE | | | | | 0.3 | 0.3 |
| Zinc white | 5 | 5 | 5 | 5 | 5 | 5 |
| Stearic acid | 1 | 1 | 1 | 1 | 1 | 1 |
| Polyethylene glycol | 1 | 1 | | | | |
| Silica (Ultrasil 360) | 70 | | 70 | 70 | 70 | 70 |
| Carbon black (Asahi #50HG) | | 80 | | | | |
| Softener (PW-90) | 80 | 70 | 80 | 80 | 80 | 80 |
| Blowing agent (Micropearl F-30VSD) | 7 | | 7 | 7 | | |
| Blowing agent (Neoselbon N1000SW) | | 2.5 | | | 2.5 | 2.5 |
| Blowing assistant (Selpaste 101P) | | 1.0 | | | 1.0 | 1.0 |
| Crosslinked rubber property | | | | | | |
| $t_c$ (90) (at 160° C.) (min) | 1.3 | 1.7 | not cross-linked | not cross-linked | 17.2 | 26.5 |
| Specific gravity | 0.52 | 0.55 | | | 0.61 | 0.71 |
| Water absorption (%) | 17 | 9 | | | 8 | 28 |
| CS (150° C. × 22 H) (%) | 43 | 51 | | | 84 | 92 |
| Scratch resistance | A | A | D | D | B | C |

Example J1

In a 1.7-liter Banbury mixer (produced by Kobe Steel Ltd.), 100 parts by weight of an ethylene/propylene/5-vinyl-2-norbornene random copolymer rubber (A-1) shown in Table 1, 50 parts by weight of silica (trade name: Ultrasil 360, available from Degusa Japan K.K.), 50 parts by weight of talc (trade name: Mistron Paper Talc, available from Nippon Mistron K.K.), 70 parts by weight of a softener (trade name: Diana Process Oil™ PW-380, available from Idemitsu Kosan Co., Ltd.), 5 parts by weight of zinc white No. 1 and 1 part by weight of stearic acid were kneaded.

In detail, the ethylene/propylene/5-vinyl-2-norbornene copolymer rubber (A-1) was roughly kneaded for 30 seconds, then zinc white No. 1, stearic acid, silica, talc and the softener were added, and they were kneaded for 2 minutes. Then, the ram was raised to clean the mixer, and kneading was further conducted for 1 minute, followed by discharging at about 120° C. to obtain a rubber compound (I-1). The kneading was carried out in a fill of 70%.

Thereafter, 276 parts by weight of the rubber compound (I-1) was wound around 8-inch rolls (surface temperature of front roll: 30° C., surface temperature of back roll: 30° C., number of revolutions of front roll: 16 rpm, number of revolutions of back roll: 18 rpm), then thereto were added 30 parts by weight of plastic hollow microparticles (trade name: Micropearl F-30VSD, available from Matsumoto Yushi Seiyaku K.K.), 4 parts by weight of a SiH group-containing compound (crosslinking agent) represented by $C_6H_5$—Si$(OSi(CH_3)_2H)_3$ and 0.4 part by weight of ethynylcyclohexanol as a reaction controller, and they were kneaded for 10 minutes. Then, 0.4 part by weight of an isopropyl alcohol solution of chloroplatinic acid having a concentration of 2% by weight was added as a catalyst, and they were kneaded for 5 minutes, followed by sheeting the kneadate.

Then, the uncrosslinked and unexpanded rubber compound was extruded by a 50 mm extruder (manufactured by Mitsuba Seisakusho K.K., L/D=16) equipped with a circular die (diameter: 10 mm) under the conditions of a die temperature of 60° C. and a cylinder temperature of 40° C. to obtain a molded product. The molded product was crosslinked and expanded in HAV (hot air vulcanizing vessel) at 160° C. for 15 minutes.

Further, as a measure of a crosslinking rate of the unthermoset kneadate containing a crosslinking agent, $t_c(90)$ was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH−ML), and a period of time at the end of which 90% ME is reached is taken as $t_c(90)$.

The resulting crosslinked sponge was subjected to scratch resistance test, specific gravity measurement, water absorption measurement, Asker C hardness test, sheet metal stain test and compression set test in accordance with the following methods.

(1) Scratch Resistance Test

The same scratchr resistance test as that in Example A1.

(2) Specific Gravity Measurement

From the tubular sponge rubber having been crosslinked by hot air, a specimen of 20 mm×20 mm was punched, and the surface of the specimen was wiped with an aldohol to remove stain. Using an automatic specific gravity hydrometer (M-1 Model, manufactured by Toyo Seiki Seisakusho K.K.), a mass of the specimen in air and that in pure water were measured at 25° C., and from a difference therebetween a specific gravity of the specimen was measured to determine a specific gravity of the sponge rubber.

(2) Water Absorption

From the tubular sponge rubber having been crosslinked by hot air, a specimen of 20 mm×20 mm was punched. The specimen was placed at the position of 50 mm below the surface of water, and the pressure was reduced to 125 mmHg, followed by holding the specimen for 3 minutes. Then, the specimen was put back in the atmosphere. After a lapse of 3 minutes, the weight of the specimen with the absorbed water was measured, and the water absorption was calculated from the following formula.

Water absorption (%)=[$(W_2-W_1)/W_1$]×100

$W_1$: weight (g) of specimen before immersion
$W_2$: weight (g) of specimen after immersion (4) Asker C Hardness Test The Asker C hardness was measured in accordance with JIS S6050.

(5) Sheet Metal Stain Test

The sheet metal stain test was carried out in accordance with JIS K6267 to measure a difference in color ($\Delta E^*_{ab}$) between a sample for comparison and a stained material.

Test Conditions

Temperature: 70° C.

Testing time: 24 hours

Sheet metal: 0.9 mm metal sheet coated with white acrylic enamel (6) Compression Set Test The compression set test was carried out in accordance with JIS K6262 (1993). This test was carried out under the conditions of 150° C. and 22 hours.

The results are set forth in Table 11.

Example J2

The procedure of Example J1 was repeated, except that an ethylene/propylene/5-vinyl-2-norbornene random copolymer rubber (A-8) was used instead of the ethylene/propylene/5-vinyl-2-norbornene random copolymer rubber (A-1).

The results are set forth in Table 11.

Example J3

The procedure of Example J1 was repeated, except that 50 parts by weight of carbon black (trade name: Asahi #60G, available from Asahi Carbon K.K.), 40 parts by weight of an OBSH type blowing agent (trade name: Neoselbon 1000SW, available from Eiwa Kasei Kogyo K.K.) and 5 parts by weight of an urea type blowing assistant (trade name: Selpaste 101P, available from Eiwa Kasei Kogyo K.K.) were used instead of 50 parts by weight of the Ultrasil 360 (trade name) and 30 parts by weight of the Micropearl F-30VSD (trade name). The temperature of the kneadate discharged from the Banbury mixer was 122° C.

The results are set forth in Table 11.

Comparative Example J1

The procedure of Example J1 was repeated, except that an ethylene/propylene/5-ethylidene-2-norbornene copolymer rubber (A-2) shown in Table 1 was used instead of the ethylene/propylene/5-vinyl-2-norbornene random copolymer rubber (A-1). The temperature of the kneadate discharged from the Banbury mixer was 124° C.

The results are set forth in Table 11.

Comparative Example J2

The procedure of Example J1 was repeated, except that an ethylene/propylene/dicyclopentadiene random copolymer rubber (A-3) shown in Table 1 was used instead of the ethylene/propylene/5-vinyl-2-norbornene random copolymer rubber (A-1). The temperature of the kneadate discharged from the Banbury mixer was 122° C.

The results are set forth in Table 11.

Comparative Example J3

The procedure of Comparative Example J1 was repeated, except that 1.5 parts by weight of sulfur, 1 part by weight of 2-mercaptobenzothiazole (trade name: Sanseller M, available from Sanshin Kagaku Kogyo K.K.), 1.0 part by weight of zinc dibutyldithiocarbamate (trade name: Sanseller BZ, available from Sanshin Kagaku Kogyo K.K.) and 1 part by weight of dimethyldithiocarbamic acid (trade name: Sanseller PZ, available from Sanshin Kagaku Kogyo K.K.) were used instead of 4 parts by weight of the SiH group-containing compound represented by $C_6H_5$—$Si(OSi(CH_3)_2H)_3$, 0.4 part by weight of ethynylcyclohexanol and 0.4 part by weight of the isopropyl alcohol solution of chloroplatinic acid having a concentration of 2% by weight.

The results are set forth in Table 11.

Comparative Example J4

The procedure of Comparative Example J3 was repeated, except that an ethylene/propylene/5-vinyl-2-norbornene random copolymer rubber (A-1) was used instead of the ethylene/propylene/5-ethylidene-2-norbornene random copolymer rubber (A-2). The temperature of the kneadate discharged from the Banbury mixer was 132° C.

The results are set forth in Table 11.

Comparative Example J5

The procedure of Comparative Example J1 was repeated, except that 1.3 parts by weight of dicumyl peroxide (trade name: Mitsui DCP, available from Mitsui Chemicals, Inc.) was used instead of 4 parts by weight of the SiR group-containing compound represented by $C_6H_5$—$Si(OSi(CH_3)_2H)_3$, 0.4 part by weight of ethynylcyclohexanol and 0.4 part by weight of the isopropyl alcohol solution of chloroplatinic acid having a concentration of 2% by weight.

The results are set forth in Table 11.

|  | Example | | | Comparative Example | | | | |
| --- | --- | --- | --- | --- | --- | --- | --- | --- |
|  | J1 | J2 | J3 | J1 | J2 | J3 | J4 | J5 |
| Composition (part(s) by weight) | | | | | | | | |
| Copolymer rubber (A-1) | 100 |  | 100 |  |  |  | 100 | 100 |
| Copolymer rubber (A-8) |  | 100 |  |  |  |  |  |  |
| Copolymer rubber (A-2) |  |  |  | 100 |  | 100 |  |  |
| Copolymer rubber (A-3) |  |  |  |  | 100 |  |  |  |
| SiH group-containing compound | 4 | 4 | 4 | 4 | 4 |  |  |  |
| IPA solution of chloroplatinic acid of 2 wt % | 0.4 | 0.4 | 0.4 | 0.4 | 0.4 |  |  |  |
| Ethynylcyclohexanol | 0.4 | 0.4 | 0.4 | 0.4 | 0.4 |  |  |  |
| Dicumyl peroxide |  |  |  |  |  |  |  | 1.3 |
| Sulfur |  |  |  |  |  | 1.5 | 1.5 |  |
| Sanseller M |  |  |  |  |  | 1 | 1 |  |
| Sanseller BZ |  |  |  |  |  | 1 | 1 |  |

-continued

|  | Example | | | Comparative Example | | | | |
| --- | --- | --- | --- | --- | --- | --- | --- | --- |
|  | J1 | J2 | J3 | J1 | J2 | J3 | J4 | J5 |
| Sanseller PZ |  |  |  |  |  | 1 | 1 |  |
| Zinc white No. 1 | 5 | 5 | 5 | 5 | 5 | 5 | 5 | 5 |
| Stearic acid | 1 | 1 | 1 | 1 | 1 | 1 | 1 | 1 |
| Mistron Paper Talc | 50 | 50 | 50 | 50 | 50 | 50 | 50 | 50 |
| Carbon black (Asahi #60G) |  |  | 50 |  |  |  |  |  |
| Silica (Ultrasil 360) | 50 | 50 |  | 50 | 50 | 50 | 50 | 50 |
| Softener (PW-380) | 70 | 70 | 70 | 70 | 70 | 70 | 70 | 70 |
| Blowing agent (Micropearl F-30VSD) | 30 | 30 |  | 30 | 30 | 30 | 30 | 30 |
| Blowing agent (Neoselbon 1000SW) |  |  | 40 |  |  |  |  |  |
| Blowing assistant (Selpaste 101P) |  |  | 5 |  |  |  |  |  |
| Crosslinked rubber property |  |  |  |  |  |  |  |  |
| $t_c$ (90) (at 160° C.) (min) | 1.5 | 1.8 | 1.7 | not cross-linked | not cross-linked | 3.5 | 5.6 | 15 |
| CS (150° C. × 22 H) (%) | 46 | 58 | 50 |  |  | 79 | 88 | 32 |
| Specific gravity | 0.1 | 0.15 | 0.2 |  |  | 0.1 | 0.1 | 0.2 |
| Water absorption (%) | 25 | 35 | 28 |  |  | 32 | 45 | 32 |
| Asker C hardness | 4 | 5 | 12 |  |  | 4 | 5 | 15 |
| Sheet metal stain property (ΔE*ab) | 0.2 | 0.5 | 0.2 |  |  | 1.5 | 1.8 | 1.2 |
| Scratch resistance | A | A | A | D | D | A | A | D |

Example K1

In a 1.7-liter Banbury mixer (produced by Kobe Steel Ltd.), 100 parts by weight of an ethylene/propylene/5-vinyl-2-norbornene random copolymer rubber (A-1) shown in Table 1, 100 parts by weight of talc (trade name: Mistron Paper Talc, available from Nippon Mistron K.K.), 35 parts by weight of a softener (trade name: Diana Process Oil™ PW-380, available from Idemitsu Kosan Co., Ltd.), 5 parts by weight of zinc white No. 1 and 1 part by weight of stearic acid were kneaded.

In detail, the ethylene/propylene/5-vinyl-2-norbornene copolymer rubber (A-1) was roughly kneaded for 30 seconds, then zinc white No. 1, stearic acid, talc and the softener were added, and they were kneaded for 2 minutes. Then, the ram was raised to clean the mixer, and kneading was further conducted for 1 minute, followed by discharging at about 130° C. to obtain a rubber compound (I-1). The kneading was carried out in a fill of 70%.

Thereafter, 241 parts by weight of the rubber compound (I-1) was wound around 8-inch rolls (surface temperature of front roll: 50° C., surface temperature of back roll: 50° C., number of revolutions of front roll: 16 rpm, number of revolutions of back roll: 18 rpm), then thereto were added 3 parts by weight of a SiH group-containing compound (crosslinking agent) represented by $C_6H_5$—$Si(OSi(CH_3)_2H)_3$ and 0.2 part by weight of ethynylcyclohexanol as a reaction controller, and they were kneaded for 10 minutes. Then, 0.3 part by weight of an isopropyl alcohol solution of chloroplatinic acid having a concentration of 5% by weight was added as a catalyst, and they were kneaded for 5 minutes. The kneadate was sheeted and pressed at 40° C. for 6 minutes using a 50-ton press molding machine to prepare an uncrosslinked rubber sheet having a thickness of 2 mm.

Further, as a measure of a crosslinking rate of the unthermoset kneadate containing a crosslinking agent, $t_c$(90) was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH−ML), and a period of time at the end of which 90% ME is reached is taken as $t_c$(90).

Then, the uncrosslinked rubber sheet was allowed to stand for 5 minutes in HAV (hot air vulcanizing vessel) at 200° C. under no pressure to prepare a crosslinked sheet.

The resulting crosslinked sheet was subjected to the same scratch resistance test as that in Example A1.

Further, the uncrosslinked rubber sheet obtained as above was pressed at 140° C. for 10 minutes using a 150-ton press molding machine to obtain a crosslinked sheet having a thickness of 2 mm. The crosslinked sheet was subjected to tensile test and heat aging resistance test in accordance with the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated.

Moreover, the uncrosslinked rubber sheet obtained as above was pressed at 140° C. for 10 minutes using a 150-ton press molding machine to obtain a crosslinked sheet having a thickness of 1 mm. The crosslinked sheet was subjected to volume resistivity test in accordance with the following method.

Volume Resistivity Test

The volume resistivity test was carried out in accordance with Japanese Rubber Institute Standards SRIS 2304 (1971) to measure a volume resistivity of the crosslinked sheet.

Furthermore, the uncrosslinked rubber sheet obtained as above was pressed at 140° C. for 15 minutes using a 150-ton press molding machine to obtain a crosslinked sheet. The crosslinked sheet was subjected to compression set test in accordance with the following method.

Compression Set Test

The compression set test was carried out in accordance with JIS K6262 (1993). This test was carried out under the conditions of 150° C. and 22 hours.

The results are set forth in Table 12.

Example K2

The procedure of Example K1 was repeated, except that 50 parts by weight of carbon black (trade name: Asahi #60G, available from Asahi Carbon K.K.) and 50 parts by weight of silica (trade name: Nipseal VN3, available from Nippon Silica K.K.) were used instead of 100 parts by weight of Mistron Paper Talc (trade name). The temperature of the kneadate discharged from the Banbury mixer was 135° C.

The results are set forth in Table 12.

Example K3

The procedure of Example K1 was repeated, except that an ethylene/propylene/5-vinyl-2-norbornene copolymer rubber (A-2) shown in Table 1 was used instead of the ethylene/propylene/5-vinyl-2-norbornene random copolymer rubber (A-8). The temperature of the kneadate discharged from the Banbury mixer was 142° C.

The results are set forth in Table 12.

Comparative Example K1

The procedure of Example K1 was repeated, except that an ethylene/propylene/5-ethylidene-2-norbornene copolymer rubber (A-2) shown in Table 1 was used instead of the ethylene/propylene/5-vinyl-2-norbornene random copolymer rubber (A-1). The temperature of the kneadate discharged from the Banbury mixer was 134° C.

The results are set forth in Table 12.

Comparative Example K2

The procedure of Example K1 was repeated, except that an ethylene/propylene/dicyclopentadiene random copolymer rubber (A-3) shown in Table 1 was used instead of the ethylene/propylene/5-vinyl-2-norbornene random copolymer rubber (A-1). The temperature of the kneadate discharged from the Banbury mixer was 132° C.

The results are set forth in Table 12.

Comparative Example K3

The procedure of Comparative Example K1 was repeated, except that 1.5 parts by weight of sulfur, 0.5 part by weight of 2-mercaptobenzothiazole (trade name: Sanseller M, available from Sanshin Kagaku Kogyo K.K.) and 1.0 part by weight of tetramethylthiuram disulfide (trade name: Sanseller TT, available from Sanshin Kagaku Kogyo K.K.) were used instead of 3 parts by weight of the SiH group-containing compound represented by $C_6H_5$—$Si(OSi(CH_3)_2H)_3$, 0.2 part by weight of ethynylcyclohexanol and 0.2 part by weight of the isopropyl alcohol solution of chloroplatinic acid having a concentration of 5% by weight.

The results are set forth in Table 12.

Comparative Example K4

The procedure of Comparative Example K3 was repeated, except that an ethylene/propylene/5-vinyl-2-norbornene random copolymer rubber (A-1) shown in Table 1 was used instead of the ethylene/propylene/5-ethylidene-2-norbornene random copolymer rubber (A-2). The temperature of the kneadate discharged from the Banbury mixer was 132° C.

The results are set forth in Table 12.

TABLE 12

|  | Example | | | Comparative Example | | | |
| --- | --- | --- | --- | --- | --- | --- | --- |
|  | K1 | K2 | K3 | K1 | K2 | K3 | K4 |
| Composition (parts by weight) | | | | | | | |
| Copolymer Rubber (A-1) | 100 | 100 |  |  |  |  | 100 |
| Copolymer Rubber (A-8) |  |  | 100 |  |  |  |  |
| Copolymer Rubber (A-2) |  |  |  | 100 |  | 100 |  |
| Copolymer Rubber (A-3) |  |  |  |  | 100 |  |  |
| SiH group-containing compound | 3 | 3 | 3 | 3 | 3 |  |  |
| IPA solution of chloroplatinic acid of 5 wt % | 0.3 | 0.3 | 0.3 | 0.3 | 0.3 |  |  |
| Ethynylcyclohexanol | 0.2 | 0.2 | 0.2 | 0.2 | 0.2 |  |  |
| Sulfur |  |  |  |  |  | 1.5 | 1.5 |
| Sanseller M |  |  |  |  |  | 0.5 | 0.5 |
| Sanseller TT |  |  |  |  |  | 1 | 1 |
| Zinc white | 5 | 5 | 5 | 5 | 5 | 5 | 5 |
| Stearic acid | 1 | 1 | 1 | 1 | 1 | 1 | 1 |
| Mistron Paper Talc | 100 |  | 100 | 100 | 100 | 100 | 100 |
| Carbon black (Asahi #60G) |  | 50 |  |  |  |  |  |
| Silica (Nipseal VN3) |  | 50 |  |  |  |  |  |
| Softener (PW-380) | 35 | 35 | 35 | 35 | 35 | 35 | 35 |
| Crosslinked rubber property | | | | | | | |
| $t_c$ (90) (at 160° C.) (min) | 1.5 | 0.5 | 1.4 | not cross-linked | not cross-linked | 16.3 | 23.5 |
| CS (150° C. × 22 h) (%) | 39 | 25 | 50 |  |  | 75 | 88 |
| Volume resistivity (Ω · cm) | $2 \times 10^{16}$ | $3 \times 10^7$ | $2 \times 10^{16}$ |  |  | $9 \times 10^{14}$ | $1 \times 10^{15}$ |
| Heat aging resistance (150° C. × 72 H) | | | | | | | |
| $A_R$ ($T_B$) (%) | 65 | 95 | 62 |  |  | 32 | 28 |
| $A_R$ ($E_B$) (%) | 51 | 71 | 50 |  |  | 25 | 23 |
| $T_B$ (Mpa) | 5.3 | 10.2 | 10.4 |  |  | 14.5 | 8.5 |
| $E_B$ (%) | 200 | 160 | 340 |  |  | 390 | 480 |
| Scratch resistance | A | A | A | D | D | A | A |

95

Example L1

In a 1.7-liter Banbury mixer, 100 parts by weight of an ethylene/propylene/5-vinyl-2-norbornene random copolymer rubber (A-1), 5 parts by weight of two kinds of zinc oxides (trade name: zinc white No. 1, available from Sakai Kagaku Kogyo K.K.), 1 part by weight of stearic acid (trade name: Tsubaki, available from Nippon Oils & Fats Co., Ltd.) and 45 parts by weight of carbon black (trade name: Shiest 116G, available from Tokai Carbon K.K., arithmetic mean particle diameter: 38 m$\mu$) were kneaded.

In detail, the ethylene/propylene/5-vinyl-2-norbornene copolymer rubber (A-1) was roughly kneaded for 30 seconds, then zinc white No. 1, stearic acid and carbon black were added, and they were kneaded for 2 minutes. Then, the ram was raised to clean the mixer, and kneading was further conducted for 1 minute, followed by discharging at about 150° C. to obtain a rubber compound (I-1). The kneading was carried out in a fill of 70%.

Thereafter, 151 parts by weight of the rubber compound (I-1) was wound around 8-inch rolls (surface temperature of front roll: 30° C., surface temperature of back roll: 30° C., number of revolutions of front roll: 16 rpm, number of revolutions of back roll: 18 rpm), then thereto were added 2 parts by weight of a SiH group-containing compound (crosslinking agent) represented by $C_6H_5$—$Si(OSi(CH_3)_2H)_3$ and 0.2 part by weight of ethynylcyclohexanol as a reaction controller, and they were kneaded for 10 minutes. Then, 0.5 part by weight of an isopropyl alcohol solution of chloroplatinic acid having a concentration of 5% by weight was added as a catalyst, and they were kneaded for 5 minutes. The kneadate (1) was sheeted and pressed at 40° C. for 6 minutes using a 50-ton press molding machine to prepare an uncrosslinked rubber sheet (I) having a thickness of 2 mm.

Further, as a measure of a crosslinking rate of the unthermoset kneadate containing a crosslinking agent, $t_c(90)$ was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH–ML), and a period of time at the end of which 90% ME is reached is taken as $t_c(90)$.

Then, the kneadate (1) was hot pressed at a mold temperature of 140° C. for 10 minutes using a 150-ton press molding machine (manufactured by Kotaki Seiki K.K.) to prepare a crosslinked sheet having a thickness of 2 mm. The crosslinked sheet was subjected to tensile test, hardness test, heat aging resistance test and liquid resistance test. Further, the kneadate was heated at a mold temperature of 140° C. for 15 minutes to prepare a column-like block having a diameter of 29.0 mm and a thickness of 12.7 mm, and the block was subjected to compression set test. These tests were carried out by the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Hardness Test

The durometer hardness test (type A) was carried out at a measuring temperature of 23° C. in accordance with JIS K6253 to measure a hardness.

(3) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated. Further, the crosslinked sheet was aged in an oven at 150° C. for 72 hours, then a durometer hardness test (type A) was carried out at a measuring temperature of 23° C. in accordance with JIS K6253 to measure a hardness after aging, and a hardness change $A_H$ after aging was calculated.

(4) Liquid Resistance Test

The crosslinked rubber sheet was immersed in a DOT-3 brake liquid at 150° C. for 70 hours in accordance with JIS K6253, and then degree of swelling of the crosslinked rubber sheet was calculated.

(5) Compression Set Test

The compression set test was carried out in accordance with JIS K6262 (1993). This test was carried out under the conditions of 150° C. and 22 hours.

Then, the uncrosslinked rubber sheet (I) was allowed to stand for 5 minutes in HAV (hot air vulcanizing vessel) at 200° C. under no pressure to prepare a crosslinked sheet.

The resulting crosslinked sheet was subjected to the same scratch resistance test as that in Example A1.

The results are set forth in Table 13.

Comparative Example L1

The procedure of Example L1 was repeated, except that an ethylene/propylene/5-ethylidene-2-norbornene copolymer rubber (A-2) shown in Table 1 was used instead of the ethylene/propylene/5-vinyl-2-norbornene random copolymer rubber (A-1), and the mold temperature during the hot pressing was changed to 170° C. The temperature of the kneadate discharged from the Banbury mixer was 134° C.

The results are set forth in Table 13.

Comparative Example L2

The procedure of Example L1 was repeated, except that an ethylene/propylene/dicyclopentadiene random copolymer rubber (A-3) shown in Table 1 was used instead of the ethylene/propylene/5-vinyl-2-norbornene random copolymer rubber (A-1), and the mold temperature during the hot pressing was changed to 170° C. The temperature of the kneadate discharged from the Banbury mixer was 132° C.

The results are set forth in Table 13.

Comparative Example L3

The procedure of Comparative Example L1 was repeated, except that 1.7 parts by weight of dicumyl peroxide (DCP) of 100% concentration was used instead of 2 parts by weight of the SiH group-containing compound represented by $C_6H_5$—$Si(OSi(CH_3)_2H)_3$, 0.2 part by weight of ethynylcyclohexanol and 0.5 part by weight of the isopropyl alcohol solution of chloroplatinic acid having a concentration of 5% by weight, and the mold temperature during the hot pressing was changed to 170° C.

The results are set forth in Table 13.

Comparative Example L4

The procedure of Comparative Example L1 was repeated, except that an ethylene/propylene/dicyclopentadiene random copolymer rubber (A-3) shown in Table 1 was used instead of the ethylene/propylene/5-ethylidene-2-norbornene random copolymer rubber (A-2), and 0.5 part by weight of CBS (trade name: Sanseller CM, available from Sanshin Kagaku Kogyo K.K.), 0.7 part by weight of ZnBDC (trade name: Sanseller BZ, available from Sanshin Kagaku Kogyo K.K.), 0.7 part by weight of TMTD (trade name: Sanseller TT, available from Sanshin Kagaku Kogyo K.K.), 0.5 part by weight of DPTT (trade name: Sanseller TRA, available from Sanshin Kagaku Kogyo K.K.), 0.5 part by weight of TeEDC (trade name: Sanseller EZ, available from Sanshin Kagaku Kogyo K.K.) and 1.0 part by weight of sulfur were used as vulcanization accelerators instead of 2 parts by weight of the SiH group-containing compound represented by $C_6H_5$—$Si(OSi(CH_3)_2H)_3$, 0.2 part by weight of ethynylcyclohexanol and 0.5 part by weight of the isopropyl alcohol solution of chloroplatinic acid having a concentration of 5% by weight.

The results are set forth in Table 13.

from Nippon Nistron Co.) and 1 part by weight of Polyethylene glycol (molecular weight: 4000) as an activator were kneaded.

In detail, the ethylene/propylene/5-vinyl-2-norbornene copolymer rubber (A-1) was roughly kneaded for 30 seconds, then zinc white No. 1, stearic acid, carbon black, talc and the activator were added, and they were kneaded for 2 minutes. Then, the ram was raised to clean the mixer, and kneading was further conducted for 1 minute, followed by discharging at about 150° C. to obtain a rubber compound (I-1). The kneading was carried out in a fill of 70%.

Thereafter, 217 parts by weight of the rubber compound (I-1) was wound around 8-inch rolls (surface temperature of front roll: 30° C., surface temperature of back roll: 30° C., number of revolutions of front roll: 16 rpm, number of revolutions of back roll: 18 rpm), then thereto were added 2

TABLE 13

|  | Example | Comparative Example | | | |
|---|---|---|---|---|---|
|  | L1 | L1 | L2 | L3 | L4 |
| Composition (parts by weight) | | | | | |
| Copolymer rubber (A-1) | 100 | | | 100 | |
| Copolymer rubber (A-2) | | 100 | | | |
| Copolymer rubber (A-3) | | | 100 | | 100 |
| SiH group containing compound*1 | 2 | 2 | 2 | | |
| IPA solution of chloroplatinic acid of 5 wt % | 0.5 | 0.5 | 0.5 | | |
| Ethynylcyclohexanol | 0.2 | 0.2 | 0.2 | | |
| DCP (100%) | | | | 2.7 | |
| CBS | | | | | 0.5 |
| ZnBDC | | | | | 0.7 |
| TMTD | | | | | 0.7 |
| DPTT | | | | | 0.5 |
| TeEDC | | | | | 0.5 |
| Sulfur | | | | | 1.0 |
| $t_c$ (90) (at 160° C.) (min.) | | | | 30 | 20 |
| Crosslinking conditions (press crosslinking) | 140° C. 10 min. | 170° C. 10 min. | 170° C. 10 min. | 170° C. 10 min. | 140° C. 10 min. |
| Press crosslinked rubber property | | | | | |
| Dry property | | | | | |
| $T_B$ (Mpa) | 16.3 | not cross-linked | not cross-linked | 17.6 | 18.5 |
| $E_B$ (%) | 250 | | | 260 | 250 |
| Heat aging resistance | | | | | |
| $A_R$ ($T_B$) (%) | 97 | | | 95 | 89 |
| $A_R$ ($E_B$) (%) | 95 | | | 87 | 53 |
| $A_H$ (point) | +1 | | | +1 | +3 |
| Compression set (%) | 10 | | | 13 | 39 |
| Liquid resistance | | | | | |
| ΔV (%) | +3 | | | +5 | +9 |
| Hot air crosslinked (HAV) rubber property | | | | | |
| Scratch resistance | A | D | D | D | A |

*1Organohydrogen polysiloxane represented by $C_6H_5$—$Si(OSi(CH_3)_2H)_3$
*2Each of the compositions of Ex. L1 and Comp. Ex. L1 to L3 contains 5 parts by weight of zinc white No. 1, 1 part by weight of stearic acid and 45 parts by weight of carbon black Example M1

In a 1.7-liter Banbury mixer, 100 parts by weight of an ethylene/propylene/5-vinyl-2-norbornene random copolymer rubber (A-1) shown in Table 1, 5 parts by weight of two kinds of zinc oxides (trade name: zinc white No. 1, available from Sakai Kagaku Kogyo K.K.), 1 part by weight of stearic acid (trade name: Tsubaki, available from Nippon Oils & Fats Co., Ltd.), 40 parts by weight of carbon black (trade name: Shiest 116G, available from Tokai Carbon K.K., arithmetic mean particle diameter: 38 mμ), 70 parts by weight of talc (trade name: Mistron Paper Talc, available parts by weight of a SiH group-containing compound (crosslinking agent) represented by $C_6H_5$—$Si(OSi(CH_3)_2H)_3$ and 0.2 part by weight of ethynylcyclohexanol as a reaction controller, and they were kneaded for 10 minutes. Then, 0.5 part by weight of an isopropyl alcohol solution of chloroplatinic acid having a concentration of 5% by weight was added as a catalyst, and they were kneaded for 5 minutes. The kneadate (1) was sheeted and pressed at 40° C. for 6 minutes using a 50-ton press molding machine to prepare an uncrosslinked rubber sheet having a thickness of 2 mm.

Further, as a measure of a crosslinking rate of the unthermoset kneadate containing a crosslinking agent, $t_c(90)$ was measured under the conditions of a temperature of 160° C. using JSR Curastometer 3 Model (manufactured by Japan Synthetic Rubber Co., Ltd.). A difference between the minimum value ML of torque and the maximum value MH of torque obtained from a crosslinking (vulcanization) curve is taken as ME (=MH−ML), and a period of time at the end of which 90% ME is reached is taken as $t_c(90)$.

Then, the kneadate (1) was hot pressed at a mold temperature of 140° C. for 10 minutes using a 150-ton press molding machine (manufactured by Kotaki Seiki K.K.) to prepare a crosslinked sheet having a thickness of 2 mm. The crosslinked sheet was subjected to tensile test, heat aging resistance test and measurement of degree of swelling (ΔV) in ethylene glycol.

Further, the kneadate was heated at a mold temperature of 140° C. for 15 minutes to prepare a column-like block having a diameter of 29.0 mm and a thickness of 12.7 mm, and the block was subjected to compression set test to measure compression set (CS). These tests were carried out in accordance with the following methods.

(1) Tensile Test

The tensile test was carried out at a measuring temperature of 23° C. and a pulling rate of 500 mm/min in accordance with JIS K6251 to measure strength at break $T_B$ and elongation at break $E_B$ of the crosslinked sheet.

(2) Heat Aging Resistance Test

The heat aging resistance test was carried out in accordance with JIS K6257. That is, the crosslinked sheet was aged in an oven at 150° C. for 72 hours and then subjected to tensile test under the conditions of a measuring temperature of 23° C. and a pulling rate of 500 mm/min to measure elongation at break and strength at break, from which retention of tensile strength $A_R(T_B)$ and retention of elongation $A_R(E_B)$ were calculated. Further, the crosslinked sheet was aged in an oven at 120° C. for 70 hours, then a durometer hardness test (type A) was carried out at a measuring temperature of 23° C. in accordance with JIS K6253 to measure a hardness after aging, and a hardness change $A_H$ after aging was calculated.

(3) Measurement of Degree of Swelling in Ethylene Glycol

The crosslinked rubber sheet was immersed in an ethylene glycol solution at 100° C. for 24 hours, and then degree of swelling (ΔV) of the crosslinked rubber sheet was measured in accordance with JIS K6258.

(4) Compression Set Test

The compression set test was carried out in accordance with JIS K6262 (1993). This test was carried out under the conditions of 150° C. and 22 hours.

Then, the uncrosslinked rubber sheet (I) was allowed to stand for 5 minutes in HAV (hot air vulcanizing vessel) at 200° C. under no pressure to prepare a crosslinked sheet.

Further, a mold stain test was carried out in the following manner. That is, injection molding was conducted using a vertical injection molding machine (VI-75P, manufactured by Matsuda Seisakusho K.K.) under the conditions of a stroke of 7.7 mm, a maximum mold clamping force of 75 tons, a crosslinking temperature of 160° C. and a crosslinking time of 100 seconds to measure the number of shots at which stain took place on the surface of a mold. The number of shots was taken as an indication of mold stain resistance.

The crosslinked sheet obtained above was subjected to the same scratch resistance test as that in Example A1.

The results are set forth in Table 14.

Comparative Example M1

The procedure of Example M1 was repeated, except that an ethylene/propylene/5-ethylidene-2-norbornene copolymer rubber (A-2) shown in Table 1 was used instead of the ethylene/propylene/5-vinyl-2-norbornene random copolymer rubber (A-1). The temperature of the kneadate discharged from the Banbury mixer was 134° C.

The results are set forth in Table 14.

Comparative Example M2

The procedure of Example M1 was repeated, except that an ethylene/propylene/dicyclopentadiene random copolymer rubber (A-3) shown in Table 1 was used instead of the ethylene/propylene/5-vinyl-2-norbornene random copolymer rubber (A-1). The temperature of the kneadate discharged from the Banbury mixer was 132° C. The results are set forth in Table 14.

Comparative Example M3

The procedure of Comparative Example M1 was repeated, except that 3.5 parts by weight of 40% dilute dicumyl peroxide (DCP) (trade name: Kayacumyl D-40, available from Kayaku Akuzo K.K.) and 1.0 part by weight of Highcross M (trade name, available from Seiko Kagakusha K.K.) as a crosslinking assistant were used instead of 2 parts by weight of the SiH group-containing compound represented by $C_6H_5$—$Si(OSi(CH_3)_2H)_3$, 0.2 part by weight of ethynylcyclohexanol and 0.5 part by weight of the isopropyl alcohol solution of chloroplatinic acid having a concentration of 5% by weight, the mold stain test was conducted under the conditions of a crosslinking temperature of 190° C. and a crosslinking time of 120 seconds, and the tensile test and the heat aging resistance test to measure properties of a crosslinked rubber were conducted using a crosslinked sheet having a thickness of 2 mm obtained by pressing at 170° C. for 15 minutes by a 150-ton press molding machine.

The results are set forth in Table 14.

Comparative Example M4

The procedure of Comparative Example M1 was repeated, except that an ethylene/propylene/dicyclopentadiene random copolymer rubber (A-3) shown in Table C02020-1 was used instead of the ethylene/propylene/5-ethylidene-2-norbornene random copolymer rubber (A-2), and 6.8 parts by weight of 40% dilute dicumyl peroxide (DCP) (trade name: Kayacumyl D-40, available from Kayaku Akuzo K.K.) and 1.0 part by weight of Highcross M (trade name, available from Seiko Kagakusha K.K.) as a crosslinking assistant were used instead of 2 parts by weight of the SiH group-containing compound represented by $C_6H_5$—$Si(OSi(CH_3)_2H)_3$, 0.2 part by weight of ethynylcyclohexanol and 0.5 part by weight of the isopropyl alcohol solution of chloroplatinic acid having a concentration of 5% by weight.

The results are set forth in Table 14.

Comparative Example M5

The procedure of Comparative Example M1 was repeated, except that an ethylene/propylene/dicyclopentadiene random copolymer rubber (A-3) shown in Table 1 was used instead of the ethylene/propylene/5-ethylidene-2-norbornene random copolymer rubber (A-2), and 0.5 part by weight of CBS (trade name: Sanseller CM, available from Sanshin Kagaku Kogyo K.K.), 0.7 part by weight of ZnBDC (trade name: Sanseller BZ, available from Sanshin Kagaku Kogyo K.K.), 0.7 part by weight of TMTD (trade name: Sanseller TT, available from Sanshin Kagaku Kogyo K.K.), 0.5 part by weight of DPTT (trade name: Sanseller TRA, available from Sanshin Kagaku Kogyo K.K.), 0.5 part by weight of TeEDC (trade name: Sanseller EZ, available from Sanshin Kagaku Kogyo K.K.) and 1.0 part by weight of sulfur were used as vulcanization accelerators instead of 2 parts by weight of the SiH group-containing compound represented by $C_6H_5$—$Si(OSi(CH_3)_2H)_3$, 0.2 part by weight of ethynylcyclohexanol and 0.5 part by weight of the isopropyl alcohol solution of chloroplatinic acid having a concentration of 5% by weight.

The results are set forth in Table 14.

by a twin roll, and the resulting composition was continuously extruded by an extruder (inner diameter (D) of kneading zone: 40 mm, ratio (L/D) of length (L) of kneading zone to inner diameter (D): 12) to prepare a molded product having a sectional shape shown in FIG. 1.

Crosslinking of the molded product was carried out by conducting atmospheric pressure hot air vulcanization at 200° C. for a residence time of 5 minutes and then conducting secondary crosslinking at 100° C. for 2 hours, to obtain a gipper type gasket shown in FIG. 1.

Then, measurements of properties of a cured rubber constituting the gipper type gasket and a wind pressure

TABLE 14

| | Example M1 | Comparative Example | | | | |
|---|---|---|---|---|---|---|
| | | M1 | M2 | M3 | M4 | M5 |
| Composition (parts by weight) | | | | | | |
| Copolymer rubber (A-1) | 100 | | | | | |
| Copolymer rubber (A-2) | | 100 | | 100 | | |
| Copolymer rubber (A-3) | | | 100 | | 100 | 100 |
| SiH group-containing compound*1 | 2 | 2 | 2 | | | |
| IPA solution of chloroplatinic acid of 5 wt % | 0.5 | 0.5 | 0.5 | | | |
| Ethynylcyclohexanol | 0.2 | 0.2 | 0.2 | | | |
| DCP/D-40 | | | | 3.5 | 6.8 | |
| Highcross M | | | | 1.0 | 1.0 | |
| CBS | | | | | | 0.5 |
| ZnBDC | | | | | | 0.7 |
| TMTD | | | | | | 0.7 |
| DPTT | | | | | | 0.5 |
| TeEDC | | | | | | 0.5 |
| Sulfur | | | | | | 1.0 |
| $t_c$ (90) (at 160° C.) (min.) | 1 | — | — | 30 | 30 | 20 |
| Hot air crosslinked (HAV) rubber property | | | | | | |
| Scratch resistance | A | D | D | D | D | A |
| Mold stain property (number of shot times) | 200 | — | — | 55 | 50 | 20 |
| Press crosslinked rubber property | | | | | | |
| Dry property | | | | | | |
| $T_B$ (Mpa) | 10.5 | not cross-linked | not cross-linked | 11.5 | 10.2 | 10.1 |
| $E_B$ (%) | 200 | | | 220 | 260 | 250 |
| Heat aging resistance | | | | | | |
| $A_R$ ($T_B$) (%) | 101 | | | 104 | 89 | 85 |
| $A_R$ ($E_B$) (%) | 99 | | | 98 | 85 | 51 |
| AH (point) | +1 | | | +1 | +2 | +5 |
| Compression set (%) | 17 | | | 19 | 21 | 45 |
| Degree of swelling in ethylene glycol | | | | | | |
| ΔV (%) | 1.5 | | | 1.5 | 1.5 | 1.7 |

*1Organohydrogen polysiloxane represented by $C_6H_5$—$Si(OSi(CH_3)_2H)_3$
*2Each of the compositions of Ex. M1 and Comp. Ex. M1 to M5 contains 5 parts by weight of zinc white No. 1, 1 part by weight of stearic acid, 40 parts by weight of carbon black, 70 parts by weight of talc and 1 part by weight of an activator.

Example N1

100 Parts by weight of an ethylene/propylene/5-vinyl-2-norbornene copolymer ($ML_{1+4}$(100° C.): 44, ethylene content: 57% by mol, iodine value: 10, available from Mitsui Chemicals, Inc.) as a polyolefin synthetic polymer and 30 parts by weight of Silica Aerosil 200 (available from Nippon Aerosil K.K.) were compounded in the proportion shown in Table 15 by a twin-roll to prepare a rubber compound.

Then, to the rubber compound, 1.5 parts by weight of organohydrogen polysiloxane represented by the formula $C_6H_5Si$—$(OSi(CH_3)_2H)_3$, 0.06 part by weight of ethynylcyclohexanol as a regulator and 0.05 part by weight of a 5% isopropyl alcohol solution of chloroplatinic acid were added resistance test of the gipper type gasket were carried out. The results are set forth in Table 15.

Figure 2:
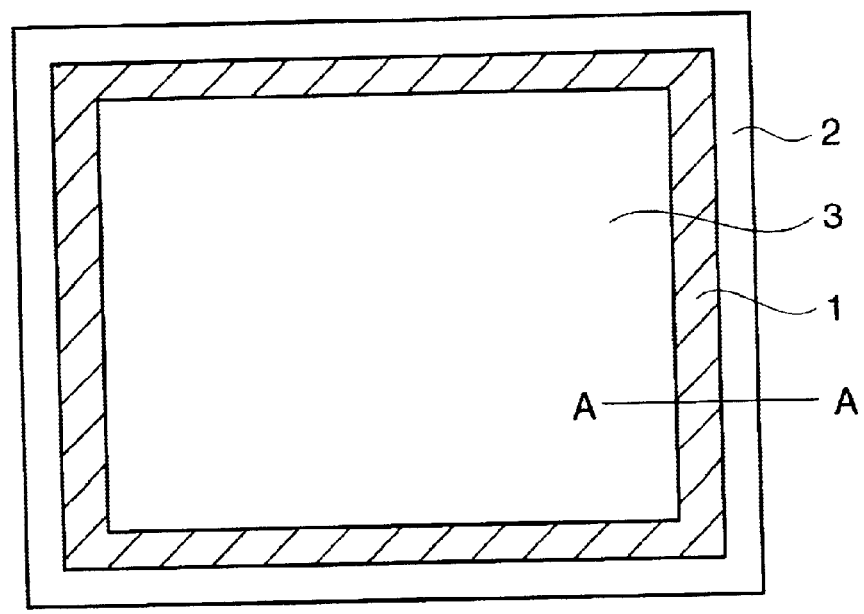
FIG. 2 is a plan view of the same embodiment as shown in FIG. 1.

As the properties, hardness (graduations) of A type tester, tensile strength and elongation were measured in accordance with JIS K6249. The wind pressure resistance test was carried out as follows. As shown in FIG. 1 and FIG. 2, a glass 3 (1400 mm×1840 mm×15 mm) was fixed to an aluminum sash 2 through a gipper type gasket 1, and a wind pressure (700 kgf/m²) was applied vertically to the surface of the flat glass to observe whether the flat glass fell off from the frame or not.

Comparative Example N1

A rubber compound was prepared in the same manner as in Example N1, except that EPT-3045 (available from Mitsui Chemicals, Inc., diene component used: ethylidene norbornene) was used instead of the polyolefin synthetic polymer. Then, atmospheric pressure hot air vulcanization was carried out. However, the vulcanization did not proceed, and a molded product could not be obtained.

Example N2

A rubber composition was prepared in the same manner as in Example N1, except that 10 parts by weight of organopolysiloxane consisting of 99.85% by mol of dimethylsiloxane units, 0.125% by mol of methylvinylsiloxane units and 0.025% by mol of dimethylvinylsiloxane units and having average polymerization degree of about 8,000 and 4 parts by weight of azobisisobutyronitrile as a blowing agent (AIBN) were added in addition to the components used in Example N1, and the 5% isopropyl alcohol solution of chloroplatinic acid was used in an amount of 0.5% part by weight. Then, extrusion and crosslinking were carried out in the same manner as in Example N1 to obtain a gipper type sponge gasket. The cells of the sponge were uniform and dense. Further, mold expansion was carried out at 160° C. for 15 minutes to obtain a sponge gasket. The cells were uniform and dense, and the finish at the edge portion was good.

TABLE 15

|  | Example | | Comp. |
|---|---|---|---|
|  | N1 | N2 | Example N1 |
| Composition (parts by weight) | | | |
| EPT R-046 | 100 | 90 | |
| EPT-3045 | | | 100 |
| Organopolysiloxane | | 10 | |
| Aerosil 200 (Silica) | 30 | 30 | 30 |
| Organohydrogen polysiloxane (i) | 1.5 | 1.5 | 1.5 |
| IPA solution of chloroplatinic acid of 5 wt % | 0.05 | 0.5 | 0.05 |
| Ethynylcyclohexanol | 0.06 | 0.06 | 0.06 |
| Blowing agent (AIBN) | | 4 | |
| Compression molded crosslinked rubber property | | | |
| T10 (min) | 0.25 | | 1.20 |
| Hardness (Durometer A) | 73 | | 40 |
| Tensile strength (Mpa) | 12.0 | | 3.5 |
| Elongation (%) | 180 | | 600 |
| Hot air vulcanized (HAV) rubber property | | | |
| Hardness (Durometer A) | 71 | Asker C Hardness 40 (sponge) | Not completely cured |
| Tensile strength (Mpa) | 10.5 | | |
| Elongation (%) | 180 | | |
| Wind pressure test | | No fall-off | |

Examples O1 and O2

A polyolefin synthetic polymer (trade name: EPT R-046, $ML_{1+4}$(100° C.): 44, ethylene content: 57% by mol, iodine value: 10, available from Mitsui Chemicals, Inc.) as a component (A) and a silicone rubber compound KE-551-U (silicone content: about 75% by weight, available from Shinetsu Chemical Industry Co., Ltd.) capable of providing a cured product having a JIS-A hardness of 50, as a component (B), were compounded in the proportion shown in Table 16 by a twin roll to prepare a rubber compound.

Then, to 100 parts by weight of the rubber compound, 1.5 parts by weight of organohydrogen polysiloxane represented by the formula $C_6H_5Si$—$(OSi(CH_3)_2H)_3$, 0.06 part by weight of ethynylcyclohexanol as a regulator and 0.05 part by weight of a 5% isopropyl alcohol solution of chloroplatinic acid were added by a twin roll, followed by mixing. The resulting mixture was subjected to core bar simultaneous extrusion to form a rubber roll having a thickness of 4 mm around a stainless steel core bar having a diameter of 6 mm and then subjected to hot air vulcanization (HAV) for 20 minutes in a hot air dryer at 150° C., followed by surface abrading, to obtain a roll having a diameter of 12 mm. Separately, the curing agent-containing rubber compound before heat curing was molded into a sheet having a thickness of 2 mm by the use of a twin roll. Then, the sheet was subjected to hot air vulcanization (HAV) at 150° C. for 20 minutes in a hot air dryer to obtain a property measuring sheet having a thickness of 2 mm.

The sheet obtained in the compounding/molding method was measured on the mechanical properties in accordance with JIS K6249. The hardness of the sheet was measured by Durometer A.

Further, the surface of the elastomeric rubber after cured was scratched with a sharp-tip tool, and whether a scratch mark remained or not on the rubber surface was examined to evaluate the state of crosslink of the rubber surface.

Furthermore, stain onto OPC was evaluated as follows. The above-obtained roll is contacted to an OPC drum of a laser printer so that a load of 1 kg (200 g in case of sponge roll) was applied to both ends of the roll for 24 hours, then the drum was set into the laser printer again, and the number of printed matters having a white line due to stain was counted from the first printing, whereby the OPC stain was evaluated. The results are set forth in Table 16.

Example O3

100 Parts by weight of an EPDM/silicone mixed rubber compound prepared in the same mixing proportion as in Example O1 and 25 parts by weight of acetylene black (available from Denki Kagaku Kogyo K.K.) were kneaded by a twin roll to obtain a rubber compound.

To the rubber compound obtained as described above, 1.5 parts by weight of organohydrogen polysiloxane (crosslinking agent), 0.06 parts by weight of ethylmethylcyclohexanol as a regulator and 0.05 parts by weight of a 5% isopropyl alcohol solution of chloroplatinic acid was added and mixed in the same manner as Example O1. Then, a conductive roll and a sheet were prepared in the same manner as in Example O1.

The resultant conductive roll and sheet were evaluated in the same manner in Example O1.

The results are set forth in Table 16.

Example O4

To the EPDM/silicone mixed rubber compound used in Example O3, 15 parts by weight of organohydrogen polysiloxane (crosslinking agent), 0.06 parts by weight of ethylmethylcyclohexanol as a regulator and 0.05 parts by weight of a 5% isopropyl alcohol solution of chloroplatinic acid was added and mixed in the same manner as Example O1, except that 3 parts by weight of dicumyl peroxide as a crosslinking assistant was further used. Then, a conductive roll and a sheet were prepared in the same manner as in Example O1.

The resultant conductive roll and sheet were evaluated in the same manner as in Example O1.

The results are set forth in Table 16.

Example O5

To 100 Parts by weight of an EPDM/silicone mixed rubber compound prepared in the same mixing proportion as in Example O1, 1.5 parts by weight of organohydrogen polysiloxane, 0.4 part by weight of ethynylcyclohexanol as a regulator, 0.6 part by weight of a 5% solution of chloroplatinic acid and 6.0 parts by weight of azobisisobutyronitrile (AIBN) were added by a twin roll, followed by mixing. The resulting mixture was subjected to core bar simultaneous extrusion to form a rubber roll having a thickness of 2 mm around a stainless steel core bar having a diameter of 6 mm and having been subjected to primer treatment for rubber adhesion and then expanded by hot air vulcanization (HAV) for 40 minutes in a hot air dryer at 150° C. to prepare a sponge. Then, the sponge was subjected to surface abrading to obtain a roll having a diameter of 12 mm.

The resultant conductive roll was evaluated in the stain onto OPC in the same manner as in Example O1. Further, an Asker C hardness test was carried out about the sponge of the roll.

The results are set forth in Table 16.

Comparative Example O1

A rubber compound was prepared in the same manner as in Example O1, except that EPTX-4010 (available from Mitsui Chemicals, Inc., diene component used: ethylidene norbornene) was used instead of the polyolefin synthetic polymer. Then, a conductive roll and a sheet were prepared in the same manner as in Example O1.

The resultant conductive roll and sheet were evaluated in the same manner as in Example O1.

The results are set forth in Table 16.

Comparative Example O2

A rubber compound was prepared in the same manner as in Example O3, except that EPTX-4010 was used instead of the polyolefin synthetic polymer. Then, a conductive roll and a sheet were prepared in the same manner as in Example O3.

The resultant conductive roll and sheet were evaluated in the same manner as in Example O1.

The results are set forth in Table 16.

Comparative Example O3

A rubber compound was prepared in the same manner as in Example O4, except that EPTX-4010 was used instead of the polyolefin synthetic polymer and the proportion of dicumyl peroxide was changed to 8 parts by weight. Then, a conductive roll and a sheet were prepared in the same manner as in Example O4.

The resultant conductive roll and sheet were evaluated in the same manner as in Example O1.

The results are set forth in Table 16.

Comparative Example O4

A rubber compound was prepared in the same manner as in Example O1, except that only a silicone rubber compound KE-551-U was used as the base rubber compound and polyolefin rubber (EPT R-048) was not used. Then, a conductive roll and a sheet were prepared in the same manner as in Example O1.

The resultant conductive roll and sheet were evaluated in the same manner as in Example O1.

The results are set forth in Table 16.

TABLE 16

|  | Example | | | | | Comparative Example | | | |
| --- | --- | --- | --- | --- | --- | --- | --- | --- | --- |
|  | 01 | 02 | 03 | 04 | 05 | 01 | 02 | 03 | 04 |
| Composition (parts by weight) | | | | | | | | | |
| EPT R-046 | 90 | 60 | 90 | 90 | 90 |  |  |  |  |
| KE-551-U | 10 | 40 | 10 | 10 | 10 | 10 | 10 | 10 | 100 |
| EPTX-4010 |  |  |  |  |  | 90 | 90 | 90 |  |
| Denka black |  |  | 25 | 25 |  |  | 25 | 25 |  |
| Organohydrogen Polysiloxane | 1.5 | 1.5 | 1.5 | 1.5 | 1.5 | 1.5 | 1.5 | 1.5 | 1.5 |
| IPA solution of chloroplatinic acid of 5 wt % | 0.05 | 0.05 | 0.05 | 0.05 | 0.6 | 0.05 | 0.05 | 0.05 | 0.05 |
| Ethynylcyclohexanol | 0.06 | 0.06 | 0.06 | 0.06 | 0.04 | 0.06 | 0.06 | 0.06 | 0.06 |
| Dicumyl peroxide |  |  |  | 3 |  |  |  | 8 |  |
| Blowing agent (AIBN) |  |  |  |  | 6.0 |  |  |  |  |
| Sheet properties | | | | | | | | | |
| Hardness (Durometer A) | 67 | 62 | 65 | 66 | Asker C hardness 25 (sponge) | not cured | Not cured | Slightly cured* | 50 |
| Tensile strength (Mpa) | 13.3 | 11.2 | 7.3 | 12.2 |  |  |  |  | 5.6 |
| Elongation (%) | 180 | 200 | 230 | 150 |  |  |  |  | 290 |
| Roll properties | | | | | | | | | |
| Surface curability | ○ | ○ | ○ | ⊙ | — | — | — | X | ⊙ |
| Stain onto OPC (sheet) | 0 | 0 | 0 | 0 | 0 | — | — | — | 10 |

*The cross linking was not effected enough to give the desired properties.

As is evident from the results set forth in Table 16, the EPDM rubber compositions using a novel diene underwent crosslinking reaction more rapidly by hot air vulcanization to thereby produce rolls of excellent properties, as compared with the conventional rubbers.

What is claimed is:

1. A crosslinkable rubber composition, which is crosslinkable by hot air and has the following properties:
   a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70% after a heat treatment at 150° C. for 22 hours, and further comprises:

an ethylene/α-olefin/non-conjugated polyene random copolymer rubber (A) having constituent units derived from at least one kind of a vinyl end group-containing norbornene compound represented by the following formula (I) or (II), said norbornene compound being the non-conjugated polyene, and a SiH group-containing compound (B) having at least two SiH groups in one molecule;

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms;

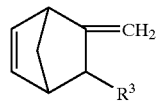

(II)

wherein $R^3$ is a hydrogen atom or an alkyl group of 1 to 10 carbon atoms.

2. The crosslinkable rubber composition as claimed in claim 1, which comprises the ethylene/α-olefin/non-conjugated polyene random copolymer rubber (A), the SiH group-containing compound (B) having at least two SiH groups in one molecule, and a catalyst (E).

3. The crosslinkable rubber composition as claimed in claim 1, which comprises the ethylene/α-olefin/non-conjugated polyene random copolymer rubber (A), the SiH group-containing compound (B) having at least two SiH groups in one molecule, a catalyst (E) and a reaction inhibitor (F).

4. The crosslinkable rubber composition as claimed in claim 1, wherein the ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 40/60 to 95/5, (ii) the iodine value is in the range of 0.5 to 50, and (iii) the intrinsic viscosity (η) as measured in Decalin at 135° C. is in the range of 0.3 to 10 dl/g.

5. A crosslinkable rubber composition which comprises:

an ethylene/α-olefin/non-conjugated polyene random copolymer rubber (A) having constituent units derived from at least one kind of a vinyl end group-containing norbornene compound represented by the following formula (I) or (II), said norbornene compound being the non-conjugated polyene, and a SiH group-containing compound (B) having at least two SiH groups in one molecule;

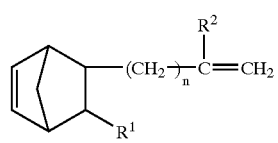

(I)

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms;

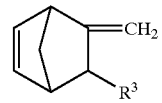

(II)

wherein $R^3$ is a hydrogen atom or an alkyl group of 1 to 10 carbon atoms, wherein the ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 40/60 to 95/5, (ii) the iodine value is in the range of 0.5 to 50, (iii) the intrinsic viscosity (η) as measured in Decalin at 135° C. is in the range of 0.3 to 10 dl/g, (iv) the molecular weight distribution (Mw/Mn) as measured by GPC is in the range of 3 to 50, and (v) the effective network chain density (v) as measured after the copolymer rubber (A) is press crosslinked at 170° C. for 10 minutes using 0.01 mol of dicumyl peroxide based on 100 g of the copolymer rubber (A) is not less than $1.5 \times 10^{20}$ chains/cm$^3$.

6. The crosslinkable rubber composition as claimed in claim 5, wherein the ethylene/α-olefin/non-conjugated polyene random copolymer rubber (A) has, in addition to the properties (i), (ii), (iii), (iv) and (v), the following properties:

(vi) the ratio between a ratio ($\gamma_2/\gamma_1$) of a shear rate $\gamma_2$ at a shear stress of $2.4 \times 10^6$ dyn/cm$^2$ obtained from the melt flow curve at 100° C. to a shear rate $\gamma_1$ at a shear stress of $0.4 \times 10^6$ dyn/cm$^2$ obtained from the melt flow curve at 100° C. and the effective network chain density (v) satisfies the following formula (III):

$$0.04 \times 10^{-19} \leq \text{Log}(\gamma_2/\gamma_1)/v \leq 0.20 \times 10^{-19} \quad \text{(III)}.$$

7. A crosslinkable rubber composition which comprises:

an ethylene/α-olefin/non-conjugated polyene random copolymer rubber (A) having constituent units derived from at least one kind of a vinyl endgroup-containing norbornene compound represented by the following formula (I) or (II), said norbornene compound being the non-conjugated polyene, and a SiH group-containing compound (B) having at least two SiH groups in one molecule;

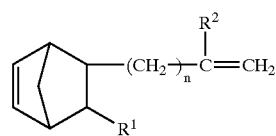

(I)

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms;

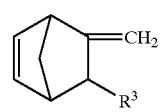

(II)

wherein $R^3$ is a hydrogen atom or an alkyl group of 1 to 10 carbon atoms, wherein the ethylene/α-olefin/non-conjugated polyene random copolymer rubber (A) is obtained by copolymerizing ethylene, an α-olefin and the norbornene compound represented by the formula (I) or (II) using a catalyst containing the following compounds (J) and (K) as main components under the conditions of a polymerization temperature of 30 to 60° C., a polymerization pressure of 4 to 12 kgf/cm² and a feed rate molar ratio (non-conjugated polyene/ethylene/of the non-conjugated polyene to ethylene ranging from 0.01 to 0.2;

(J) is a soluble vanadium compound represented by VO(OR)$_n$X$_{3-n}$ wherein R is a hydrocarbon group, X is a halogen atom, and n is 0 or an integer of 1 to 3, or a vanadium compound represented by VX$_4$ (X is a halogen atom);

(K) is an organoaluminum compound represented by R'$_m$AlX'$_{3-m}$ (R' is a hydrocarbon group, X' is a halogen atom, and m is an integer of 1 to 3).

8. The crosslinkable rubber composition as claimed in claim 7, wherein the ethylene/α-olefin/non-conjugated polyene random copolymer rubber (A) has an insoluble content of not more than 1% after Soxhlet extraction (solvent: boiling xylene, extraction time: 3 hours, mesh: 325).

9. The crosslinkable rubber composition as claimed in claim 2, wherein the catalyst (E) is a platinum catalyst.

10. The crosslinkable rubber composition as claimed in any one of claims 5–8, which has the physical properties whereby a crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70% after a heat treatment at 150° C. for 22 hours.

11. The crosslinkable rubber composition as claimed in any one of claims 1 to 9, which has a crosslinking rate (t$_c$(90)) at 160° C. of not more than 15 minutes.

12. The crosslinkable rubber composition as claimed in any one of claims 1 to 9, which comprises an ethylene/α-olefin/non-conjugated polyene random copolymer rubber (A1) having constituent units derived from at least one kind of a vinyl end group-containing norbornene compound represented by the following formula (I) or (II), said norbornene compound being the non-conjugated polyene, and constituent units derived from a non-conjugated polyene compound (2) containing a group represented by the following formula (III); and the SiH group-containing compound (B) having at least two SiH groups in one molecule:

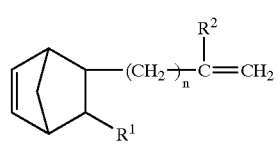

(I)

wherein n is an integer of 0 to 10, R¹ is a hydrogen atom or an alkyl group of 1 to 10 carbon atoms, and R² is a hydrogen atom or an alkyl group of 1 to 5 carbon atoms;

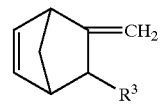

(II)

wherein R³ is a hydrogen atom or an alkyl group of 1 to 10 carbon atoms;

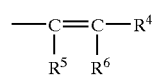

(III)

wherein R⁴ is an alkyl group of 1 to 10 carbon atoms, and R⁵ and R⁶ are each independently a hydrogen atom or an alkyl group of 1 to 10 carbon atoms.

13. The crosslinkable rubber composition as claimed in any one of claims 1 to 9, wherein the ethylene/α-olefin/non-conjugated polyene random copolymer rubber (A) is the ethylene/α-olefin/non-conjugated polyene random copolymer rubber (A1) and has the following properties:

(i) the molar ratio (ethylene/α-olefin) of ethylene to an α-olefin of 3 to 20 carbon atoms is in the range of 40/60 to 95/5, (ii) the iodine value is in the range of 0.5 to 50, (iii) the intrinsic viscosity (η) as measured in Decalin at 135° C. is in the range of 0.3 to 10 dl/g, and (iv) the branch index as measured by a kinematic viscoelasticity measuring machine is not less than 5.

14. The crosslinkable rubber composition as claimed in any one of claims 1 to 9, which is a blend comprising the ethylene/α-olefin/non-conjugated polyene random copolymer rubber (A), a polyolefin resin (D1) and the SiH group-containing compound (B), is obtained by microdispersing the polyolefin resin (D1) in the ethylene/α-olefin/non-conjugated polyene random copolymer rubber (A) in a molten state, and has the following properties:

the average dispersed particle diameter of the polyolefin resin (D1) is not more than 2 μm, and the blending weight ratio ((D1)/(A)) of the polyolefin resin (D1) to the ethylene/α-olefin/non-conjugated polyene random copolymer rubber (A) is in the range of 5/95 to 50/50.

15. The crosslinkable rubber composition as claimed in claim 14, which is a blend comprising the ethylene/α-olefin/non-conjugated polyene random copolymer rubber (A), a polyolefin resin (D1) selected from crystalline homopolymers of α-olefin having 3 to 8 carbon atoms and crystalline α-olefin copolymers of said α-olefins and the SiH group-containing compound (B), is obtained by microdispersing the polyolefin resin (D1) in the ethylene/α-olefin/non-conjugated polyene random copolymer rubber (A) in a molten state, and has the following properties:

the average dispersed particle diameter of the polyolefin resin (D1) is not more than 2 μm, the blending weight ratio ((D1)/(A)) of the polyolefin resin (D1) to the ethylene/α-olefin/non-conjugated polyene random copolymer rubber (A) is in the range of 5/95 to 50/50, and the hardness (Y) (A hardness defined by JIS K 6301) of said rubber composition and the amount (X) of the polyolefin resin (D1) satisfy the following relation $Y=(0.5\pm 0.2)X+a$ wherein X is an amount (part(s) by weight, the total of the components (A) and (D) is 100 parts by weight) of the polyolefin resin (D1), and a is a hardness obtained by subtracting an increase of hardness attributed to the addition of the polyolefin resin (D1) from the hardness of the rubber composition).

16. The crosslinkable rubber composition as claimed in any one of claims 1 to 9, wherein the ethylene/α-olefin/non-conjugated polyene random copolymer rubber (A) has the following properties:
   (i) the molar ratio (ethylene/α-olefin) of ethylene to an α-olefin of 3 to 20 carbon atoms is in the range of 40/60 to 95/5,
   (ii) the iodine value is in the range of 0.5 to 50,
   (iii) the intrinsic viscosity (η) as measured in Decalin at 135° C. is in the range of 0.3 to 10 dl/g, and
   (iv) the branch index as measured by a kinematic viscoelasticity measuring machine is not less than 5.

17. The crosslinkable rubber composition as claimed in any one of claims 1 to 9, which further comprises an alkenyl group-containing organopolysiloxane (C) in addition to the ethylene/α-olefin/non-conjugated polyene random copolymer rubber (A) and the SiH group-containing compound (B).

18. The crosslinkable rubber composition as claimed in any one of claims 1 to 9, wherein the ethylene/α-olefin/non-conjugated polyene random copolymer rubber (A) has the following properties:
   (i) the molar ratio (ethylene/α-olefin) of ethylene to an α-olefin of 3 to 20 carbon atoms is in the range of 40/60 to 95/5,
   (ii) the iodine value is in the range of 0.5 to 50,
   (iii) the intrinsic viscosity (η) as measured in Decalin at 135° C. is in the range of 0.3 to 10 d/g, and
   (iv) the branch index as measured by a kinematic viscoelasticity measuring machine is not less than 5.

19. The crosslinkable rubber composition as claimed in any one of claims 1 to 9, which is crosslinkable by hot air and has the following properties:
   a hot-air crosslinked rubber sheet obtained by molding said rubber composition into a sheet and then subjecting the sheet to hot-air crosslinking has no scratch on the surface in a pencil hardness test using a pencil of HB and has a compression set (CS) of not more than 70% after a heat treatment at 150° C. for 22 hours and a tensile strength retention of 50 to 300% after heat aging at 150° C. for 72 hours.

20. The crosslinkable rubber composition as claimed in any one of claims 1 to 9, which is used for producing an automobile weatherstrip.

21. The crosslinkable rubber composition as claimed in claim 20, wherein the automobile weatherstrip is a door weatherstrip, a trunk weatherstrip, a luggage weatherstrip, a roof side rail weatherstrip, a slide door weatherstrip, a ventilator weatherstrip, a sliding loop panel weatherstrip, a front window weatherstrip, a rear window weatherstrip, a quarter window weatherstrip, a lock pillar weatherstrip, a door glass outer weatherstrip, a door glass inner weatherstrip, a dam windshield, a glass run channel, a door mirror bracket, a seal head lamp or a seal cowl top.

22. An automobile weatherstrip formed from the crosslinkable rubber composition of any one of claims 1 to 9.

23. The crosslinkable rubber composition as claimed in any one of claims 1 to 9, which is a rubber composition for glass run that is crosslinkable by hot air and a hot press and which has the following properties:
   a hot-press crosslinked rubber sheet obtained by molding said rubber composition into a sheet and then subjecting the sheet to hot-press crosslinking has a tensile strength of 5 to 16 MPa and a compression set (CS) of not more than 70% after a heat treatment at 150° C. for 22 hours.

24. The crosslinkable rubber composition as claimed in any one of claims 1 to 9, which is a crosslinkable rubber composition for glass run and in which the ethylene/α-olefin/non-conjugated polyene random copolymer rubber (A) has the following properties:
   (i) the molar ratio (ethylene/α-olefin) of ethylene to an α-olefin of 3 to 20 carbon atoms is in the range of 60/40 to 80/20,
   (ii) the iodine value is in the range of 1 to 30,
   (iii) the intrinsic viscosity (η) as measured in Decalin at 135° C. is in the range of 1.5 to 3.5 dl/g, and
   (iv) the branch index as measured by a kinematic viscoelasticity measuring machine is not less than 5.

25. The automobile weatherstrip as claimed in claim 22, which is a glass run product formed from the rubber composition of any one of claims 2 to 12.

26. The crosslinkable rubber composition as claimed in any one of claims 1 to 9, which is used for producing an automobile hose, a water supply hose or a gas hose.

27. The crosslinkable rubber composition as claimed in claim 26, wherein the automobile hose is a brake hose, a radiator hose, a heater hose or an air cleaner hose.

28. A hose formed from the crosslinkable rubber composition of any one of claims 1 to 9.

29. The hose as claimed in claim 28, which is an automobile hose, a water supply hose or a gas hose.

30. The crosslinkable rubber composition as claimed in any one of claims 1 to 9, which is a rubber composition for hose that is crosslinkable by hot air and a hot press and which has the following properties:
   a hot-press crosslinked rubber sheet obtained by molding said rubber composition into a sheet and then subjecting the sheet to hot-press crosslinking has a volume resistivity (23° C.) of $10^3$ to $10^{16}$ Ω·cm, a tensile strength of 5 to 30 MPa and a compression set (CS) of not more than 70% after a heat treatment at 150° C. for 22 hours.

31. The crosslinkable rubber composition as claimed in any one of claims 1 to 9, which is a crosslinkable rubber composition for hose and in which the ethylene/α-olefin/non-conjugated polyene random copolymer rubber (A) has the following properties:
   (i) the molar ratio (ethylene/α-olefin) of ethylene to an α-olefin of 3 to 20 carbon atoms is in the range of 60/40 to 80/20.
   (ii) the iodine value is in the range of 1 to 30,
   (iii) the intrinsic viscosity (η) as measured in Decalin at 135° C. is in the range of 0.3 to 5.0 dl/g, and
   (iv) the branch index as measured by a kinematic viscoelasticity measuring machine is not less than 5.

32. A hose comprising the rubber composition of claim 30.

33. The crosslinkable rubber composition as claimed in any one of claims 1 to 9, which is used for producing an automobile rubber vibration insulator, a railway rubber vibration insulator, an industrial equipment rubber vibration insulator or an earthquake proof rubber for construction.

34. The crosslinkable rubber composition as claimed in claim 33, wherein the automobile rubber vibration insulator is an engine mount, a liquid seal engine mount, a damper pulley, a chain damper, a carburetor mount, a torsional damper, a strut mount, a rubber bush, a bumper rubber, a helper rubber, a spring sheet, a shock absorber, an air spring, a body mount, a bumper guard, a muffler support, a rubber coupling, a center bearing support, a clutch rubber, a deaf mount, a suspension bush, a slide bush, a cushion strut bar, a stopper, a handle damper, a radiator supporter or a muffler hanger.

35. The crosslinkable rubber composition as claimed in claim 33, wherein the railway rubber vibration insulator is a slab mat, a ballast mat or a track mat.

36. The crosslinkable rubber composition as claimed in claim 33, wherein the industrial equipment rubber vibration insulator is an expansion joint, a flexible joint, a bush or a mount.

37. A rubber vibration insulator comprising the crosslinkable rubber composition of any one of claims 1 to 9.

38. The rubber vibration insulator as claimed in claim 37, which is an automobile rubber vibration insulator, a railway rubber vibration insulator, an industrial equipment rubber vibration insulator or an earthquake proof rubber for construction.

39. The crosslinkable rubber composition as claimed in any one of claims 1 to 9, which is a rubber composition for rubber vibration insulator that is crosslinkable by hot air and a hot press and which has the following properties:
   a hot-press crosslinked rubber sheet obtained by molding said rubber composition into a sheet and then subjecting the sheet to hot-press crosslinking has a tensile strength of 5 to 16 MPa and a compression set (CS) of not more than 70% after a heat treatment at 150° C. for 22 hours.

40. The crosslinkable rubber composition as claimed in any one of claims 1 to 9, which is a crosslinkable rubber composition for rubber vibration insulator and in which the ethylene/α-olefin/non-conjugated polyene random copolymer rubber (A) has the following properties:
   (i) the molar ratio (ethylene/α-olefin) of ethylene to an α-olefin of 3 to 20 carbon atoms is in the range of 60/40 to 80/20,
   (ii) the iodine value is in the range of 1 to 30,
   (iii) the intrinsic viscosity (η) as measured in Decalin at 135° C. is in the range of 1.5 to 3.5 dl/g, and
   (iv) the branch index as measured by a kinematic viscoelasticity measuring machine is not less than 5.

41. A vibration insulating rubber product formed from the rubber composition of claim 39.

42. The crosslinkable rubber composition as claimed in any one of claims 1 to 9, which is used for producing a transmission belt or a conveyor belt.

43. The crosslinkable rubber composition as claimed in claim 42, wherein the transmission belt is a V-belt, A flat bell or a synchronous belt.

44. The crosslinkable rubber composition as claimed in claim 42, wherein the conveyor belt is a light conveyor belt, a cylindrical belt, a rough top belt, a flanged conveyor belt, a U-type guided conveyor belt or a V guided conveyor belt.

45. A belt formed from the crosslinkable rubber composition of any one of claims 1 to 9.

46. The belt as claimed in claim 45, which is a transmission belt or a conveyor belt.

47. The crosslinkable rubber composition as claimed in any one of claims 1 to 9, which is used for producing an automobile cup/sealing material or an industrial equipment sealing material.

48. The crosslinkable rubber composition as claimed in claim 47, wherein the automobile cup/sealing material is a master cylinder piston cup, a wheel cylinder piston cup, a uniform motion joint boot, a pin boot, a dust cover, a piston seal, a packing, an O-ring or a diaphragm.

49. The crosslinkable rubber composition as claimed in claim 47, wherein the industrial equipment sealing material is a condenser packing, an O-ring or a packing.

50. A sealing material formed from the crosslinkable rubber composition of any one of claims 1 to 9.

51. The sealing material as claimed in claim 50, which is an automobile cup/sealing material or an industrial equipment sealing material.

52. The crosslinkable rubber composition as claimed in any one of claims 1 to 9, which is used for producing an automobile weatherstrip sponge or another expanded product.

53. The crosslinkable rubber composition as claimed in claim 52, wherein the automobile weatherstrip sponge is a door weatherstrip sponge, a bonnet weatherstrip sponge, a trunk room weatherstrip sponge, a sunshine roof weatherstrip sponge, a ventilator weatherstrip sponge or a corner sponge.

54. The crosslinkable rubber composition as claimed in claim 52, wherein the another expanded product is a hose-protecting sponge, a cushioning sponge, a heat insulating sponge or an insulation pipe.

55. An expanded product formed from the crosslinkable rubber composition of any one of claims 1 to 9.

56. The expanded product as claimed in claim 55, which is an automobile weatherstrip sponge.

57. The crosslinkable rubber composition as claimed in any one of claims 1 to 9, which is a rubber composition for weatherstrip sponge that is crosslinkable by hot air and which has the following properties:
   a crosslinked rubber sheet obtained by molding said rubber composition into a sheet and then subjecting the sheet to hot-air crosslinking has a specific gravity of 0.1 to 0.8 and a water absorption of not more than 50%.

58. The crosslinkable rubber composition as claimed in any one of claims 1 to 9, which is a rubber composition for weatherstrip sponge and in which the ethylene/α-olefin/non-conjugated polyene random copolymer rubber (A) has the following properties:
   (i) the molar ratio (ethylene/α-olefin) of ethylene to an α-olefin of 3 to 20 carbon atoms is in the range of 60/40 to 90/10,
   (ii) the iodine value is in the range of 1 to 30,
   (iii) the intrinsic viscosity (η)as measured in Decalin at 135° C. is in the range of 0.3 to 5 dl/g, and
   (iv) the branch index as measured by a kinematic viscoelasticity measuring machine is not less than 3.

59. A weatherstrip sponge formed from the crosslinkable rubber composition of any one of claims 1 to 9.

60. The crosslinkable rubber composition as claimed in any one of claims 1 to 9, which is a rubber composition for highly expanded sponge that is crosslinkable by hot air and which has the following properties:
   an expanded product of a crosslinked rubber sheet obtained by molding said rubber composition into a sheet and then subjecting the sheet to hot-air crosslinking has a specific gravity of 0.01 to 0.5, a water absorption of 1 to 500% and an Asker C hardness of 0.1 to 50.

61. The crosslinkable rubber composition as claimed in any one of claims 1 to 9, which is a crosslinkable rubber composition for highly expanded sponge and in which the ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 90/10, (ii) the iodine value is in the range of 1 to 30, (iii) the intrinsic viscosity (η) as measured in Decalin at 135° C. is in the range of 0.3 to 4 dl/g, and (iv) the branch index as measured by a kinematic viscoelasticity measuring machine is not less than 5.

62. A highly expanded sponge formed from the rubber composition of any one of claims 1 to 9.

63. The highly expanded sponge as claimed in claim 62, which is a heat insulating sponge, a cushioning sponge, a sealing sponge or a flame-retardant sponge.

64. The crosslinkable rubber composition as claimed in any one of claims 1 to 9, which is used for producing a covered electric wire, an electric wire joint or an electric insulating part.

65. A covered electric wire covered with a covering material comprising the crosslinkable rubber composition of any one of claims 1 to 9.

66. An electric wire joint formed from the crosslinkable rubber composition of any one of claims 1 to 9.

67. An electric insulating part formed from the crosslinkable rubber composition of any one of clams 1 to 9.

68. A semi-conducting rubber part formed from the crosslinkable rubber composition of any one of claims 1 to 9.

69. The crosslinkable rubber composition as claimed in any one of claims 1 to 9, which is a rubber composition for electric or electronic part that is crosslinkable by hot air and a hot press and which has the following properties:

a hot-press crosslinked rubber sheet obtained by molding said rubber composition into a sheet and then subjecting the sheet to hot-press crosslinking has a volume resistivity (23° C.) of $10^7$ to $10^{17}$ Ω·cm, a tensile strength of 3 to 20 MPa and a compression set (CS) of not more than 70% after a heat treatment at 150° C. for 22 hours.

70. The crosslinkable rubber composition as claimed in any one of claims 1 to 9, which is a crosslinkable rubber composition for electric or electronic part and in which the ethylene/α-olefin/non-conjugated polyene random copolymer rubber (A) has the following properties:

(i) the molar ratio (ethylene/α-olefin) of ethylene to an α-olefin of 3 to 20 carbon atoms is in the range of 60/40 to 90/10, (ii) the iodine value is in the range of 1 to 30, (iii) the intrinsic viscosity (η) as measured in Decalin at 135° C. is in the range of 0.3 to 2.5 dl/g, and (iv) the branch index as measured by a kinematic viscoelasticity measuring machine is not less than 5.

71. An electric or electronic part formed from the crosslinkable rubber composition of any one of claims 1 to 9.

72. The crosslinkable rubber composition as claimed in any one of claims 1 to 9, which is used for producing a household rubber product.

73. The crosslinkable rubber composition as claimed in claim 72, wherein the household rubber product is rain wear, rubber band, shoe, rubber glove, latex or golf ball.

74. The crosslinkable rubber composition as claimed in any one of claims 1 to 9, which can be crosslinked at ordinary temperature.

75. The crosslinkable rubber composition as claimed in any one of claims 1 to 9, which is used for reaction injection molding (RIM).

76. The crosslinkable rubber composition as claimed in any one of claims 1 to 9, which is used for producing a thermoplastic elastomer.

77. The crosslinkable rubber composition as claimed in any one of claims 1 to 9, which is used for modifying an engineering plastic.

78. A household rubber product formed from the crosslinkable rubber composition of any one of claims 1 to 9.

79. The crosslinkable rubber composition as claimed in any one of claims 1 to 9, which is used for producing a sealing sponge for construction.

80. The crosslinkable rubber composition as claimed in claim 79, wherein the sealing sponge for construction is a sealing sponge for gasket, airtight, joint or door stop.

81. The expanded product as claimed in claim 55, which is a sealing sponge for construction.

82. The crosslinkable rubber composition as claimed in any one of claims 1 to 9, which is used for producing an OA machine roll or an industrial roll.

83. The crosslinkable rubber composition as claimed in claim 82, wherein the OA machine roll is an electric charge roll, a transfer roll, a developing roll or a paper feed roll.

84. The crosslinkable rubber composition as claimed in claim 82, wherein the industrial roll is an iron manufacturing roll, a paper manufacturing roll or a printing electric wire roll.

85. An OA machine roll comprising the crosslinkable rubber composition of any one of claims 1 to 9.

86. An industrial roll formed from the crosslinkable rubber composition of any one of claims 1 to 9.

87. A hose comprising the rubber composition of claim 31.

88. A vibration insulating rubber product formed from the rubber composition of claim 40.

* * * * *